(12) United States Patent
Watanabe et al.

(10) Patent No.: US 11,000,980 B2
(45) Date of Patent: May 11, 2021

(54) TEXTILE-LIKE IN-MOLD SHEET, PRODUCTION METHOD OF THE SAME, PREFORM MOLDED BODY, TEXTILE-LIKE RESIN MOLDED BODY, AND PRODUCTION METHOD OF THE SAME

(71) Applicants: ART&TECH Co., Ltd., Minato-ku (JP); Kuraray Co., Ltd., Kurashiki (JP)

(72) Inventors: Yasushi Watanabe, Minato-ku (JP); Hideharu Johno, Minato-ku (JP); Fumihiro Yamaguchi, Okayama (JP); Kohei Aoyama, Osaka (JP)

(73) Assignees: ART & TECH Co., Ltd., Minato-ku (JP); Kuraray Co., Ltd., Kurashiki (JP)

( * ) Notice: Subject to any disclaimer, the term of this patent is extended or adjusted under 35 U.S.C. 154(b) by 151 days.

(21) Appl. No.: 14/915,593

(22) PCT Filed: Aug. 29, 2014

(86) PCT No.: PCT/JP2014/004455
§ 371 (c)(1),
(2) Date: Feb. 29, 2016

(87) PCT Pub. No.: WO2015/029453
PCT Pub. Date: Mar. 5, 2015

(65) Prior Publication Data
US 2016/0214293 A1    Jul. 28, 2016

(30) Foreign Application Priority Data

Aug. 30, 2013  (JP) .............................. JP2013-179837
Aug. 30, 2013  (JP) .............................. JP2013-179838
(Continued)

(51) Int. Cl.
*B29C 45/14* (2006.01)
*B60R 13/02* (2006.01)
(Continued)

(52) U.S. Cl.
CPC .. *B29C 45/14786* (2013.01); *B29C 45/14688* (2013.01); *B29C 45/14811* (2013.01);
(Continued)

(58) Field of Classification Search
CPC ........ B29C 45/14786; B29C 45/14688; B29C 45/14811; B29C 2045/14696;
(Continued)

(56) References Cited

U.S. PATENT DOCUMENTS 5,277,969 A * 1/1994 Borri ....................... B32B 27/12
                                                            442/225
5,298,694 A * 3/1994 Thompson ................ B32B 5/26
                                                            181/286
(Continued)

FOREIGN PATENT DOCUMENTS

DE    10 2004 009 244 A1    4/2005
DE       102006009343 A1 *  9/2007    ........... B29C 70/086
(Continued)

OTHER PUBLICATIONS

DE102006009343 English translation (Year: 2007).*
(Continued)

*Primary Examiner* — Jasper Saberi
(74) *Attorney, Agent, or Firm* — Oblon, McClelland, Maier & Neustadt, L.L.P.

(57) ABSTRACT

Disclosed is a textile-like in-mold sheet that is to be integrated with a resin molded body molded by injection of a molten resin by in-molding. The textile-like in-mold sheet includes at least a fiber sheet layer, a first adhesive layer, and a textile material layer, in this order from a surface that will serve as a side to be integrated with the resin molded body. Alternatively, the textile-like in-mold sheet includes at least a textile material layer and a temporary surface protection layer temporarily bonded to the textile material layer, in this order from the surface to be integrated with the resin molded body.

14 Claims, 33 Drawing Sheets

(30) Foreign Application Priority Data

| | | |
|---|---|---|
| Sep. 13, 2013 | (JP) | JP2013-207685 |
| Jan. 8, 2014 | (JP) | JP2014-011796 |
| Jan. 8, 2014 | (JP) | JP2014-011797 |
| Jan. 8, 2014 | (JP) | JP2014-011798 |
| Feb. 4, 2014 | (JP) | JP2014-019493 |
| Apr. 14, 2014 | (JP) | JP2014-094173 |

(51) Int. Cl.
  *B29K 105/20* (2006.01)
  *B29K 629/00* (2006.01)

(52) U.S. Cl.
  CPC .... B60R 13/02 (2013.01); *B29C 2045/14237* (2013.01); *B29C 2045/14696* (2013.01); *B29C 2045/14713* (2013.01); *B29C 2045/14729* (2013.01); *B29C 2045/14844* (2013.01); *B29K 2105/20* (2013.01); *B29K 2629/14* (2013.01); *B29K 2713/00* (2013.01); *B32B 2305/18* (2013.01)

(58) Field of Classification Search
  CPC ........... B29C 2045/14729; B29C 2045/14844; B29C 45/14844; B29C 2045/14713; B29K 2629/14; B29K 2713/00; B32B 27/12; B32B 9/047; B32B 2305/18–188; B29L 2031/3437; B29L 2031/3481; B60R 13/02
  See application file for complete search history.

(56) References Cited

U.S. PATENT DOCUMENTS

| | | | | |
|---|---|---|---|---|
| 5,897,410 | A * | 4/1999 | Ferraro | B29C 45/14811 442/394 |
| 2002/0106952 | A1 * | 8/2002 | Hashizume | B29C 45/14786 442/43 |
| 2003/0080466 | A1 * | 5/2003 | Cecchin | B29C 45/14467 264/259 |
| 2004/0050482 | A1 | 3/2004 | Abrams et al. | |
| 2008/0187706 | A1 * | 8/2008 | Lion | B29C 45/14786 428/90 |
| 2008/0211137 | A1 * | 9/2008 | Schilles | B29C 43/146 264/257 |
| 2008/0292851 | A1 * | 11/2008 | Egerer | B29C 43/18 428/196 |
| 2010/0143695 | A1 * | 6/2010 | Ogawa | B29C 51/004 428/306.6 |
| 2010/0196668 | A1 | 8/2010 | Atake et al. | |
| 2010/0209654 | A1 * | 8/2010 | Abrams | B32B 27/12 428/90 |
| 2011/0045231 | A1 | 2/2011 | Kajiwara et al. | |
| 2013/0267647 | A1 * | 10/2013 | Tsujimoto | C08F 116/06 524/543 |
| 2013/0309460 | A1 * | 11/2013 | Saitou | B05D 7/24 428/195.1 |
| 2015/0376353 | A1 * | 12/2015 | Takebe | B29C 70/345 428/161 |

FOREIGN PATENT DOCUMENTS

| | | | | |
|---|---|---|---|---|
| EP | 0968806 A1 * | 1/2000 | | B29C 45/14311 |
| EP | 1 834 756 A1 | 9/2007 | | |
| FR | 2 971 990 A1 | 8/2012 | | |
| JP | 61 146518 | 7/1986 | | |
| JP | 6-346378 A | 12/1994 | | |
| JP | 2002/115160 | 4/2002 | | |
| JP | 2002225070 A * | 8/2002 | | |
| JP | 2004 017508 | 1/2004 | | |
| JP | 2005 047161 | 2/2005 | | |
| JP | 2005-281879 | 10/2005 | | |
| JP | 2006-009215 | 1/2006 | | |
| JP | 2006 088504 | 4/2006 | | |
| JP | 2007 276366 | 10/2007 | | |
| JP | 2008-069474 | 3/2008 | | |
| JP | 2010 036366 | 2/2010 | | |
| JP | 2011-56797 A | 3/2011 | | |
| JP | 2012 218432 | 11/2012 | | |
| JP | 2013 132783 | 7/2013 | | |
| JP | 2014 094550 | 5/2014 | | |
| WO | WO 2011/074602 A1 | 6/2011 | | |
| WO | WO-2012043455 A1 * | 4/2012 | | C08F 116/06 |
| WO | 2012 105664 | 8/2012 | | |
| WO | 2012 105665 | 8/2012 | | |

OTHER PUBLICATIONS

JP 2002-225070 English translation (Year: 2002).*
EP0968806 English translation (Year: 2000).*
Final Office Action as received in U.S. Appl. No. 15/882,551 dated Oct. 30, 2019.
Extended European Search Report dated Sep. 2, 2020 in European Patent Application No. 20172484.6, 8 pages.
International Search Report dated Oct. 14, 2014, in PCT/JP2014/004455 Filed Aug. 29, 2014.

* cited by examiner

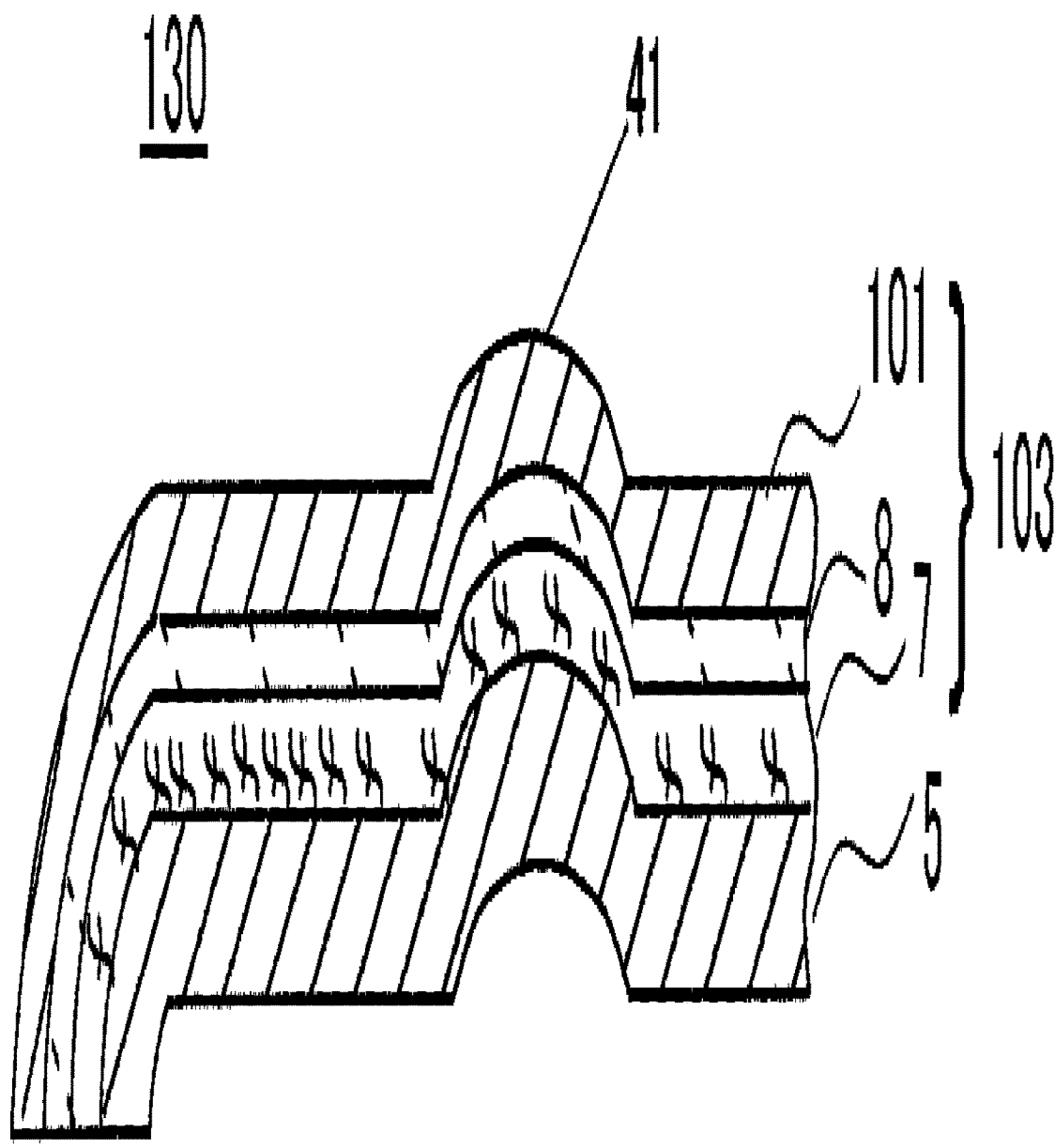

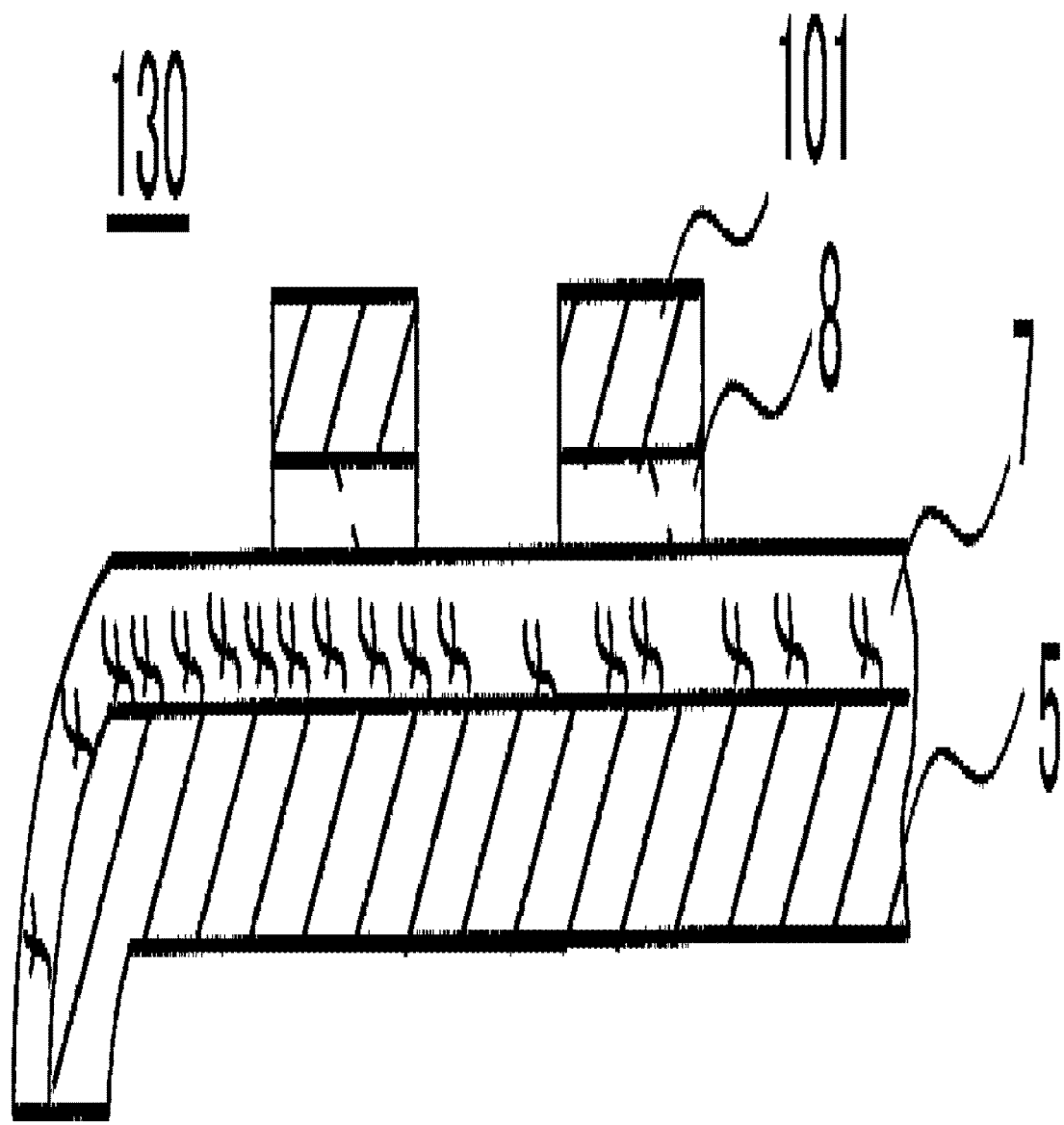

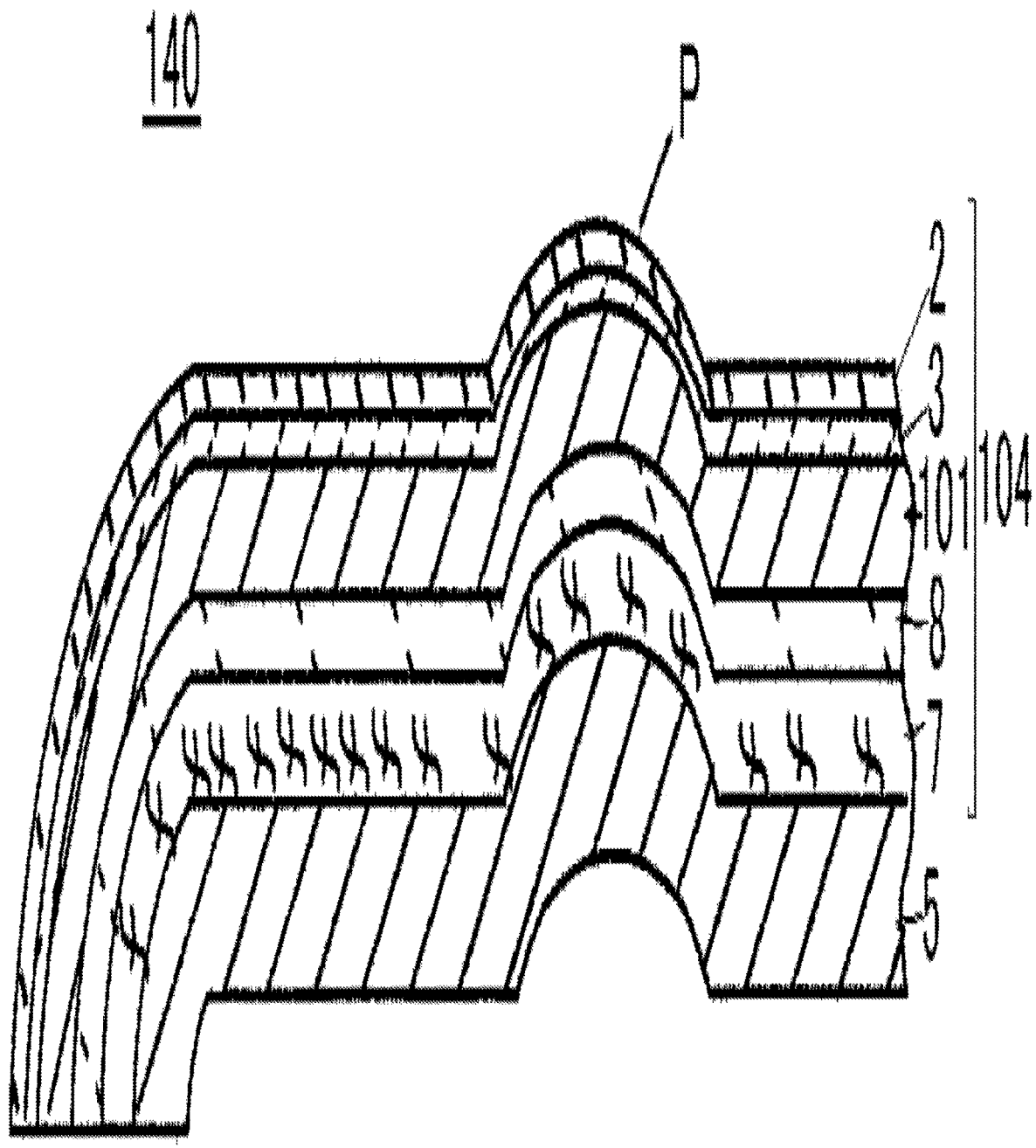

fig.26
(a)
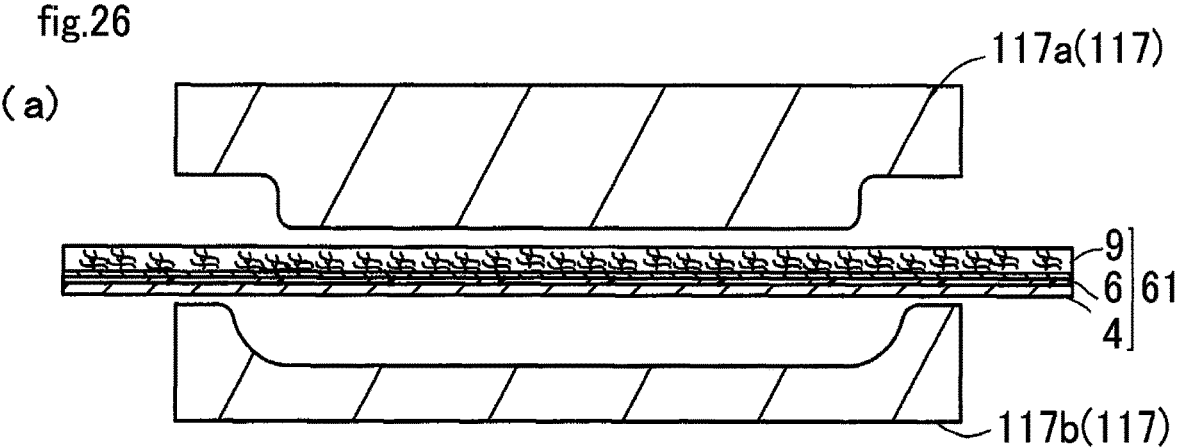
(b)
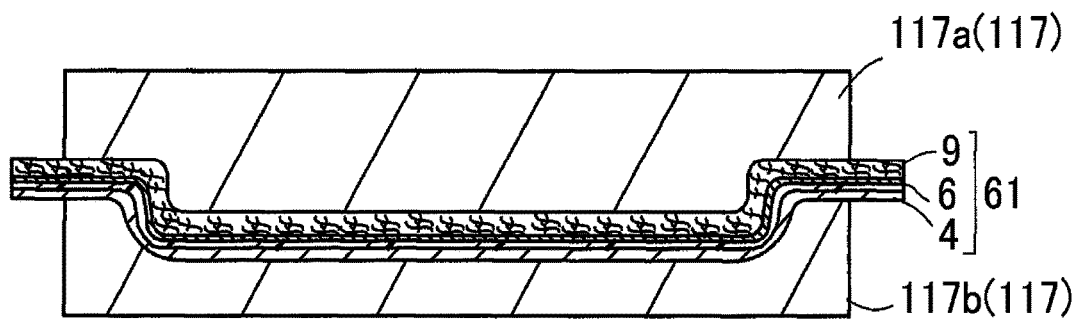
(c)
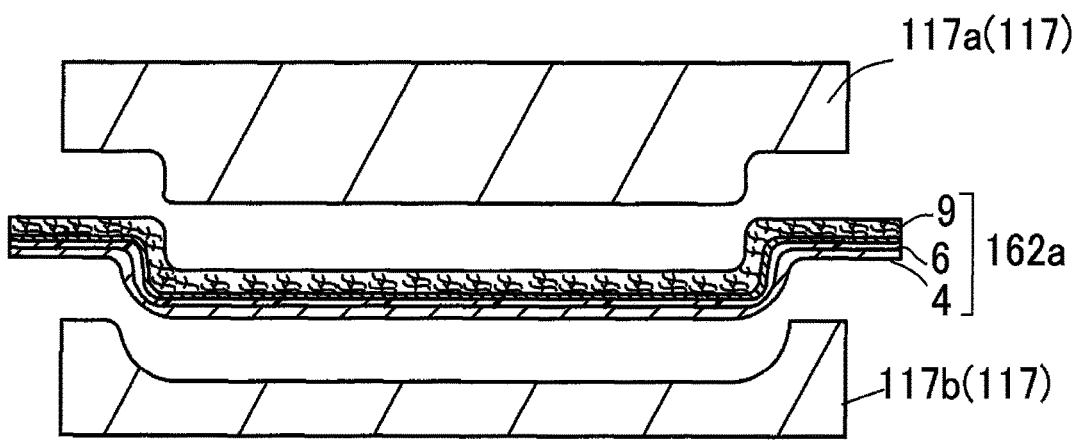
(d)
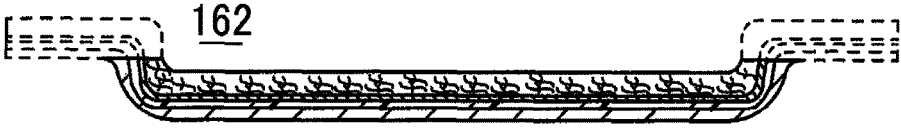

fig.28 162
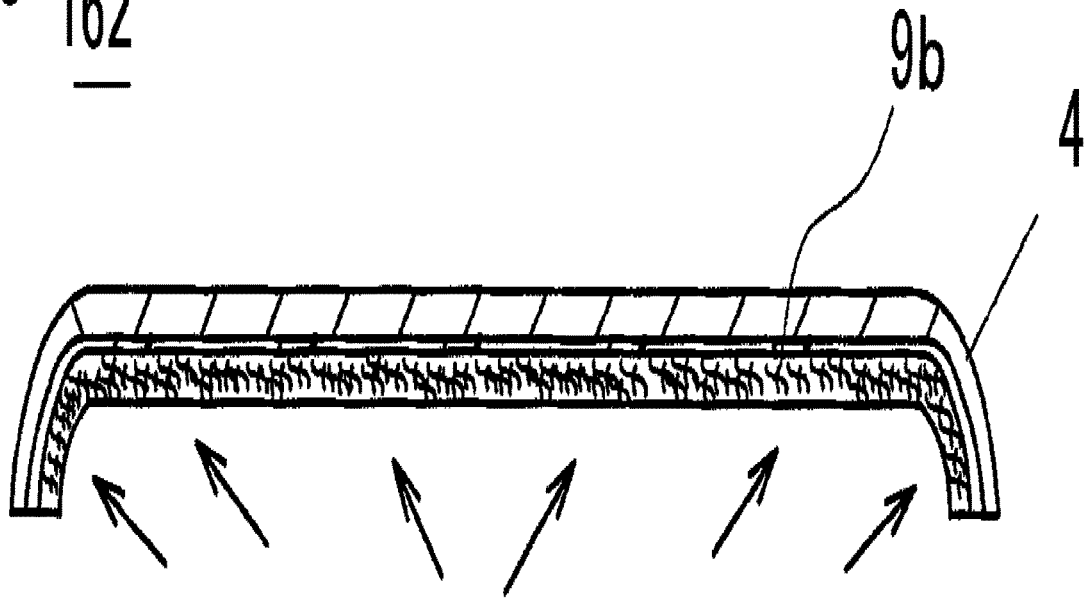
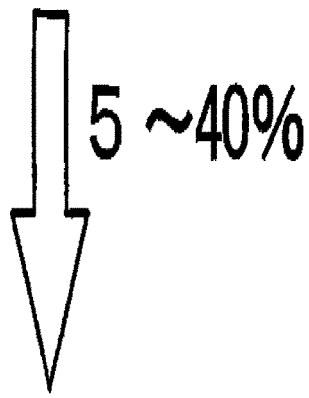
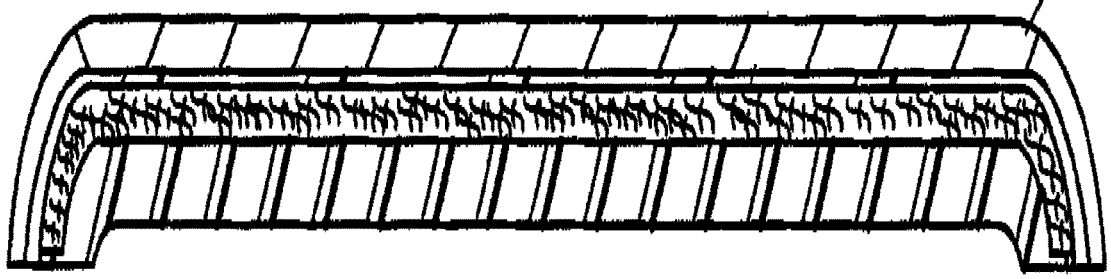

TEXTILE-LIKE IN-MOLD SHEET, PRODUCTION METHOD OF THE SAME, PREFORM MOLDED BODY, TEXTILE-LIKE RESIN MOLDED BODY, AND PRODUCTION METHOD OF THE SAME

TECHNICAL FIELD

The present invention relates to a textile-like resin molded body having a textile-like appearance, an in-mold sheet for producing the same, a preform molded body thereof, and a production method of the same.

BACKGROUND ART

Decorative molded bodies having a textile-like appearance are known as the casings of mobile phones, mobile devices and home electrical appliances, the interior parts of vehicles, aircrafts and the like, and the exterior members of building materials, articles of furniture and the like. Note that "textile-like" refers to an appearance that looks as if it is formed by a fiber material such as a woven fabric, a knitted fabric, a cloth, a non-woven fabric, or an artificial leather.

For example, PTL 1 below discloses an injection-molded body including a decorating portion on the surface of a decorated body thereof. Specifically, an injection-molded body is disclosed in which the decorating portion is formed by fusing a decorating material to the surface of a decorated body by in-molding, and the decorating material includes a base material film made of a synthetic resin and a fiber-containing textile material bonded thereto.

For example, PTL 2 below discloses a technique in which a textile material is provided in a tensioned state over a mold cavity, and subsequently a molten resin is pressure-injected into the cavity, thereby causing the molten resin to permeate into the decorative material to laminate and pressure-bond the two materials in an anchored state. Also, PTL 2 discloses that the bonding strength between the decorative material and the resin molded body in this decorative molded body was increased by using, at the time of molding, a cloth-like decorative material having air-permeable fine pores through which the molten resin material was permeable in an anchored state, and bonding the decorative material to the resin molded body in an anchored state to laminate and pressure-bond them.

For example, PTL 3 below discloses a decorative molded body that is a housing having a textile/resin laminate structure including a transparent acrylic film layer, a textile layer bonded to the transparent acrylic film layer via an adhesive, and a base resin layer that is fixed to the textile layer while spreading into the gaps between fibers of the textile layer.

PTL 4 below discloses a method in which a thermally compressed body formed of a textile layer having an A-PET sheet thermally compressed on one side thereof is in-molded, with the textile layer facing upward.

There is also a conventionally known exterior member that is made of a textile-like resin molded body obtained by manually attaching a lace knitted textile material or a grid-patterned textile material to the outer surface of a resin molded body.

CITATION LIST

Patent Literatures

[PTL 1] Japanese Laid-Open Patent Publication No. 2010-36366
[PTL 2] Japanese Laid-Open Patent Publication No. 2005-47161
[PTL 3] WO 2012/105664A
[PTL 4] WO 2012/105665A

SUMMARY OF INVENTION

Technical Problem

There have been several problems associated with molding of the above-described textile-like resin molded body. For example, there is a problem in that a molten resin is solidified in a state in which the resin has permeated to the surface of the textile layer by the pressure applied from the molten resin during molding, and therefore, the textile material is embedded in the molded body to compromise the fiber texture, resulting in the textile layer having a hard resin-like texture. There is also a problem in that the contraction of the molten resin caused by cooling and solidifying the resin that has permeated into the textile material causes creasing, pattern distortion, and the like on the textile material. Furthermore, there is also a problem in that the direct contact between the textile material and the molten resin causes thermal degradation of the textile material.

Solution to Problem

An aspect of the present invention relates to a textile-like in-mold sheet that is to be integrated with a resin molded body molded by injection of a molten resin by in-molding, including: a first surface that will serve as a side to be integrated with the resin molded body; and a second surface that will serve as a back side of the first surface, wherein the textile-like in-mold sheet includes at least a fiber sheet layer, a first adhesive layer, and a textile material layer, in this order from the first surface toward the second surface.

Another aspect of the present invention relates to a textile-like in-mold sheet that is to be integrated with a resin molded body molded by injection of a molten resin by in-molding, including: a first surface that is to be integrated with the resin molded body; and a second surface that will serve as a back side of the first surface, wherein the textile-like in-mold sheet includes at least a textile material layer and a temporary surface protection layer temporarily bonded to the textile material layer, in this order from the first surface toward the second surface.

Advantageous Effects of Invention

According to the present invention, it is possible to obtain a textile-like resin molded body in which a textile material maintaining excellent texture and appearance is disposed on a surface layer thereof.

BRIEF DESCRIPTION OF DRAWINGS

FIG. 14B is a schematic partial cross-sectional view of the textile-like resin molded body 130, taken along the line A-A' in FIG. 14A.

FIG. 14C is a schematic partial cross-sectional view of the textile-like resin molded body 130, taken along the line B-B' in FIG. 14A

FIG. 18B is a schematic partial cross-sectional view of the textile-like resin molded body 140, taken along the line A-A' in FIG. 18A.

FIG. 26 is a schematic cross-sectional view illustrating steps of preform molding according to the seventh embodiment.

FIG. 28 is an explanatory diagram for illustrating a change in the area of a decorative surface during in-molding according to the seventh embodiment.

DESCRIPTION OF EMBODIMENTS

The following describes preferred embodiments of a textile-like in-mold sheet (hereinafter also simply referred to as "in-mold sheet"), a preform molded body, and a textile-like resin molded body according to the present invention.

First Embodiment

A first embodiment will be described below with reference to the drawings.

Figure 1:
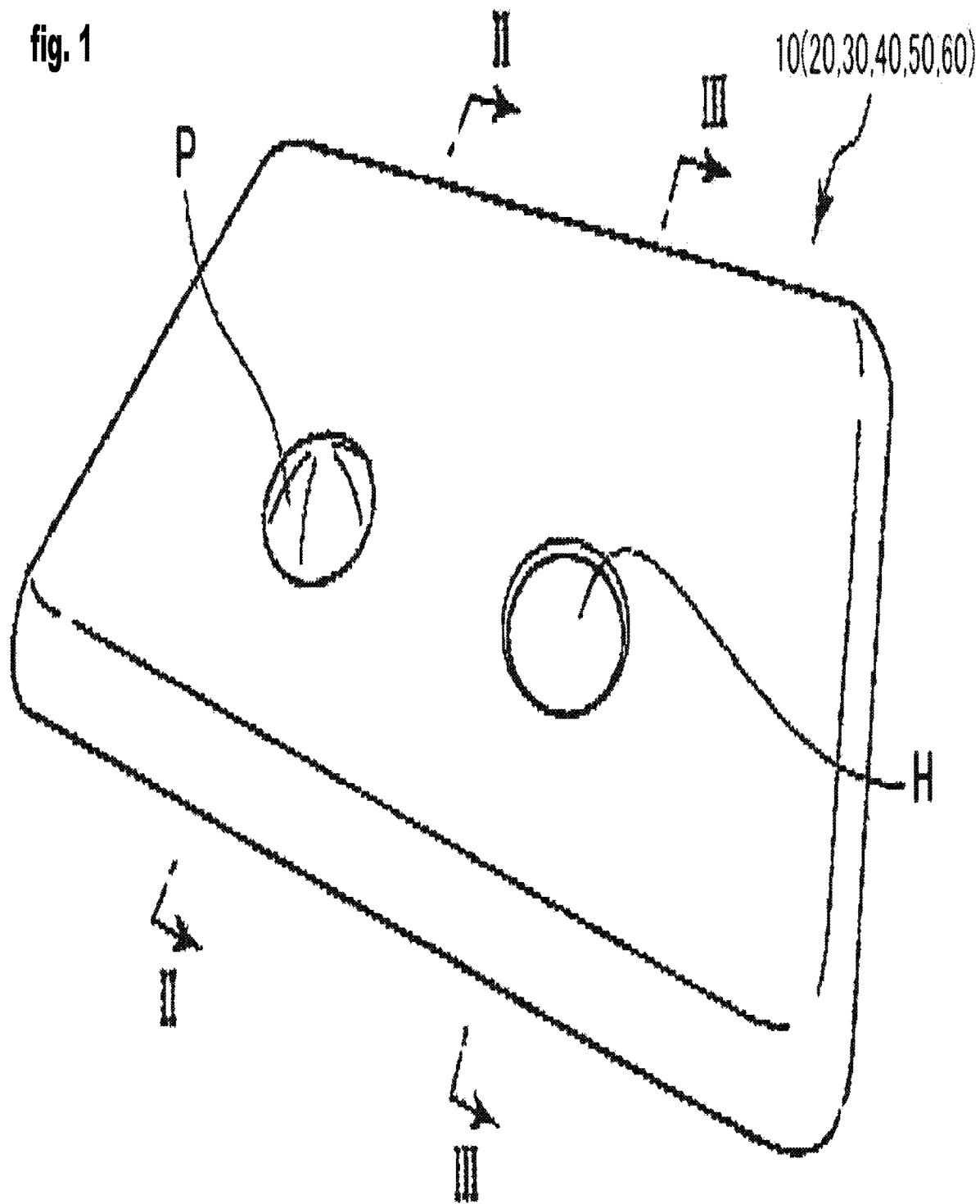
FIG. 1 is a schematic perspective view of a textile-like resin molded body (housing) described in first to sixth embodiments.
Figure 2:
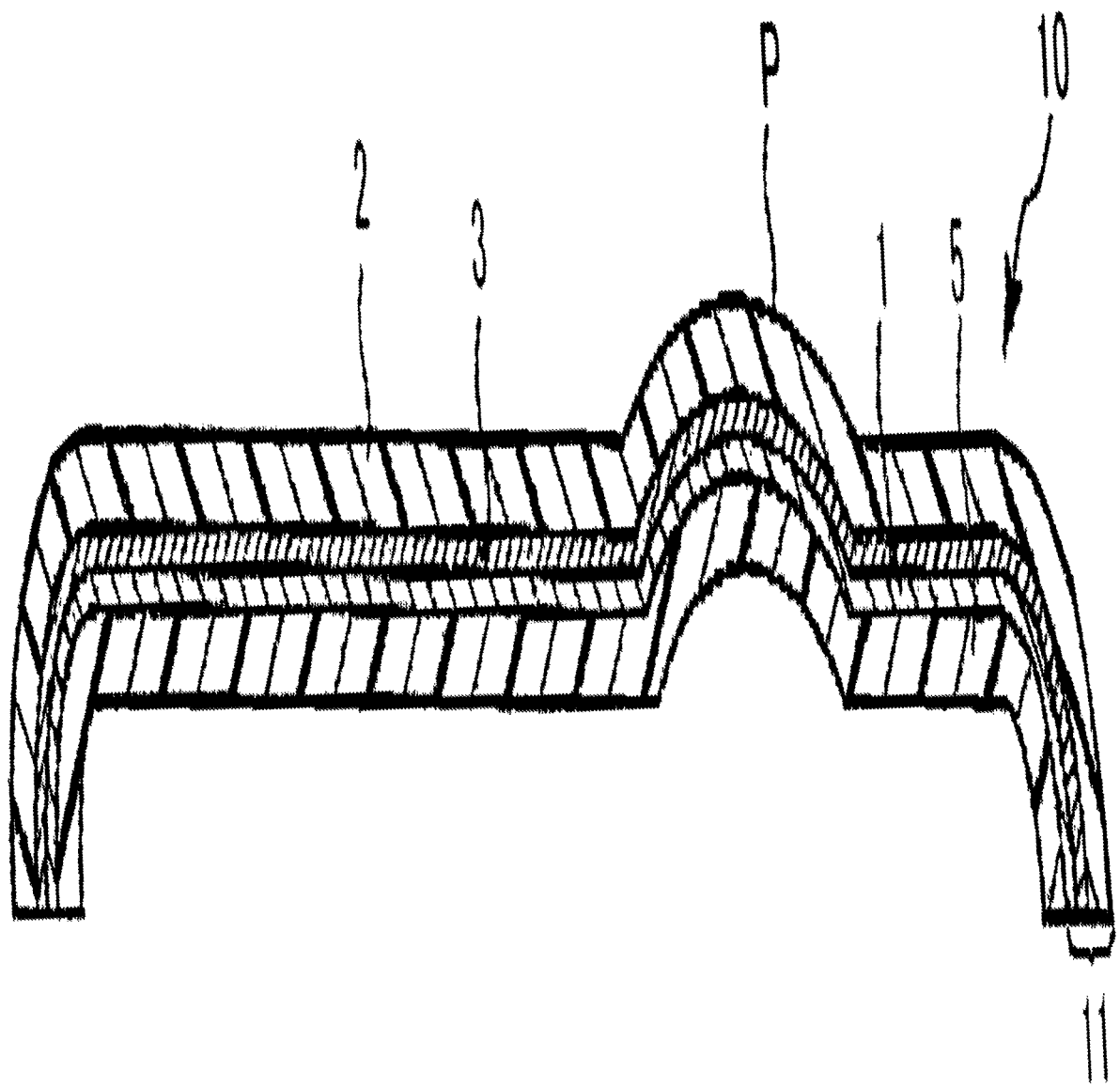
FIG. 2 is a schematic cross-sectional view of a textile-like resin molded body 10 according to the first embodiment, taken along the line II-II' in FIG. 1.

FIG. 1 is a schematic perspective view of a textile-like resin molded body (housing) 10 according to the first embodiment. In FIG. 1, the textile-like resin molded body 10 has a protrusion P and an opening H on its bottom portion having an inverted tray structure. FIG. 2 is a schematic cross-sectional view taken along the line II-II' in FIG. 1, and FIG. 3 is a schematic cross-sectional view taken along the line III-III' in FIG. 1.

Figure 3:
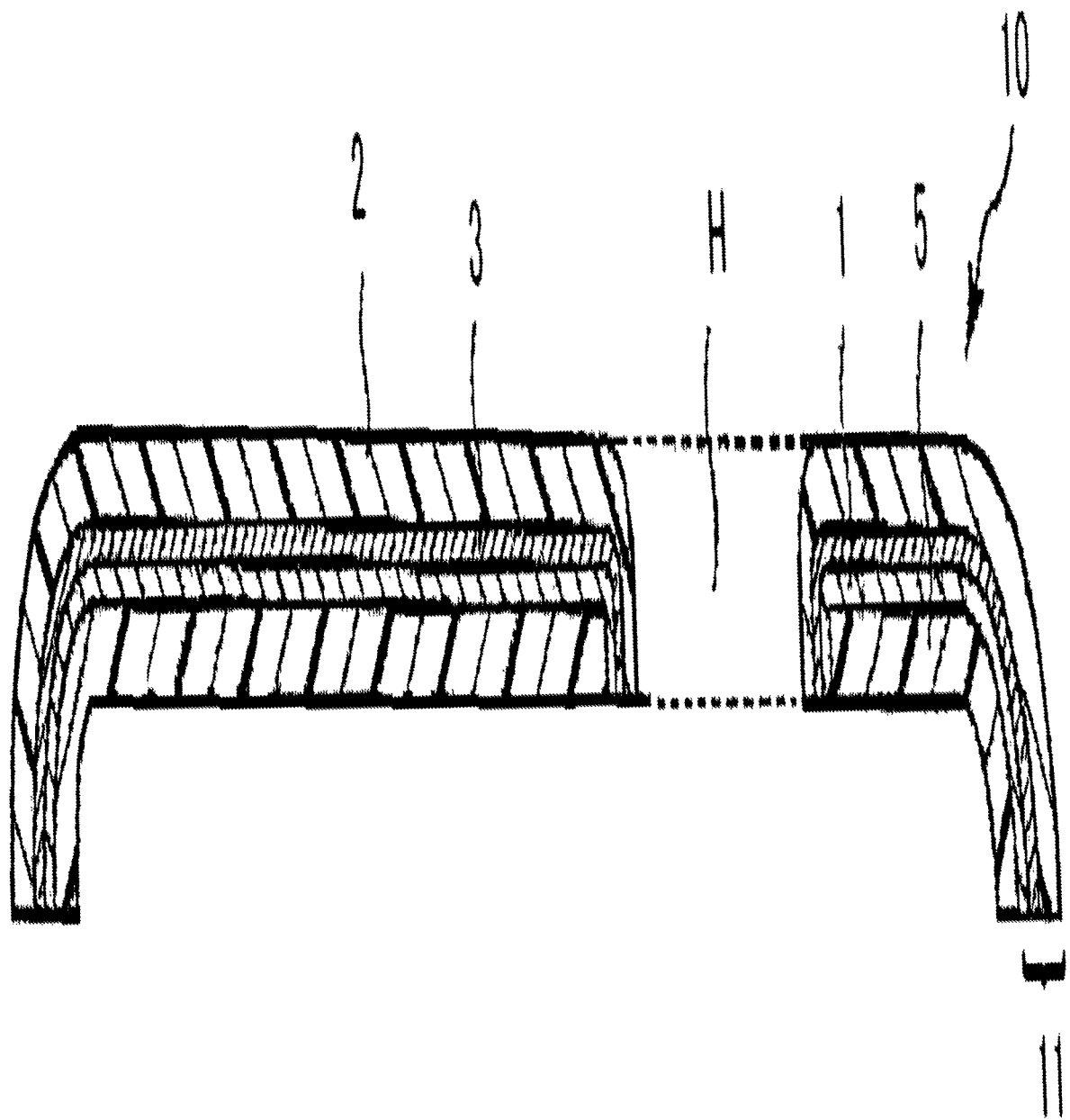
FIG. 3 is a schematic cross-sectional view of the textile-like resin molded body 10 according to the first embodiment, taken along the line III-III' in FIG. 1.

As shown in FIGS. 2 and 3, the textile-like resin molded body 10 includes a surface protection layer 2, an adhesive layer (second adhesive layer) 3, a textile material layer 1, and a resin molded body 5 laminated in this order from a second surface side toward a first surface side, provided that the first surface is a surface integrated with the resin molded body 5 and the second surface is a surface that will serve as the outer surface that is the back side of the first surface. An in-mold sheet 11 is a laminated body in which the surface protection layer 2 and the textile material layer 1 are bonded with the adhesive layer 3. The surface protection layer 2 is a surface resin layer. The textile-like resin molded body 10 is obtained by in-molding the in-mold sheet 11 or a preform molded body 12 obtained by shaping the in-mold sheet 11 into a three-dimensional shape in advance.

The textile material is a continuous or discontinuous sheet-like material containing a fiber material. Specific examples include a woven fabric such as those having a plain weave structure, a twill weave structure, and a sateen weave structure, a knitted fabric such as a lace knit fabric and a stockinette knit fabric, a felt, a non-woven fabric, a synthetic leather, and an artificial leather. The textile material may be a fiber material that has been dyed with a dye or a fiber material having a pattern or a design printed thereon. The textile material provides a design quality, and reinforces the textile-like resin molded body. As the fiber, it is possible to use various types of synthetic fibers, natural fibers, and carbon fibers without any particular limitation. The thickness of the textile material can be selected according to the application without any particular limitation, but, in general, a thickness of about 100 to 5000 µm is preferable.

A textile material is thermally or mechanically affected by a mold during in-molding, and tends to experience creasing and pattern distortion. A textile material protected by the surface protection layer is supported on the surface protection layer, and is therefore difficult to undergo positional displacement, creasing, or pattern distortion during molding. In addition, abrasion resistance is imparted to the surface of the textile material after in-molding. Note that since the surface protection layer is formed before in-molding, it is not necessary to perform any troublesome step after in-molding, such as application of a surface coating.

The surface protection layer is formed by bonding a resin film to the surface of the textile material. As the resin film for forming the surface protection layer (hereinafter also simply referred to as "protection film"), it is preferable to use a resin film that is thermally deformed so as to conform to the shape of the mold during preform molding without reducing the design quality of the textile material, and has a lower heat softening temperature than that of the resin injected during in-molding.

As the protection film, a film of a transparent (meth) acrylic resin is particularly preferable from the viewpoint of providing well-balanced adhesion and abrasion resistance. Note that (meth)acrylic means methacrylic or acrylic. A top coating having chemical resistance or scratch resistance may be formed on the protection film. From the viewpoint of providing excellent flexibility, it is preferable that the transparent (meth)acrylic resin contains an elastomer component or an elastomer unit such as an acrylic rubber, a nitrile rubber, and an isoprene rubber.

As the transparent (meth)acrylic resin containing an elastomer unit, a copolymer of elastomer units (e.g., trade name "KURARITY" manufactured by KURARAY CO., LTD.), a dispersion in which an elastomer component is dispersed in an acrylic resin (e.g., trade name "TECHNOLLOY" manufactured by Sumitomo Chemical Co., Ltd.) are available as commercial products. Note that the trade name "KURARITY" manufactured by KURARAY CO., LTD. is an acrylic thermoplastic elastomer containing a block copolymer of a methyl methacrylate (MMA) unit and a butyl acrylate (BA) unit serving as an elastomer unit.

The thickness of the protection film is preferably about 10 to 400 μm, more preferably about 15 to 300 μm, particularly preferably about 50 to 200 μm. When the protection film is too thick, the shaping properties during preform molding or in-molding are reduced, and whitening tends to occur during preform molding. Additionally, the resulting textile-like resin molded body tends to provide a resin-like tactile impression. When the protection film is too thin, a sufficient effect tends not to be obtained.

The protection film is bonded to the surface of the textile material. As an adhesive for bonding the textile material and the protection film (hereinafter also referred to as "second adhesive"), an adhesive that is easily heat-stretched during preform molding and in-molding is used. Examples of the easily heat-stretchable adhesive include adhesives having a softening temperature in the range of 50 to 250° C., more preferably 70 to 220° C. Specific examples of the second adhesive include polyvinyl acetal adhesives (PCVs) such as a polyvinyl butyral (PVB) adhesive; polyvinyl alcohol adhesives; ethylene adhesives such as an ethylene/vinyl acetate copolymer adhesive and an ethylene/acrylic copolymer adhesive; propylene adhesives such as a propylene/l-butene copolymer adhesive, a propylene/isobutene copolymer adhesive and a styrene/propylene/isobutene copolymer adhesive; isoprene adhesives such as a styrene/isoprene copolymer adhesive, a styrene/isoprene/isobutene copolymer adhesive and a styrene/isoprene/butene copolymer adhesive; and vinyl chloride adhesives. Among these, polyvinyl acetal adhesives such as a polyvinyl butyral (PVB) adhesive are particularly preferable in that they are easily heat-stretchable and can maintain a low melt viscosity that contributes to less residual voids. The polyvinyl acetal adhesives include a polyvinyl acetal resin obtained by acetalization of polyvinyl alcohol (PVA) with aldehyde such as formaldehyde or butyraldehyde. Preferably, the PVA has a saponification degree of 80.0 to 99.9 mol %. The average degree of polymerization of the PVA is preferably 500 to 3000, more preferably 1000 to 2000. When the average degree of polymerization of the PVA is too low, the viscosity is excessively lowered during in-molding, which may cause leaking of the PVA from the laminated body. On the other hand, when the average degree of polymerization of the PVA is too high, the viscosity tends to remain high during in-molding, making air bubbles difficult to escape.

A plasticizer may be blended in the second adhesive for the purpose of imparting flexibility. Specific examples of the plasticizer include monobasic organic acid esters such as a triethylene glycol di 2-ethylhexyl acid ester, a triethylene glycol di 2-ethyl butyric acid ester and a triethylene glycol di n-octyl acid ester; polybasic organic acid esters such as a dibutyl sebacic acid ester and a dioctyl azelaic acid ester; and polyglycerin derivatives such as a polyoxy propylene polyglyceryl ether and a polyethylene glycol polyglyceryl ether.

Figure 4:
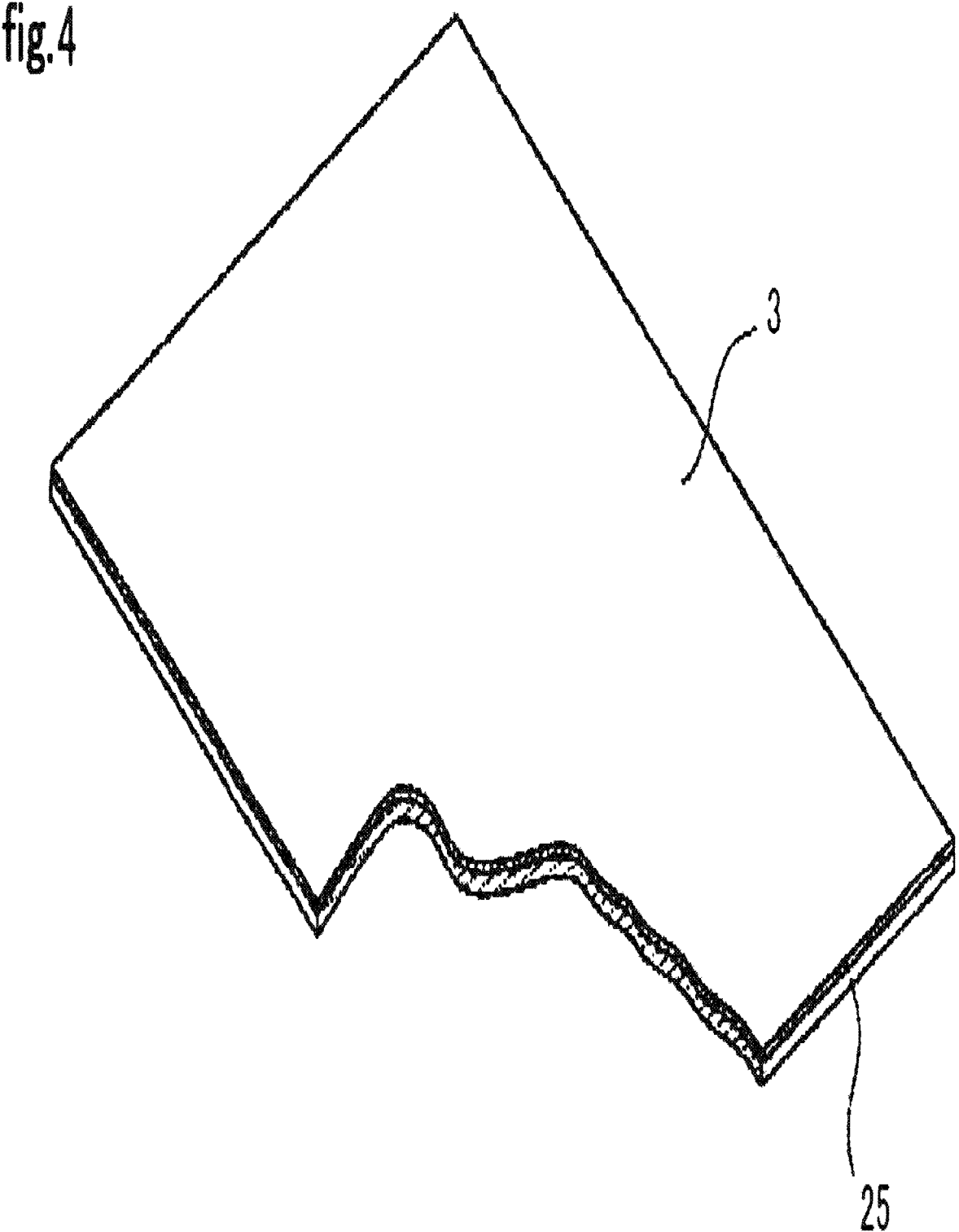
FIG. 4 is an explanatory diagram illustrating an adhesive layer-equipped protection film.
Figure 5:
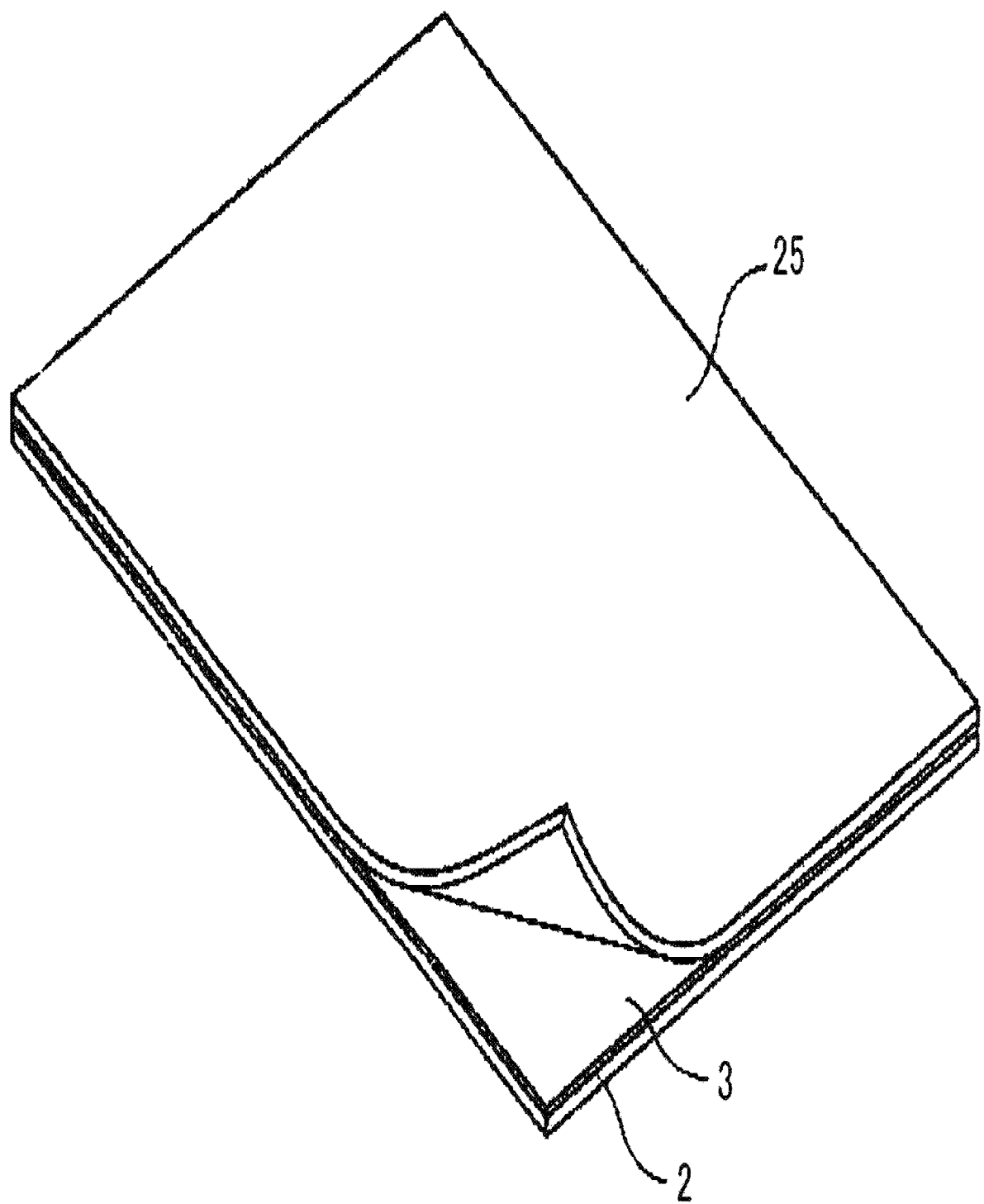
FIG. 5 is an explanatory diagram illustrating the adhesive layer-equipped protection film.

Various known methods can be used as the method for bonding the textile material and the protection film without any particular limitation. Examples thereof include a method involving applying a solution of the second adhesive or the second adhesive onto the protection film by knife coating, gravure printing, or the like, and subsequently laminating and pressing the resultant with the textile material, and a method involving forming the second adhesive into a film with a predetermined thickness, and pressing the textile material and the protection film with the film inserted therebetween. In particular, as a specific example of the latter method, the following method can be used. As shown in FIG. 4, a solution of the second adhesive or the second adhesive is applied to the mold release surface of a release paper 25 by knife coating, gravure printing, or the like. Thereby, an adhesive layer 3 having a predetermined thickness is formed. Then, as shown in FIG. 5, the adhesive layer 3 formed on the release paper 25 is attached to a protection film 2. Then, the release paper 25 is removed from the resulting laminated body, and thereby, an adhesive layer-equipped protection film, which is a laminated body of the protection film 2 and the adhesive layer 3 having a uniform thickness, is obtained. The adhesive layer 3 of the adhesive layer-equipped protection film thus obtained is attached to the surface of a textile material 1. Thus, an in-mold sheet 11 is obtained. With this method, the adhesive layer 3 having a uniform thickness can be formed without any residual void on the protection film 2. When there is any residual void on the adhesive layer 3, the adhesion strength may be reduced, or the light transmittance may be lowered.

An example of the method for forming the adhesive layer 3 on the release paper will be described below. Polyvinyl acetal is dissolved in a solvent of an alcohol or a ketone at a concentration of 25% or less, to prepare an adhesive solution. Then, the adhesive solution is applied onto a release paper. The adhesive solution is applied such that an adhesive layer having a predetermined thickness (e.g., 100 μm) is formed by repeating the step of forming a coating with a thickness of 5 to 50 μm and subsequently drying the coating at 60 to 100° C. When the thickness of the adhesive solution applied in one application is too large, voids tend to remain. When the concentration of polyvinyl acetal relative to the solvent is too high, the viscosity of the adhesive solution is increased, resulting in a reduction in coatability.

The thickness of the adhesive layer 3 is preferably about 25 to 200 μm, more preferably about 40 to 150 μm. The total thickness of the surface protection layer 2 and the adhesive layer 3 is preferably about 40 to 450 μm, more preferably 60 to 350 μm.

The thickness of the in-mold sheet 11 thus obtained may vary depending on the thickness, the design and the application of the textile material layer. Specifically, in the case of using a thin textile material, the thickness is preferably about 300 to 1500 μm, more preferably about 500 to 1200 μm.

Figure 6:
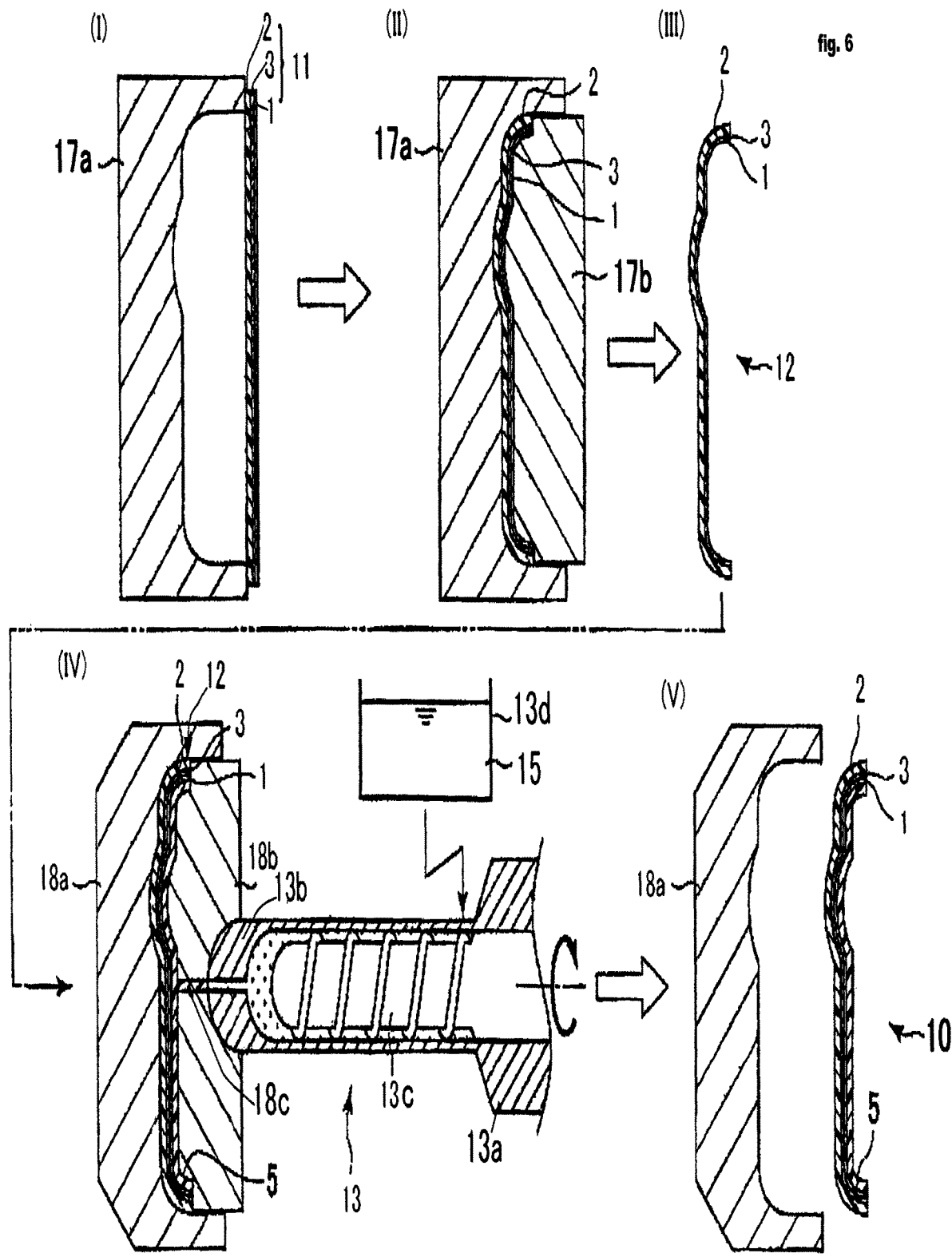
FIG. 6 is an explanatory diagram illustrating a production method according to the first embodiment.

Next, a production method of a textile-like resin molded body 10 using the in-mold sheet 11 according to the first embodiment will be described with reference to FIG. 6.

In the production method of the textile-like resin molded body 10 according to the first embodiment, preform molding of the in-mold sheet 11 is performed first. As shown in step (I), the in-mold sheet 11 is placed such that the surface protection layer 2 opposes a female mold 17a of a preform mold (press mold) 17. The in-mold sheet 11 may be cut into a predetermined shape in advance. Next, as shown in step (II), the in-mold sheet 11 placed on the female mold 17a is pushed into the recess of the female mold 17a by clamping the female mold 17a and the male mold 17b together by a pressing machine. As a result, a preform molded body 12 that has been provided with the shape of the in-mold sheet 11 is obtained. Then, the female mold 17a and the male mold 17b are separated from each other, and the preform molded body 12 as shown in step (III) is taken out. Burrs or any unnecessary portion may be removed from the preform molded body 12 by using a laser cutter or a cutting unit (cutting mold) as necessary. Note that although the present embodiment shows preform molding by means of press molding as an example, it is possible to use other conventionally known preform molding methods such as vacuum molding, pressure molding, and vacuum pressure molding in place of press molding.

Next, in-molding is performed using the preform molded body 12. As shown in step (IV), injection molding is performed by using an injection molding machine 13 including an in-molding mold 18 composed of a movable mold 18a and a fixed mold 18b. Specifically, the preform molded body 12 is housed such that the surface protection layer 2 opposes the recess of the cavity of the movable mold 18a, and the movable mold 18a and the fixed mold 18b are clamped together. Then, a cylinder 13a of the injection molding machine 13 is moved forward such that a nozzle portion 13b disposed at the distal end of the cylinder 13a is abutted against a resin inlet 18c of the in-molding mold 18. Then, a screw 13c is rotated so as to perform metering while melting a pellet-shaped resin 15 stored in a hopper 13d inside the cylinder 13a. Then, after metering, the molten resin 15 is injected into the cavity of the in-molding mold 18. The molten resin 15 enters the voids between the fibers of the textile material layer 1 by injection. As a result of the molten resin 15 entering the air-permeable textile material layer 1, the bonding strength between the textile material layer 1 and the resin molded body 5 is increased by an anchor effect.

As the resin used for injection molding, it is possible to use various thermoplastic resins, including, for example, ABS resins, polycarbonate (PC) resins, alloy resins of PC with ABS, polyolefin resins such as polypropylene, polymethacrylic (PMMA) resins, polyester resins such as polyethylene terephthalate (PET) and polybutylene terephthalate (PBT), and various polyamide resins, without any particular limitation. For example, resins having excellent impact resistance such as ABS resins and PC resins are preferably used as the resin for the casings of mobile phones, mobile devices, home electrical appliances, and the like. Polyolefin resins such as polypropylene are preferably used as the resin for applications that require weight reduction (e.g., vehicle interior parts).

As the conditions for the injection molding, conditions (resin temperature, mold temperature, injection pressure, injection speed, holding pressure after injection, cooling time) that allow the resin to flow to the flow terminal end may be selected as appropriate according to the melting point and the melt viscosity of the resin, the shape of the molded body, and the resin thickness.

Then, after the resin 15 has been cooled and solidified inside the mold 18, the movable mold 18a and the fixed mold 18b are separated from each other. Thus, as shown in step (V), a textile-like resin molded body 10 in which the preform molded body 12 and the resin molded body 5 are integrated with each other is taken out. When the molten resin 15 is cooled and solidified, the textile material 1 and the resin molded body 5 undergo contraction, and the textile material 1 and the resin molded body 5 are more firmly integrated. Thus, a textile-like resin molded body 10 is obtained.

The thickness of the resin molded body is not particularly limited, but is preferably about 0.5 to 10.0 mm, more preferably about 0.8 to 5.0 mm in the case of using the resin molded body as a housing, for example. In the present embodiment, a thickness of 1.2 mm is used.

Second Embodiment

Figure 7:
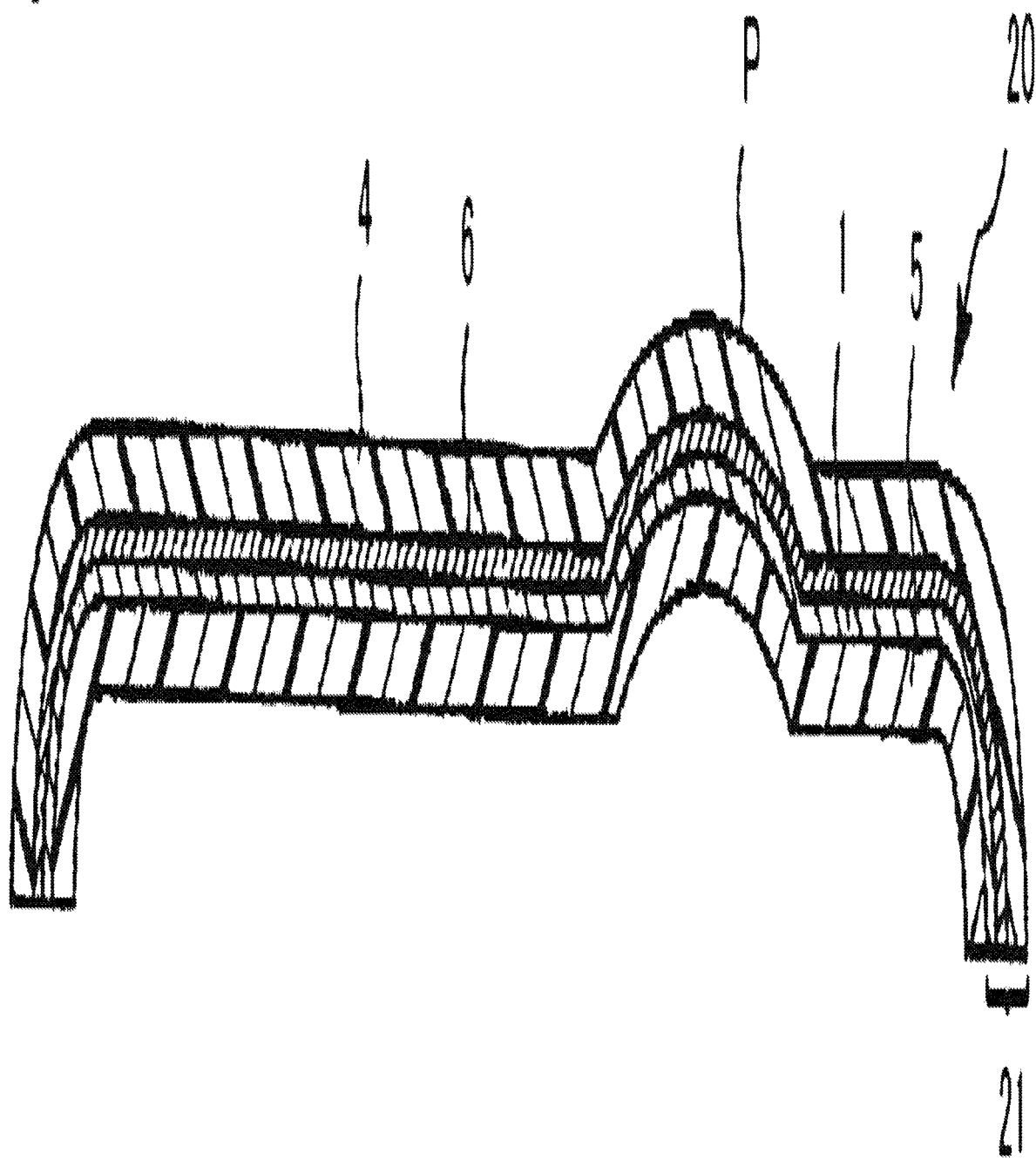
FIG. 7 is a schematic cross-sectional view of a textile-like resin molded body 20 according to the second embodiment, taken along the line II-II' in FIG. 1.
Figure 8:
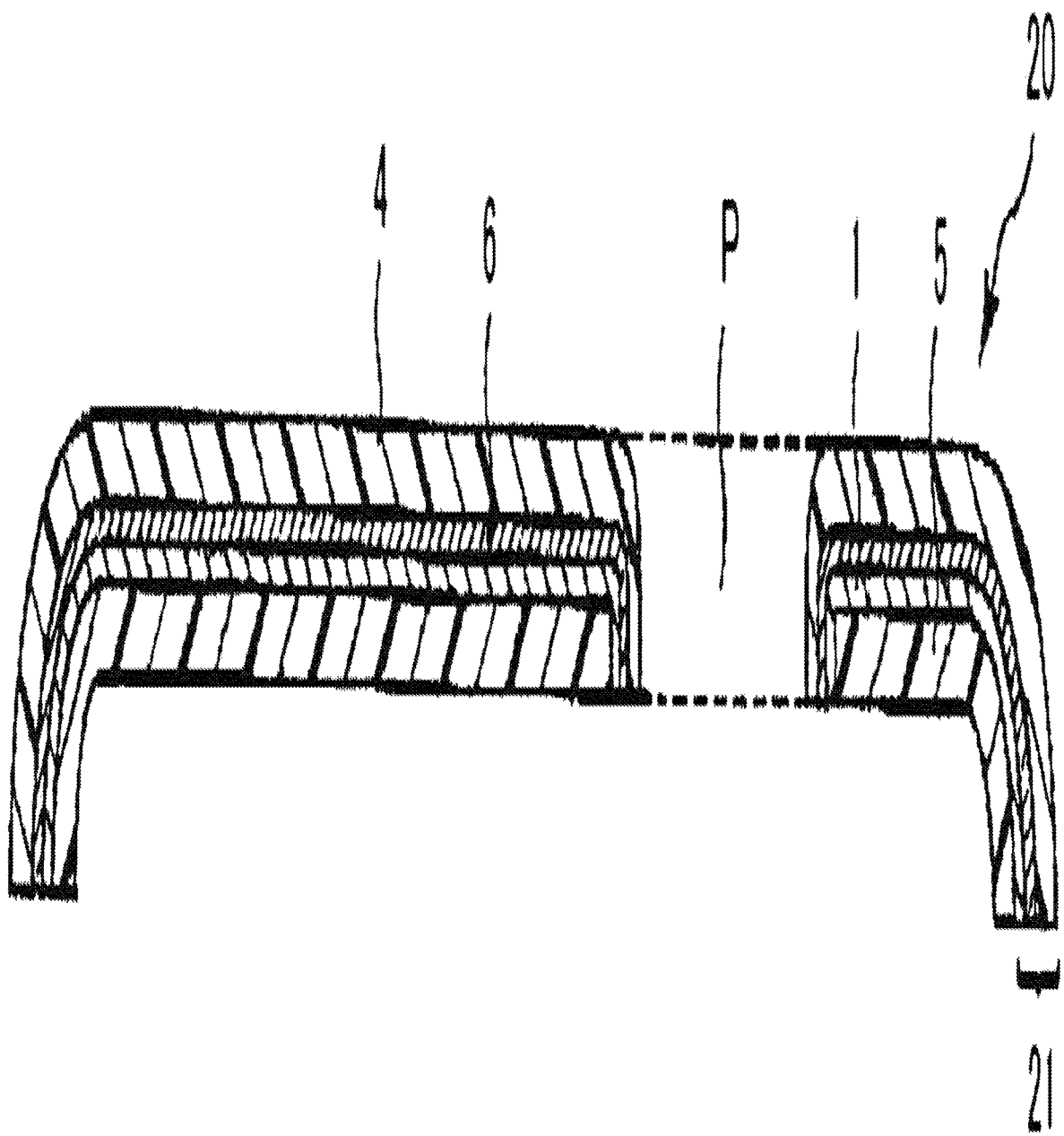
FIG. 8 is a schematic cross-sectional view of the first embodiment, taken along the line III-III' in FIG. 1.

FIG. 1 is a schematic perspective view of a textile-like resin molded body (housing) 20 according to a second embodiment. FIG. 7 is a schematic cross-sectional view taken along the line II-II' in FIG. 1, and FIG. 8 is a schematic cross-sectional view taken along the line III-III' in FIG. 1. Note that those elements denoted by the same reference numerals as the reference numerals shown in the first embodiment denote the same elements as those described in the first embodiment.

As shown in FIGS. 7 and 8, the textile-like resin molded body 20 includes a temporary surface protection layer 4, an adhesive layer (temporary adhesive layer) 6, a textile material layer 1, and a resin molded body 5 laminated in this order from the second surface side toward the first surface side. An in-mold sheet 21 is a laminated body in which the temporary surface protection layer 4 and the textile material layer 1 are bonded with the adhesive layer 6. The temporary surface protection layer 4 is a surface resin layer. The textile-like resin molded body 20 is obtained by in-molding the in-mold sheet 21 or a preform molded body 22 obtained by shaping the in-mold sheet 21 into a three-dimensional shape in advance. The temporary surface protection layer 4 and the adhesive layer 6 are provisional surface protection layers that are removed from the surface of the textile material layer 1 after in-molding.

A textile material is thermally or mechanically affected by a mold during in-molding, and tends to experience creasing and pattern distortion. A textile material protected by the temporary surface protection layer is supported on the temporary surface protection layer, and is therefore difficult to undergo positional displacement, creasing, or pattern distortion during molding. In addition, by removing the temporary surface protection layer and the temporary adhesive layer after in-molding, the textile material layer 1 maintaining a three-dimensional texture can be exposed.

The temporary surface protection layer is formed by bonding a resin film to the surface of the textile material. As the resin film for forming the temporary surface protection layer (hereinafter also referred to as "temporary protection film"), it is preferable to use a resin film that can be removed after in-molding, is thermally deformed so as to conform to the shape of the mold during preform molding, and has a heat softening temperature lower than that of the resin injected during in-molding.

Examples of the temporary protection film include polyester resin films such as polyethylene terephthalate (PET), polycarbonate films, and polyolefin films. From the viewpoint of the well-balanced heat stretchability and heat resistance, an amorphous PET film and a biaxially stretched PET film having a high crystallinity are particularly preferable.

The thickness of the temporary protection film is preferably about 50 to 350 µm, more preferably about 50 to 300 µm, particularly preferably about 50 to 200 µm. The preform moldability tends to be reduced when the temporary protection film is too thick, and a sufficient effect tends not to be obtained when the temporary protection film is too thin. The thickness of the temporary protection film may be adjusted as appropriate according to the type of the film.

Examples of the method for forming a removable temporary adhesive layer on the temporary protection film include a method involving bonding a removable adhesive sheet to the temporary protection film by using a hardly removable adhesive or pressure-sensitive adhesive, a method involving dry-laminating a removable adhesive sheet directly on the temporary protection film, and a method involving applying a liquid adhesive capable of forming a removable adhesive layer to the temporary protection film, and drying the liquid adhesive.

As the removable adhesive resin that forms the removable adhesive layer, any adhesive resin that can be stretched by heat and has excellent removability can be used without any particular limitation. Specific examples of the removable adhesive resin include polyvinyl acetal resins such as a polyvinyl alcohol (PVA) resin and a polyvinyl butyral (PVB) resin. Among these, the PVA resin is preferable in that it is softened by hot pressing while maintaining removability during preform molding, thus increasing the adhesion strength.

A plasticizer may be blended in the removable adhesive resin for the purpose of providing flexibility. Specific examples of the plasticizer include polyhydric alcohol compounds such as glycerin, diglycerin, propylene glycol and trimethylol propane; sugar alcohol compounds such as sorbitol and xylitol; and polyether compounds such as polyethylene glycol and polypropylene glycol.

Note that examples of the method for forming a temporary adhesive layer that uses a PVA resin include a method involving applying a solution of the PVA resin to the surface of the temporary protection film, followed by drying, and a method involving placing a PVA film on the surface of the temporary protection film, followed by pressure-bonding by a known process such as hot pressing. Alternatively, it is also possible to bond a PVA film and a temporary protection film with another pressure-sensitive adhesive or adhesive. Specific examples of the pressure-sensitive adhesive include acrylic resin pressure-sensitive adhesives, silicone pressure-sensitive adhesives, and rubber pressure-sensitive adhesives. It is preferable to use a method that uses a PVA film in that a temporary adhesive layer with a uniform thickness can be accurately formed in a simple manner. As the PVA film, for example, a PVA film (KURARAY POVAL film) manufactured by KURARAY CO., LTD. and a PVA film (SOLUBLON) manufactured by AICELLO CORPORATION are available as commercial products.

The thickness of the temporary adhesive layer that bonds the textile material and the temporary protection film is not particularly limited, but is preferably about 20 to 200 µm, more preferably about 25 to 150 µm.

Figure 9:
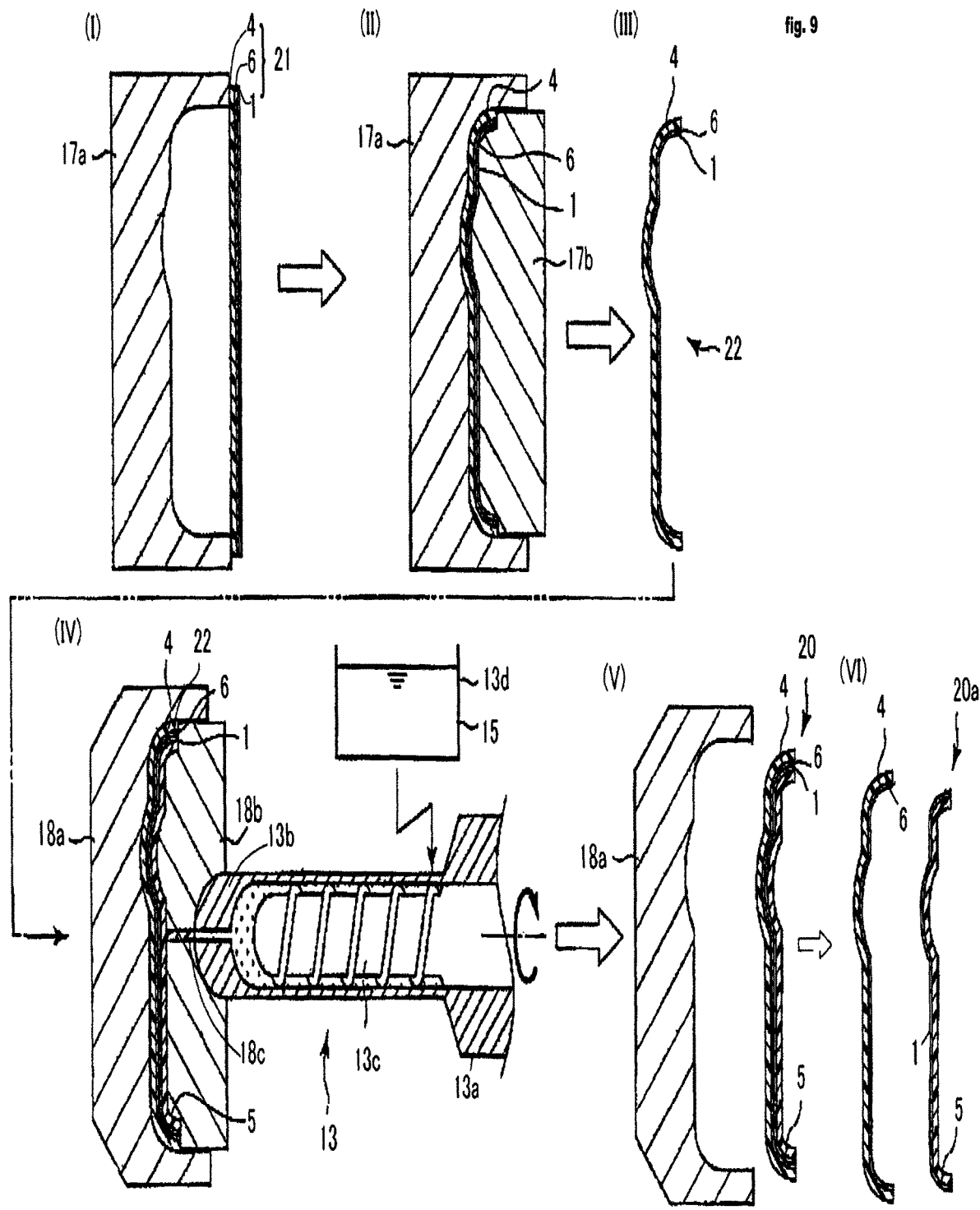
FIG. 9 is an explanatory diagram illustrating a production method according to the second embodiment.

Next, a production method of a textile-like resin molded body 20 that uses the in-mold sheet 21 according to the second embodiment will be described with reference to FIG. 9.

In the production method of the textile-like resin molded body 20 according to the second embodiment, preform molding of the in-mold sheet 21 is performed first. As shown in step (I), the in-mold sheet 21 is placed such that the temporary surface protection layer 4 opposes a female mold 17a of a preform mold (press mold) 17. The in-mold sheet 21 may be cut into a predetermined shape in advance. Next, as shown in step (II), the in-mold sheet 21 is pushed into the recess of the female mold 17a by clamping the female mold 17a and the male mold 17b together by a pressing machine. As a result, a preform molded body 22 that has been provided with the shape of the in-mold sheet 21 is obtained. Then, the female mold 17a and the male mold 17b are separated from each other, and the preform molded body 22 as shown in step (III) is taken out. Burrs or any unnecessary portion may be removed from the preform molded body 22 by using a laser cutter or a cutting unit (cutting mold) as necessary.

Next, in-molding is performed using the preform molded body 22. As shown in step (IV), injection molding is performed by using an injection molding machine 13 including an in-molding mold 18 composed of a movable mold 18a and a fixed mold 18b. Specifically, the preform molded body 22 is housed such that the temporary surface protection layer 4 opposes the recess of the cavity of the movable mold 18a, and the movable mold 18a and the fixed mold 18b are clamped together. Then, a cylinder 13a of the injection molding machine 13 is moved forward such that a nozzle portion 13b disposed at the distal end of the cylinder 13a is abutted against a resin inlet 18c of the in-molding mold 18. Then, a screw 13c is rotated so as to perform metering while melting a pellet-shaped resin 15 stored in a hopper 13d inside the cylinder 13a. Then, after metering, the molten resin 15 is injected into the cavity of the in-molding mold 18. The molten resin 15 enters the voids between the fibers of the textile material layer 1 by injection. As a result of the molten resin entering the air-permeable textile material layer 1, the bonding strength between the textile material layer 1 and the resin molded body 5 is increased by an anchor effect.

Then, after the resin 15 has been cooled and solidified inside the mold 18, the movable mold 18a and the fixed mold 18b are separated from each other. Thus, as shown in step (V), a textile-like resin molded body 20 in which the preform molded body 22 and the resin molded body 5 are integrated with each other is taken out. When the molten resin 15 is cooled and solidified, the textile material 1 and the resin molded body 5 undergo contraction, and the textile material 1 and the resin molded body 5 are more firmly integrated. Thus, a textile-like resin molded body 20 is obtained.

Then, as shown in step (VI), the temporary surface protection layer 4 and the second adhesive layer 6 are selectively removed from the textile-like resin molded body 20 after the second adhesive layer 6 has been solidified, and thereby, a textile-like resin molded body 20a including the textile material layer 1 on its surface is obtained. There is no particular limitation with respect to the removal of the temporary surface protection layer 4 and the second adhesive layer 6, and the removal may be performed, for example, manually or by using a dedicated removal facility.

Third Embodiment

Figure 10:
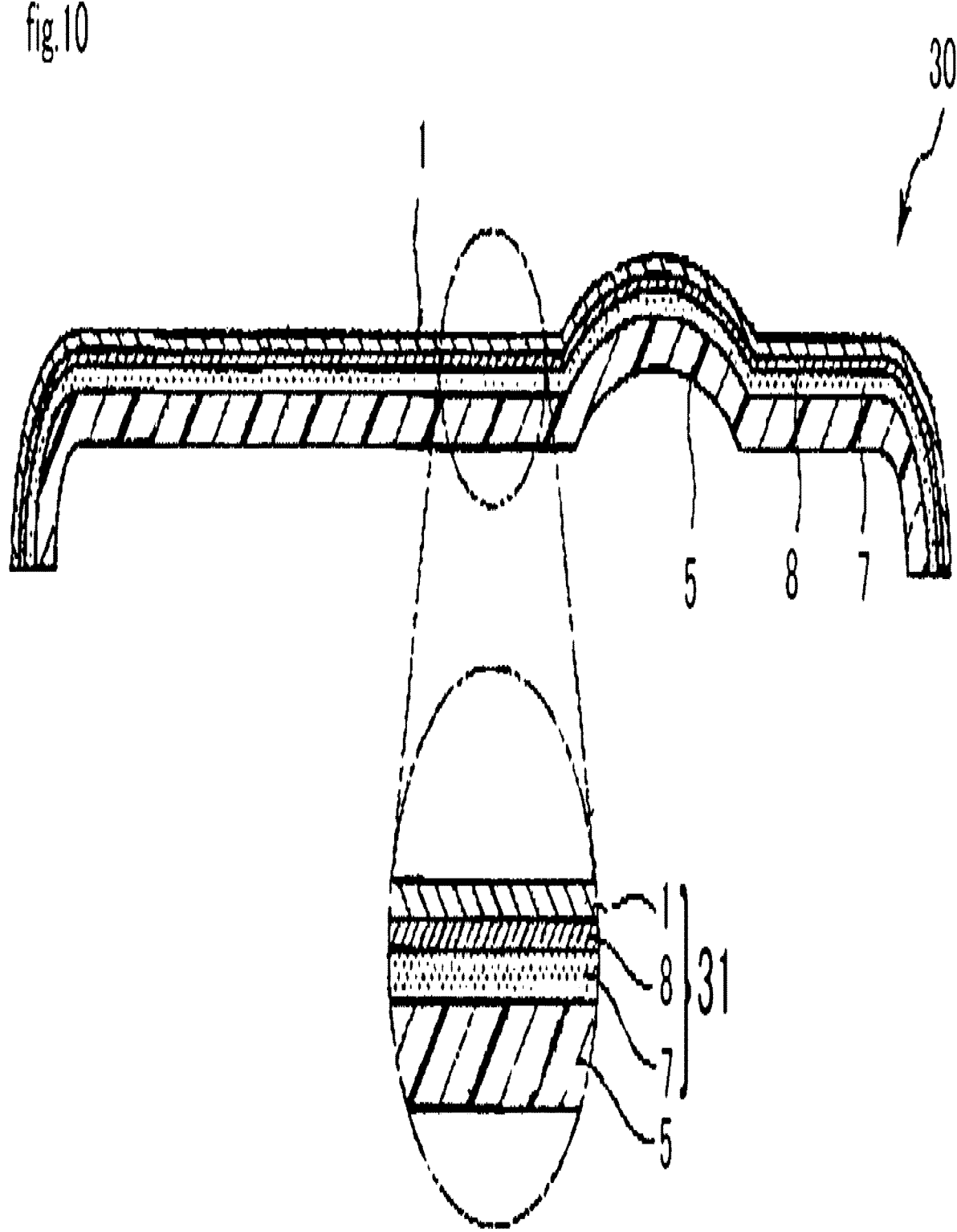
FIG. 10 is a schematic cross-sectional view of a textile-like resin molded body 30 according to the third embodiment, taken along the line II-II' in FIG. 1.
Figure 11:
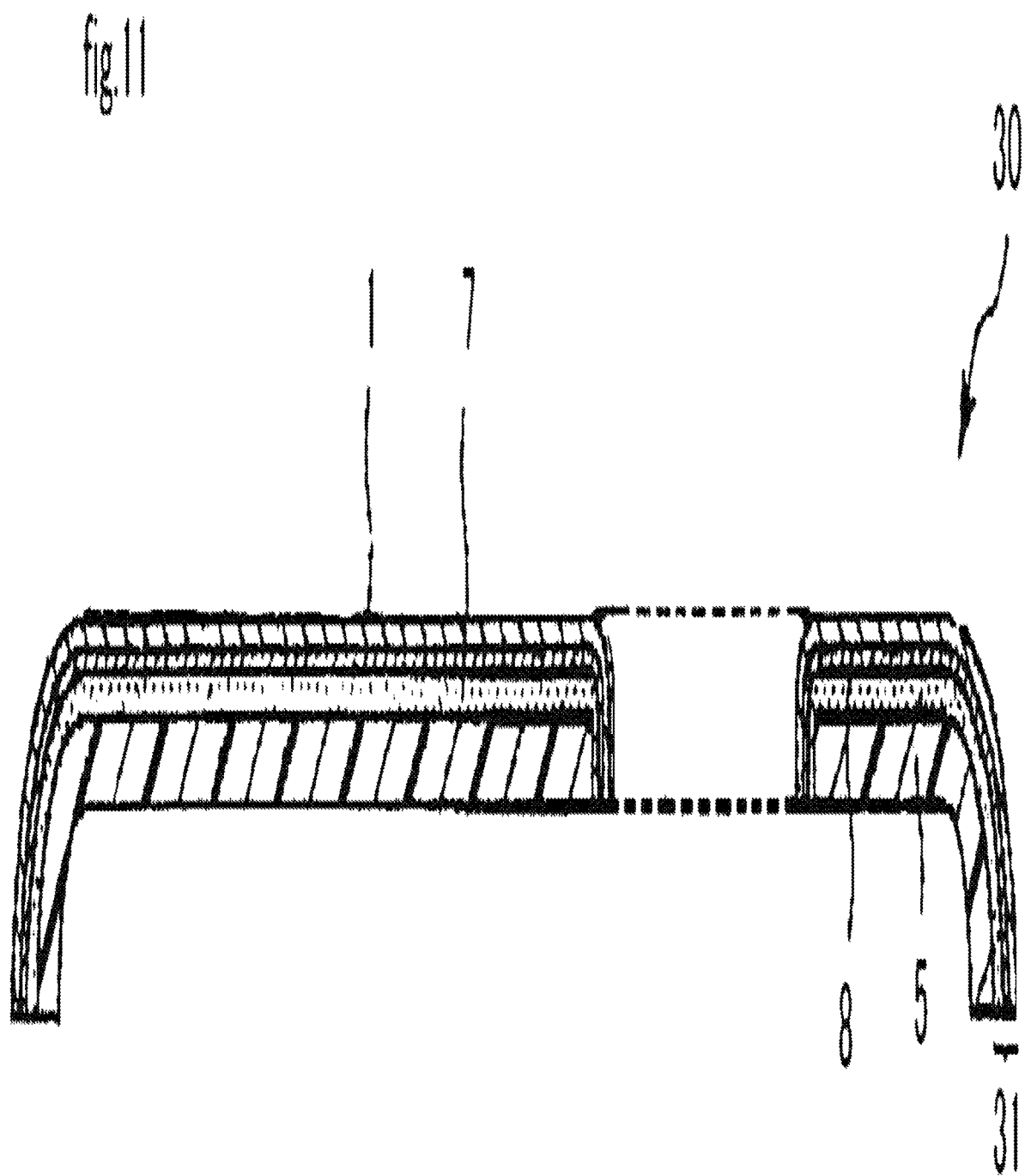
FIG. 11 is a schematic cross-sectional view of the textile-like resin molded body 30 according to the third embodiment, taken along the line III-III' in FIG. 1.

FIG. 1 is a schematic perspective view of a textile-like resin molded body (housing) 30 according to a third embodiment. FIG. 10 is a schematic cross-sectional view taken along the line II-II' in FIG. 1, and FIG. 11 is a schematic cross-sectional view taken along the line III-III' in FIG. 1. Note that those elements denoted by the same reference numerals as the reference numerals shown in the first and second embodiments denote the same elements as those described in the first and second embodiments.

As shown in FIGS. 10 and 11, the textile-like resin molded body 30 includes a textile material layer 1, an adhesive layer (first adhesive layer) 8, a fiber sheet layer 7, and a resin molded body 5 laminated in this order from the second surface side toward the first surface side. An in-mold sheet 31 is a laminated body in which the textile material layer 1 and the fiber sheet layer 7 are bonded with the adhesive layer 8. The textile-like resin molded body 30 is obtained by in-molding the in-mold sheet 31 or a preform molded body 32 obtained by shaping the in-mold sheet 31 into a three-dimensional shape in advance.

Figure 12:
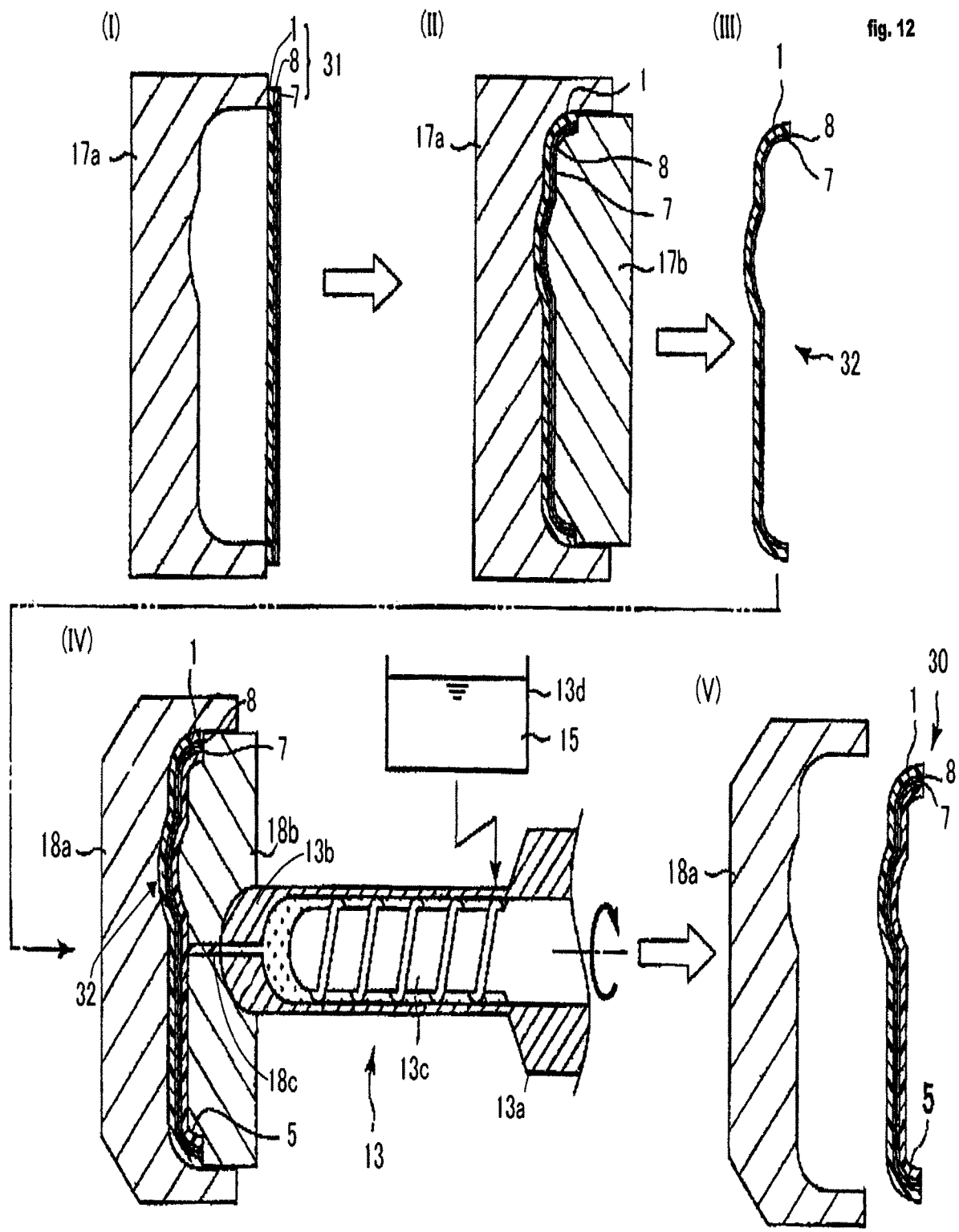
FIG. 12 is an explanatory diagram illustrating a production method according to the third embodiment.

Next, a production method of a textile-like resin molded body 30 that uses the in-mold sheet 31 according to the third embodiment will be described with reference to FIG. 12.

In the production method of the textile-like resin molded body 30 according to the third embodiment, preform molding is performed first. As shown in step (I), the in-mold sheet 31 is placed such that the textile material layer 1 opposes a female mold 17a of a preform mold (press mold) 17. The in-mold sheet 31 may be cut into a predetermined shape in advance. Next, as shown in step (II), the in-mold sheet 31 is pushed into the recess of the female mold 17a by clamping the female mold 17a and the male mold 17b together by a pressing machine. As a result, a preform molded body 32 that has been provided with the shape of the in-mold sheet 31 is obtained. Then, the female mold 17a and the male mold 17b are separated from each other, and the preform molded body 32 as shown in step (III) is taken out. Burrs or any unnecessary portion may be removed from the preform molded body 32 by using a laser cutter or a cutting unit (cutting mold) as necessary.

Next, in-molding is performed using the preform molded body 32. As shown in step (IV), injection molding is performed by using an injection molding machine 13 including an in-molding mold 18 composed of a movable mold 18a and a fixed mold 18b. Specifically, the preform molded body 32 is housed such that the textile material layer 1 opposes the recess of the cavity of the movable mold 18a, and the movable mold 18a and the fixed mold 18b are clamped together. Then, a cylinder 13a of the injection molding machine 13 is moved forward such that a nozzle portion 13b disposed at the distal end of the cylinder 13a is abutted against a resin inlet 18c of the in-molding mold 18. Then, a screw 13c is rotated so as to perform metering while melting a pellet-shaped resin 15 stored in a hopper 13d inside the cylinder 13a. Then, after metering, the molten resin 15 is injected into the cavity of the in-molding mold 18. The molten resin 15 enters between the fibers of the fiber sheet layer 7 by injection. At this time, the fiber sheet layer 7 serves as a barrier layer for preventing the molten resin 15 from permeating into the textile material layer 1 during in-molding. As a result, the molten resin 15 will not permeate into the textile material layer 1, and therefore, the textile material layer 1 will not be hardened, making it possible to maintain a three-dimensional texture. Furthermore, the thermal effect of the molten resin on the textile material layer 1 is reduced. On the other hand, the molten resin permeates into the fiber sheet layer 7 during in-molding, thus making it possible to maintain high adhesion to the formed resin molded body 5 due to an anchor effect. Furthermore, the textile material layer 1 and the fiber sheet layer 7 are bonded, and thus exhibit high adhesion due to the anchor effect of the adhesive.

Then, after the resin 15 has been cooled and solidified inside the mold 18, the movable mold 18a and the fixed mold 18b are separated from each other. Thus, as shown in step (V), a textile-like resin molded body 30 in which the preform molded body 32 and the resin molded body 5 are integrated with each other is taken out. When the molten resin 15 is cooled and solidified, the fiber sheet layer 7 and the resin molded body 5 undergo contraction, and the fiber sheet layer 7 and the resin molded body 5 are more firmly integrated. Thus, a textile-like resin molded body 30 is obtained.

Examples of the fiber sheet layer include a fiber base material selected from a woven fabric, a knitted fabric, a non-woven fabric, and the like. Among these, a non-woven fabric is particularly preferable in terms of ease of control of the thickness. As the non-woven fabric used for the fiber sheet layer, it is preferable to use a non-woven fabric that prevents permeation of the molten resin into the textile material layer during the in-molding step and has excellent shaping properties. Specific examples of the non-woven fabric include a wet non-woven fabric such as a paper-like non-woven fabric (non-woven fabric formed by papermaking processing), a dry non-woven fabric, a melt-blown non-woven fabric, and a spunbonded non-woven fabric. In terms of the ability to have high barrier properties even in a small thickness, it is preferable to use a spunbonded non-woven fabric, and it is particularly preferable to use a dense non-woven fabric of ultrafine fibers. In terms of the low cost, it is preferable to use a paper-like non-woven fabric. Specific examples of the paper-like non-woven fabric include PY-100-60 manufactured by Awa Paper Mfg. Co., Ltd. The thickness of the non-woven fabric is preferably about 50 to 1000 μm. Further, the fibers that form the paper-like non-woven fabric have a fiber diameter of preferably 1 to 50 μm, and a fiber length of preferably 2 to 50 mm, more preferably 2 to 15 mm.

Specific examples the material of the fibers that form the fiber sheet layer include aromatic polyester resins such as polyethylene terephthalate (PET), modified polyethylene terephthalate, polybutylene terephthalate (PBT), polytrimethylene terephthalate (PTT), polytriethylene terephthalate, polyhexamethylene terephthalate, polypropylene terephthalate and polyethylene naphthalate; aliphatic polyester resins such as polylactic acid, polyethylene succinate, polybutylene succinate, polybutylene succinate adipate and a polyhydroxybutyrate-polyhydroxyvalerate copolymer; polyamide resins such as polyamide 6, polyamide 66, polyamide 610, polyamide 10, polyamide 11, polyamide 12 and polyamide 6-12; polyolefin resins such as polypropylene, polyethylene, polybutene, polymethyl pentene, chlorine polyolefin, an ethylene vinyl acetate copolymer and a styrene ethylene copolymer; modified polyvinyl alcohol resins formed, for example, from a modified polyvinyl alcohol containing 25 to 70 mol % of an ethylene unit; and crystalline elastomers such as a polyurethane elastomer, a polyamide elastomer and a polyester elastomer. Among these, it is preferable to use a PET having a glass transition temperature (Tg) of 100 to 120° C., more preferably 105 to 115° C. in that it is softened at a relatively low temperature and easily stretched when softened. When Tg is too high, the stretchability of the fibers tends to be lowered to reduce the shaping properties. When Tg is too low, the material tends to be excessively softened, resulting in a longer solidification time. Note that as the PET having a Tg of 100 to 120° C., it is preferable to use a modified PET containing, as a constituent unit, a copolymer component that disturbs the linear chain structure in the constituent unit of an aromatic PET, and it is particularly preferable to use a modified PET containing an asymmetric aromatic carboxylic acid such as isophthalic acid, phthalic acid or 5-sodium sulfoisophthalic acid, and an aliphatic dicarboxylic acid such as adipic acid, at a predetermined ratio as the copolymer components. More specifically, it is preferable to use a modified PET containing 2 to 12 mol % of an isophthalic acid unit as a monomer component. Note that Tg can be obtained, for example, by using a dynamic viscoelasticity measurement device (e.g., FT Rheospectoler DDVIV manufactured by Rheology Co. Ltd.) to measure the dynamic viscoelasticity behavior under the conditions of a measurement range of 30 to 250° C., a temperature rising rate of 3° C./min, a distortion of 5 μm/20 mm and a measurement frequency of 10 Hz, with a test strip having a width of 5 mm and a length of 30 mm fixed between chucks disposed at an interval of 20 mm.

The dense non-woven fabric of ultrafine fibers will now be described in detail. In the case of using the dense non-woven fabric of ultrafine fibers, the molten resin is difficult to reach the textile material during injection molding, and therefore, sufficient voids are allowed to remain in the textile material. Accordingly, the voids of the textile material are not filled with the injected resin, thus making it possible to maintain a texture as if the material has cushioning properties.

The dense non-woven fabric of ultrafine fibers preferably includes a fiber-entangled body of ultrafine fibers having a fineness of preferably 2.0 dtex or less, more preferably 0.9 dtex or less, particularly preferably 0.5 dtex or less, and especially preferably 0.1 dtex or less, and 0.01 dtex or more, more preferably 0.05 dtex or more, particularly preferably 0.07 dtex or more. When the fineness of the ultrafine fibers is too high, the stretchability when softened by heating tends to be reduced at the time of preform molding the in-mold sheet, making it difficult to accurately transfer the mold shape and reducing the shaping properties. When the fineness is too low, the industrial productivity of the non-woven fabric tends to be reduced and the injected resin tends to be difficult to permeate into the voids between the fibers as a result of the voids between the fibers becoming smaller, reducing the strength of adhesion to the fiber sheet layer.

The apparent density of the dense non-woven fabric of ultrafine fibers is preferably 0.45 g/cm$^3$ or more, more preferably 0.45 to 0.70 g/cm$^3$, particularly preferably 0.50 to 0.65 g/cm$^3$. When the dense non-woven fabric of ultrafine fibers has such a high apparent density, it is possible to make the molten resin difficult to permeate into the textile material layer during in-molding, and also to reduce the occurrence of creasing or pattern distortion on the surface of the in-molded body, while providing a preform molded body having well-balanced shape stability and shaping properties.

Note that the apparent density of the dense non-woven fabric of ultrafine fibers can be determined, for example, by dividing the value of the mass per unit area measured by the method prescribed in JIS L 1096 8.4.2 (1999) by the value of the thickness measured under a load of 240 gf/cm$^2$ in accordance with JIS L 1096.

To achieve such a high apparent density of the dense non-woven fabric of ultrafine fibers, it is preferable that the ultrafine fibers are present as a fiber bundle of a plurality of ultrafine fibers formed through ultrafine fiber-forming fibers, such as island-in-the-sea composite fibers. Specifically, for example, the number of ultrafine fibers that are present as a fiber bundle is preferably 5 to 1000, more preferably 5 to 200, particularly preferably 10 to 50, most preferably 10 to 30. By the presence of a fiber bundle formed by ultrafine fibers in this manner, it is possible to increase the apparent density of the dense non-woven fabric of ultrafine fibers.

Although the fiber length of ultrafine fibers is not particularly limited, it is preferable that the ultrafine fibers are long fibers in terms of ease of increase in the apparent density. Here, "long fibers" mean that the fibers are not short fibers that have been cut into a predetermined length. The length of the long fibers is preferably 100 mm or more, more preferably 200 mm or more, in that the fiber density of the ultrafine fibers can be sufficiently increased. When the length of the ultrafine fibers is too short, it tends to be difficult to increase the fiber density. Although the upper limit is not particularly limited, the ultrafine fibers may be, for example, continuously spun fibers having a fiber length of several meters, several hundred meters, several kilometers, or more. Further, these fibers may be a mixture of several types of fibers rather than being made of a single type of fibers.

It is preferable that the dense non-woven fabric of ultrafine fibers contains a polymer elastic body impregnated into the internal voids thereof. Such a polymer elastic body increases the shape stability of the preform molded body. Specific examples of such a polymer elastic body include polyurethane, an acrylonitrile elastomer, an olefin elastomer, a polyester elastomer, a polyamide elastomer, and an acrylic elastomer. Among these, it is preferable to use polyurethane, and particularly preferable to use a crosslinked, non-foamed polyurethane. A crosslinked, non-foamed polyurethane inhibits deformation due to elastic recovery after the molded body is released from the mold during preform molding. As a result, a well-defined, sharp angle can be provided in the case of molding a preform molded body having a deep-drawn shape. Note that in the case of using a non-crosslinked foamed polyurethane, the molded body tends to be deformed due to elastic recovery after being released from the mold.

Preferably, the crosslinked, non-foamed polyurethane is formed by using an aqueous emulsion of a cross-linkable polyurethane. Specific examples of the aqueous emulsion of a cross-linkable polyurethane include aqueous emulsions of a polycarbonate polyurethane, a polyester polyurethane, a polyether polyurethane, and a polycarbonate/ether polyurethane that form a cross-linked structure after being dried.

Since deformation due to elastic recovery after being released from the molds is inhibited during preform molding, it is preferable that the crosslinked, non-foamed polyurethane is a crosslinked, non-foamed polyurethane having a mass reduction rate of 5 mass % or less, preferably 3 mass % or less, after immersion in DMF. Note that the mass reduction rate of the crosslinked, non-foamed polyurethane after immersion in DMF is obtained by immersing the polyurethane in DMF having a mass 100 times the mass of the polyurethane at room temperature for 24 hours, subsequently filtrating the DMF, drying the resulting filtrate, and measuring the mass of the filtrate. Then, the mass reduction rate is calculated by the following expression:

Mass reduction rate (%)=(1−Weight after immersion in DMF/Weight before immersion in DMF)×100.

From the viewpoint of providing excellent shaping properties during preform molding, it is preferable that the polymer elastic body content in the dense non-woven fabric is in the range of preferably 5 to 40 mass %, more preferably 8 to 35 mass %, particularly preferably 12 to 30 mass %, relative to the total amount of the ultrafine fibers and the polymer elastic body.

The thickness of the dense non-woven fabric of ultrafine fibers is not particularly limited, so long as it is possible to ensure a density that prevents passage of the molten resin through the textile material layer during in-molding, but is preferably about 250 to 950 µm, more preferably about 250 to 750 µm, particularly preferably about 300 to 550 µm, from the viewpoint of preventing the thickness of the in-molded body from becoming too large.

The fiber sheet layer and the textile material layer are bonded. Examples of an adhesive that bonds the fiber sheet layer and the textile material layer (hereinafter also referred to as "first adhesive") include polyvinyl acetal adhesives such as a polyvinyl butyral (PVB) adhesive, polyurethane adhesives, acrylic adhesives, and epoxy adhesives. The thickness of the adhesive layer that bonds the fiber sheet layer and the textile material layer is not particularly limited, but is preferably about 30 to 150 µm, for example.

Figure 13:
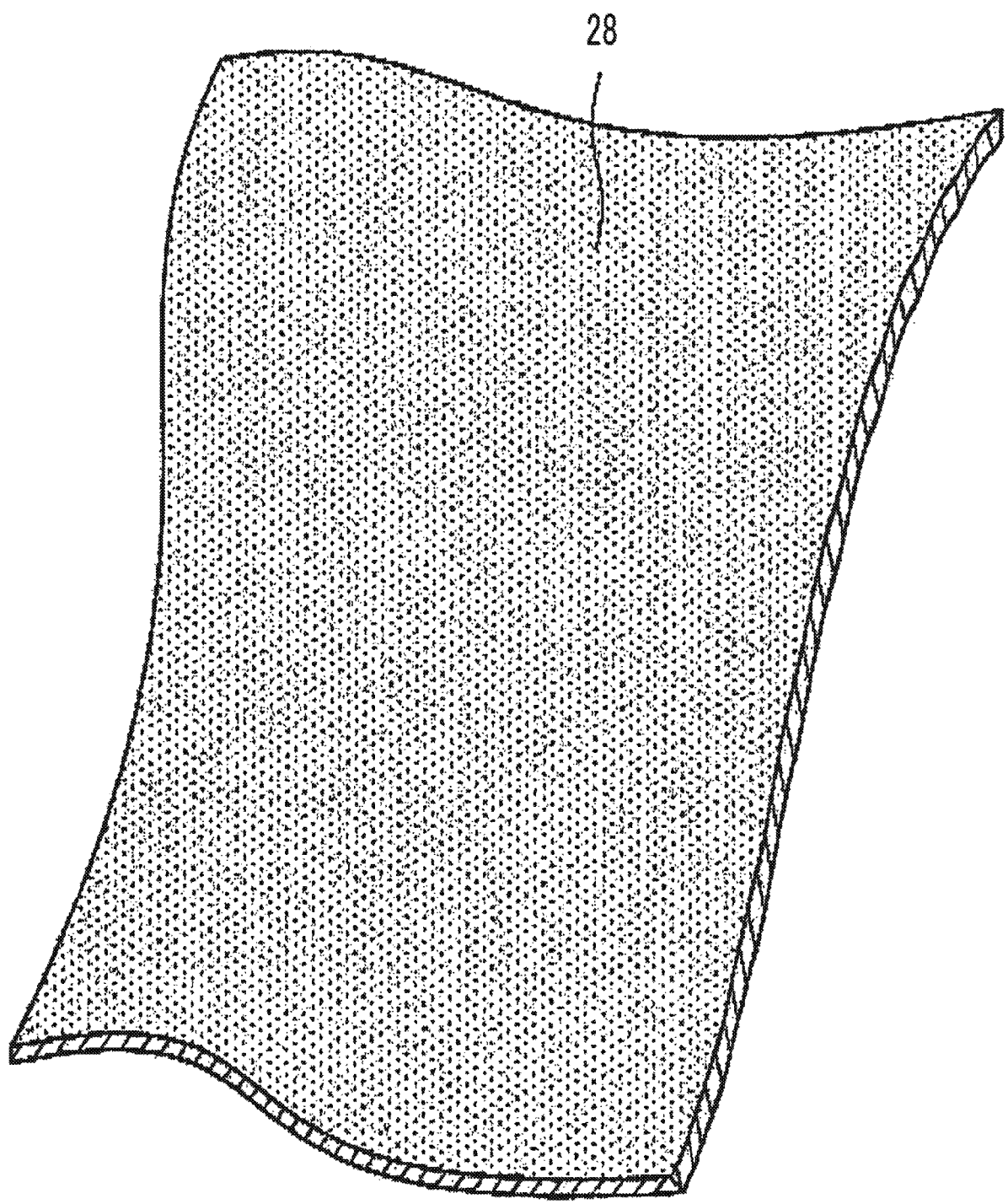
FIG. 13 is a schematic diagram of a resin-impregnated non-woven fabric according to the third embodiment.

As a non-woven fabric suitably used for the fiber sheet layer, it is possible to use a resin-impregnated non-woven fabric 28 in which voids between the fibers are pre-impregnated with a resin such as an adhesive, as shown in FIG. 13. By pre-impregnating the voids between the fibers of the non-woven fabric with a resin such as an adhesive, it is possible to eliminate the air between the fibers of the non-woven fabric. This enhances the adhesion between the resin-impregnated non-woven fabric 28 and the resin molded body 5. Furthermore, the use of the resin-impregnated non-woven fabric 28 increases the strength of adhesion to the resin molded body as a result of being mixed with the molten resin during in-molding.

The method for impregnating the non-woven fabric with a resin such as an adhesive is not particularly limited. Specific examples thereof include a method involving dipping the non-woven fabric in a liquid adhesive or a solution of an adhesive and squeezing off the liquid or the solution, and a method involving applying the adhesive or the solution to the non-woven fabric by using a gravure roll. In addition, the non-woven fabric may be incised in order to increase the impregnation properties. As another impregnation method, it is also possible to achieve impregnation by placing an adhesive film or an adhesive powder on the non-woven fabric and press-fitting the whole with a roller.

Figure 14A:
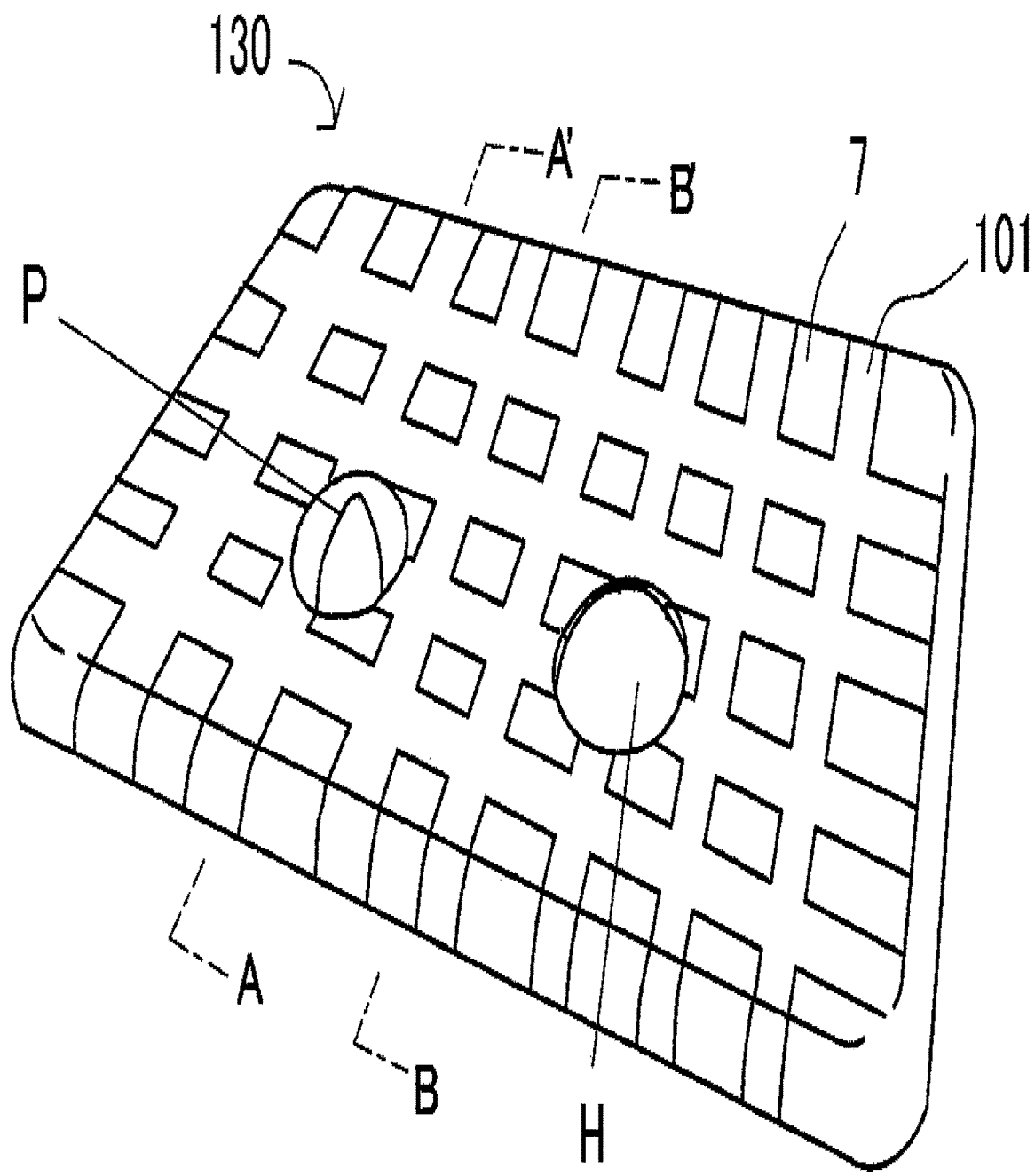
FIG. 14A is a schematic perspective view of a textile-like resin molded body 130 according to a modification of the third embodiment.

Next, as another example of the textile-like resin molded body according to the present embodiment, a textile-like resin molded body 130 obtained by using an in-mold sheet 103 will be described with reference to FIGS. 14A to 14C. The textile-like resin molded body 130 is a housing including a textile material 101 made of a grid-patterned knitted fabric disposed on its surface. FIG. 14A is a schematic perspective view, FIG. 14B is a schematic diagram showing a part of the cross section taken along the line A-A' in FIG. 14A, and FIG. 14C is a schematic diagram showing a part of the cross section taken along the line B-B' in FIG. 14A.

As shown in FIG. 14B, in the textile-like resin molded body 130, a fiber sheet layer 7, an adhesive layer 8, and a textile material layer 101 are laminated in this order on the surface of a resin molded body 5. The textile material 101 is attached so as to conform to a protrusion P. As shown in FIG. 14C, because of the grid pattern of the textile material layer 101, only the fiber sheet layer 7 is laminated on the portions where the textile material layer 101 is not present. Since the fiber sheet layer 7 is laminated on the side of the textile material 101 that faces the resin molded body 5, the hard resin molded body 1 has not entered the textile material 101 in the textile-like resin molded body 130. Accordingly, the textile material layer 101 will not lose its flexible texture or three-dimensional appearance.

Fourth Embodiment

Figure 15:
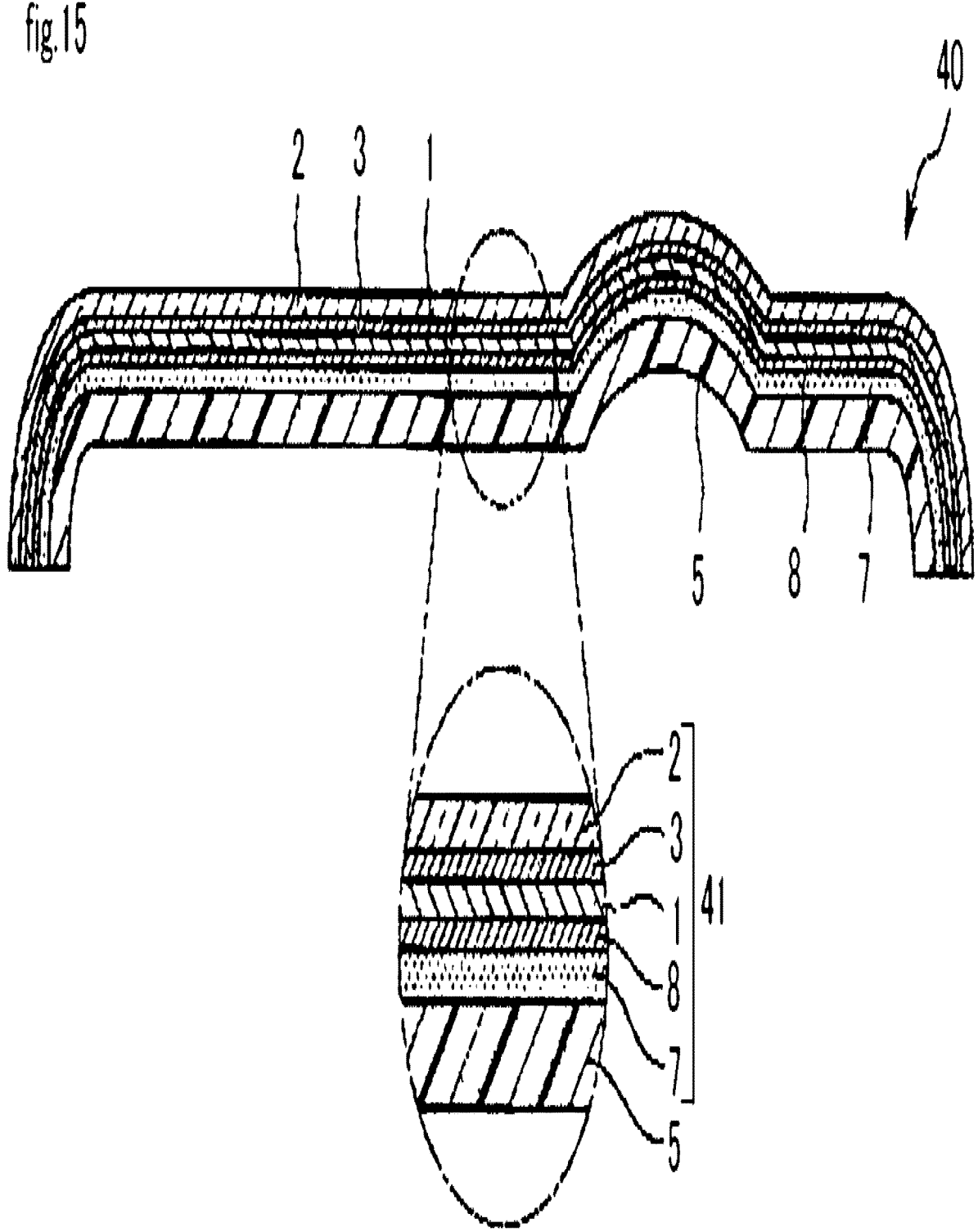
FIG. 15 is a schematic cross-sectional view of a textile-like resin molded body 40 according to the fourth embodiment, taken along the line II-II' in FIG. 1.
Figure 16:
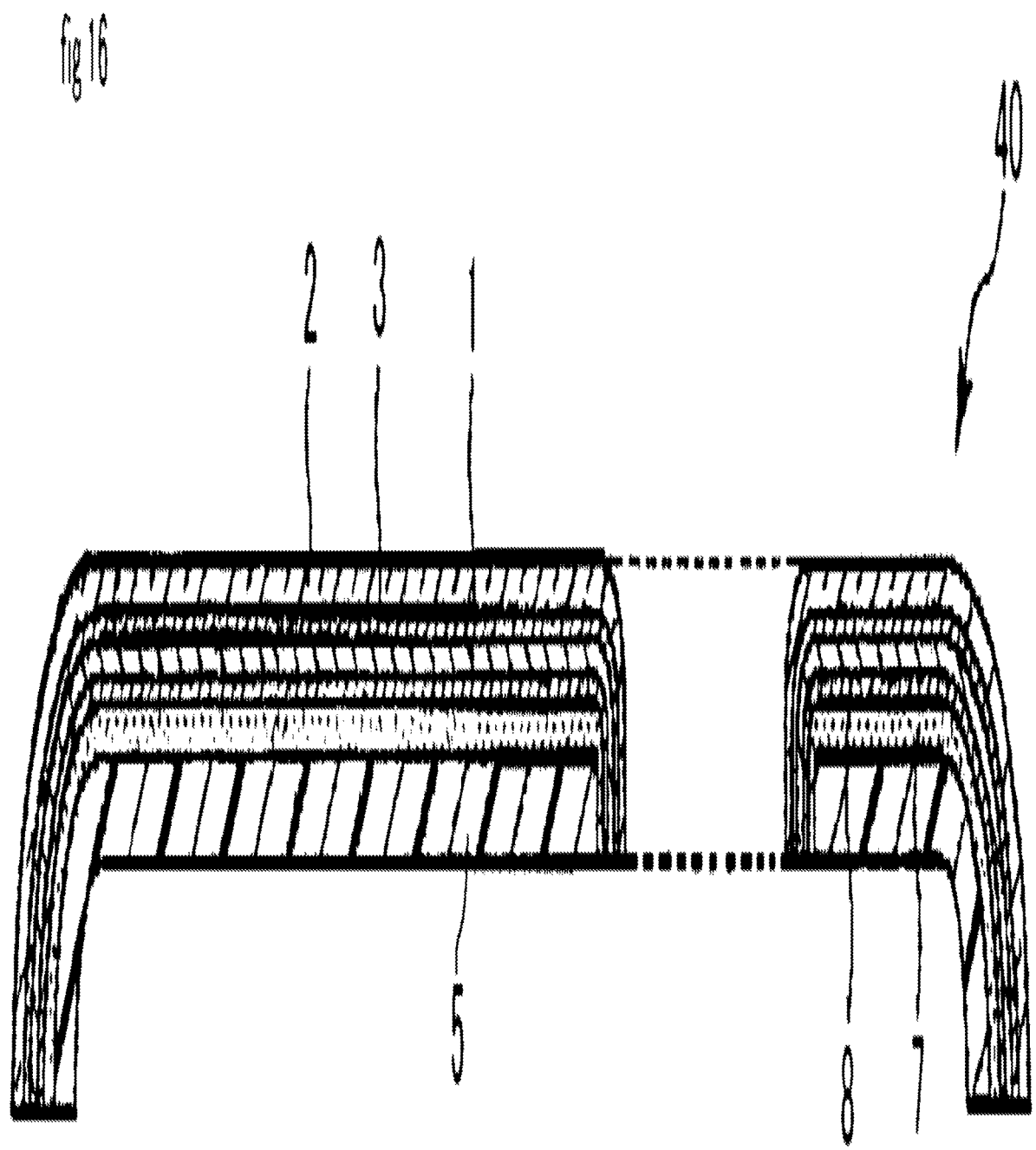
FIG. 16 is a schematic cross-sectional view of the textile-like resin molded body 40 according to the fourth embodiment, taken along the line III-III' in FIG. 1.

FIG. 1 is a schematic perspective view of a textile-like resin molded body (housing) 40 according to a fourth embodiment. FIG. 15 is a schematic cross-sectional view taken along the line II-II' in FIG. 1, and FIG. 16 is a schematic cross-sectional view taken along the line III-III' in FIG. 1. Note that those elements denoted by the same reference numerals as the reference numerals shown in the first to third embodiments denote the same elements as those described in the first to third embodiments.

As shown in FIGS. 15 and 16, the textile-like resin molded body 40 includes a surface protection layer 2, an adhesive layer (second adhesive layer) 3, a textile material layer 1, an adhesive layer (first adhesive layer) 8, a fiber sheet layer 7, and a resin molded body 5 laminated in this order from the second surface side toward the first surface side. An in-mold sheet 41 is a laminated body in which the surface protection layer 2 and the textile material layer 1 are bonded with the adhesive layer 3, and the textile material layer 1 and the fiber sheet layer 7 are bonded with the adhesive layer 8. The textile-like resin molded body 40 is obtained by in-molding the in-mold sheet 41 or a preform molded body 42 obtained by shaping the in-mold sheet 41 into a three-dimensional shape in advance.

Figure 17:
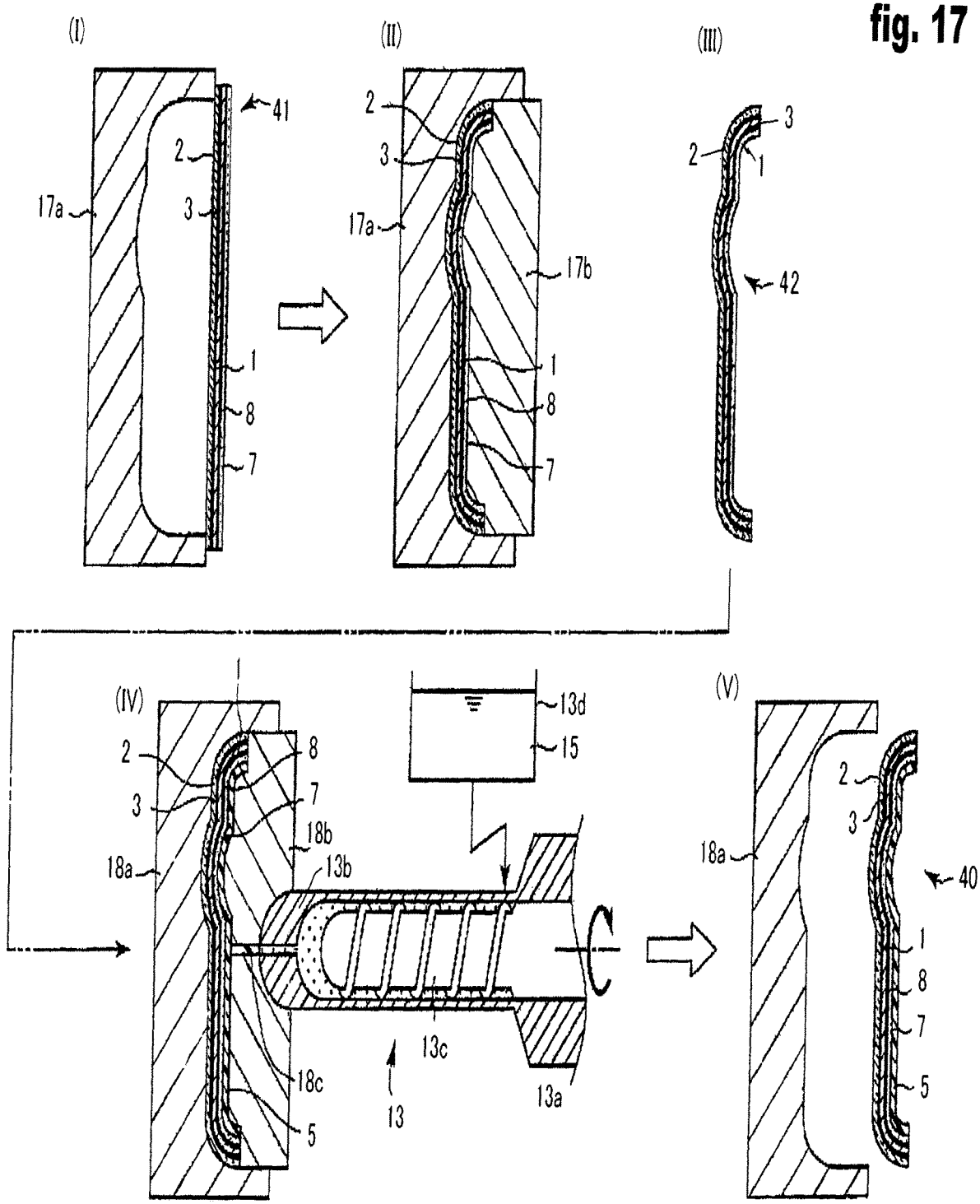
FIG. 17 is an explanatory diagram illustrating a production method according to the fourth embodiment.

Next, a production method of a textile-like resin molded body 40 that uses the in-mold sheet 41 according to the fourth embodiment will be described with reference to FIG. 17.

In the production method of the textile-like resin molded body 40 according to the fourth embodiment, preform molding of the in-mold sheet 41 is performed first. As shown in step (I), the in-mold sheet 41 is placed such that the surface protection layer 2 opposes a female mold 17a of a preform mold (press mold) 17. The in-mold sheet 41 may be cut into a predetermined shape in advance. Next, as shown in step (II), the in-mold sheet 41 is pushed into the recess of the female mold 17a by clamping the female mold 17a and the male mold 17b together by a pressing machine. As a result, a preform molded body 42 that has been provided with the shape of the in-mold sheet 41 is obtained. Then, the female mold 17a and the male mold 17b are separated from each other, and the preform molded body 42 as shown in step (III) is taken out. Burrs or any unnecessary portion may be removed from the preform molded body 42 by using a laser cutter or a cutting unit (cutting mold) as necessary.

Next, in-molding is performed using the preform molded body 42. First, as shown in step (IV), injection molding is performed by using an injection molding machine 13 including an in-molding mold 18 composed of a movable mold 18a and a fixed mold 18b. Specifically, the preform molded body 42 is housed such that the surface protection layer 2 opposes the recess of the cavity of the movable mold 18a, and the movable mold 18a and the fixed mold 18b are clamped together. Then, a cylinder 13a of the injection molding machine 13 is moved forward such that a nozzle portion 13b disposed at the distal end of the cylinder 13a is abutted against a resin inlet 18c of the in-molding mold 18. Then, a screw 13c is rotated so as to perform metering while melting a pellet-shaped resin 15 stored in a hopper 13d inside the cylinder 13a. Then, after metering, the molten resin 15 is injected into the cavity of the in-molding mold 18. The molten resin 15 enters between the fibers of the fiber sheet layer 7 by injection. At this time, the fiber sheet layer 7 serves as a barrier layer for preventing the molten resin 15 from permeating into the textile material layer 1 during in-molding. As a result, the molten resin will not permeate into the textile material layer 1, and therefore, the textile material layer 1 will not be hardened, making it possible to maintain a three-dimensional texture. Furthermore, the thermal effect of the molten resin on the textile material layer 1 is reduced. On the other hand, the molten resin permeates into the fiber sheet layer 7 during in-molding, thus making it possible to maintain high adhesion to the formed resin molded body 5 due to an anchor effect. Furthermore, the textile material layer 1 and the fiber sheet layer 7 are bonded, and thus exhibit high adhesion due to the anchor effect of the adhesive.

Then, after the resin 15 has been cooled and solidified inside the mold 18, the movable mold 18a and the fixed mold 18b are separated from each other. Thus, as shown in step (V), a textile-like resin molded body 40 in which the preform molded body 42 and the resin molded body 5 are integrated with each other is taken out. When the molten resin 15 is cooled and solidified, the fiber sheet layer 7 and the resin molded body 5 undergo contraction, and the fiber sheet layer 7 and the resin molded body 5 are more firmly integrated. Thus, a textile-like resin molded body 40 is obtained.

Figure 18A:
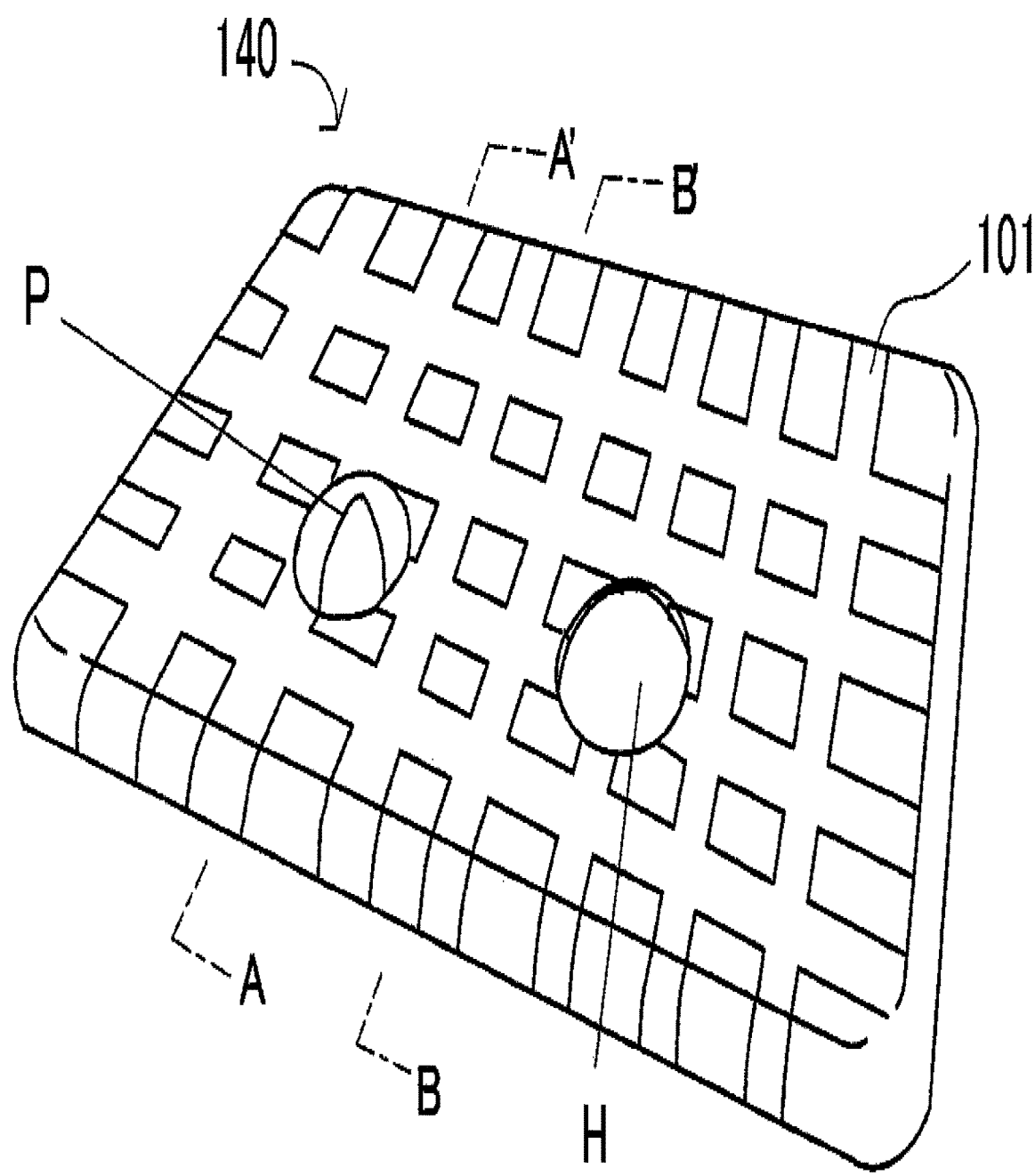
FIG. 18A is a schematic perspective view of a textile-like resin molded body 140 according to a modification of the fourth embodiment.
Figure 18C:
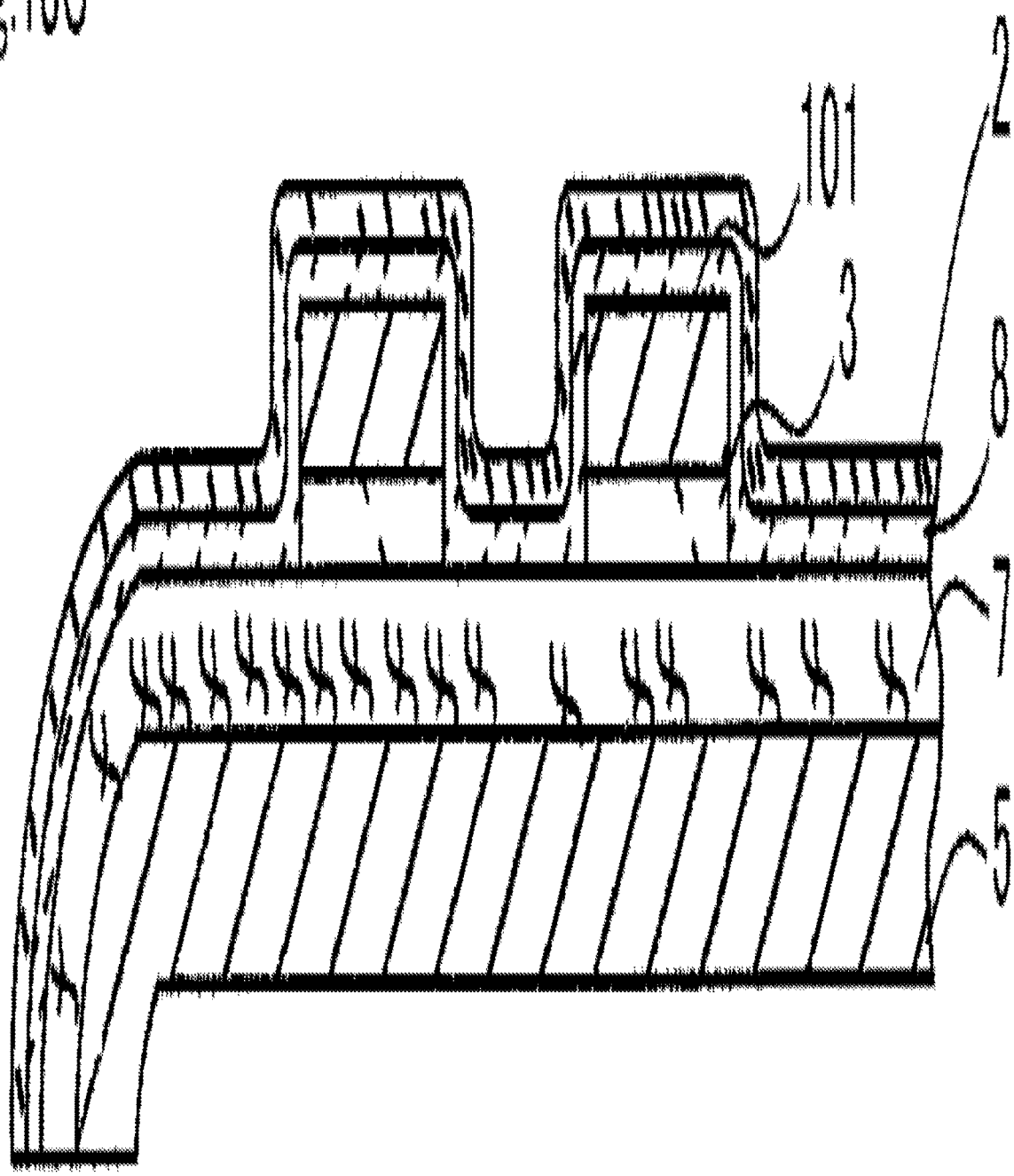
FIG. 18C is a schematic partial cross-sectional view of the textile-like resin molded body 140, taken along the line B-B' in FIG. 18A.

Next, as another example of the textile-like resin molded body according to the present embodiment, a textile-like resin molded body 140 obtained by using an in-mold sheet 104 will be described with reference to FIGS. 18A to 18C. The textile-like resin molded body 140 is a housing including a textile material 101 made of a grid-patterned knitted fabric disposed on its surface. FIG. 18A is a schematic perspective view, FIG. 18B is a schematic diagram showing a part of the cross section taken along the line A-A' in FIG. 18A, and FIG. 18C is a schematic diagram showing a part of the cross section taken along the line B-B' in FIG. 18A.

As shown in FIG. 18B, in the textile-like resin molded body 140, a fiber sheet layer 7, a first adhesive layer 8, a textile material layer 101, a second adhesive layer 3, and a surface protection layer 2 are laminated in this order on the surface of a resin molded body 5. The textile material 101 is attached so as to conform to a protrusion P. As shown in FIG. 18C, because of the grid pattern of the textile material layer 101, only the fiber sheet layer 7, the second adhesive layer 3, and the surface protection layer 2 are laminated on the portions where the textile material layer 101 is not present. Since the fiber sheet layer 7 is laminated on the side of the textile material 101 that faces the resin molded body 5, the hard resin molded body 1 has not entered the textile material 101 in the textile-like resin molded body 140. Accordingly, the textile material layer 101 will not lose its soft texture or three-dimensional appearance.

Fifth Embodiment

Figure 19:
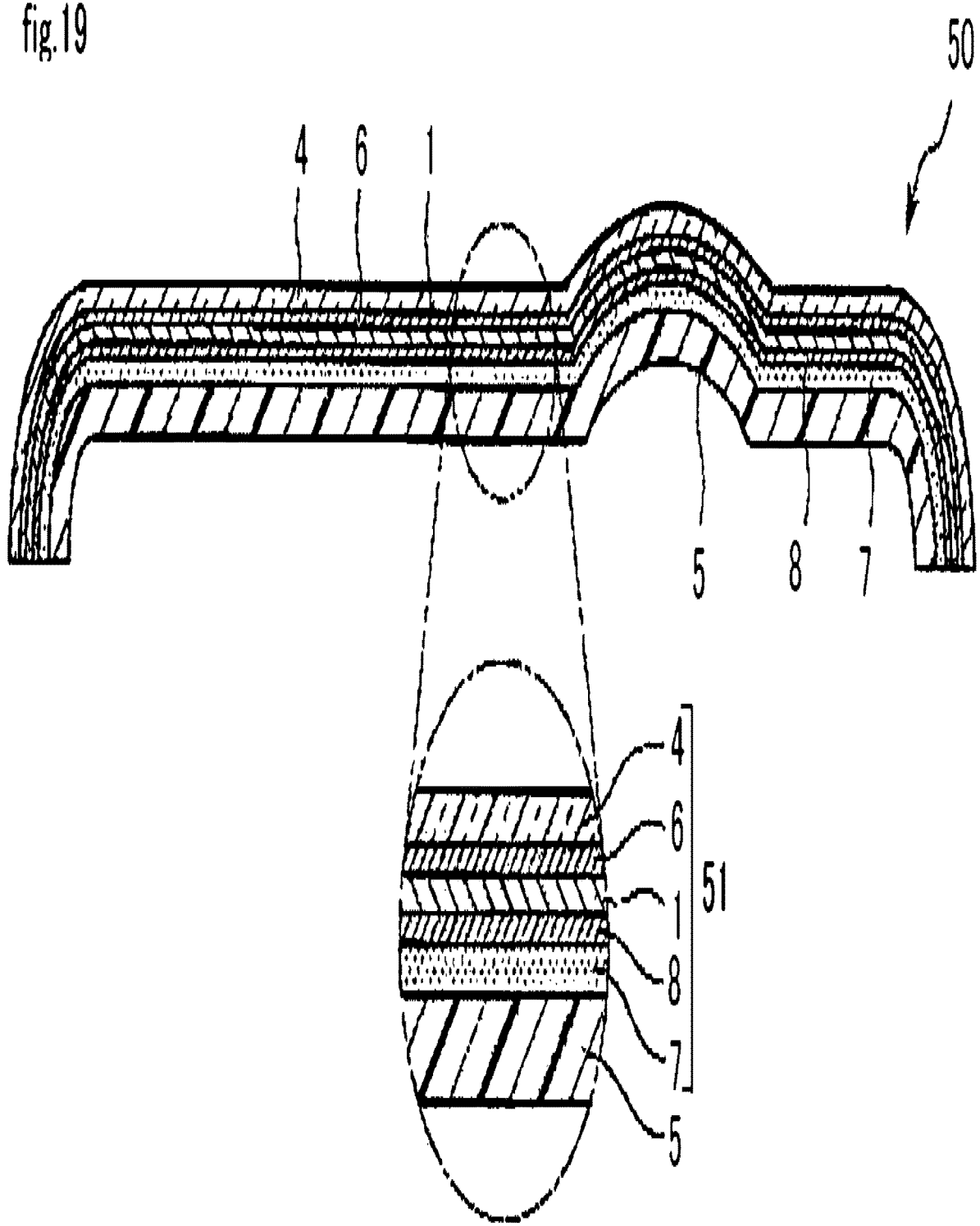
FIG. 19 is a schematic cross-sectional view of a textile-like resin molded body 50 according to the fifth embodiment, taken along the line II-II' in FIG. 1.
Figure 20:
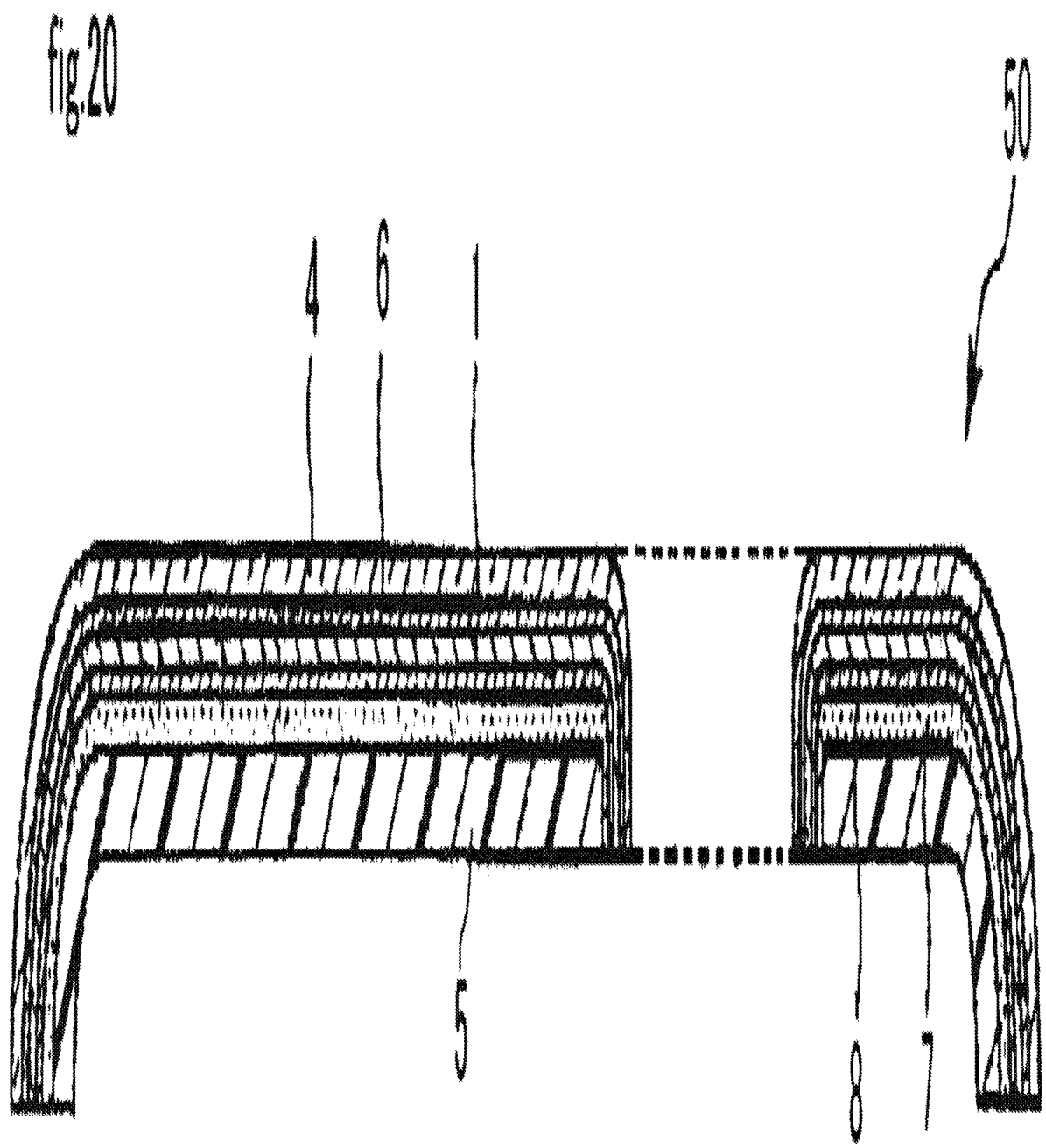
FIG. 20 is a schematic cross-sectional view of the textile-like resin molded body 50 according to the fifth embodiment, taken along the line III-III' in FIG. 1.

FIG. 1 is a schematic perspective view of a textile-like resin molded body (housing) 50 according to a fifth embodiment. FIG. 19 is a schematic cross-sectional view taken along the line II-II' in FIG. 1, and FIG. 20 is a schematic cross-sectional view taken along the line III-III' in FIG. 1. Note that those elements denoted by the same reference numerals as the reference numerals shown in the first to fourth embodiments denote the same elements as those described in the first to fourth embodiments.

As shown in FIGS. 19 and 20, the textile-like resin molded body 50 includes a temporary surface protection layer 4, an adhesive layer (temporary adhesive layer) 6, a textile material layer 1, an adhesive layer (first adhesive layer) 8, a fiber sheet layer 7, and a resin molded body 5 laminated in this order from the second surface side toward the first surface side. An in-mold sheet 51 is a laminated body in which the temporary surface protection layer 4 and the textile material layer 1 are bonded with the adhesive layer 6, and the textile material layer 1 and the fiber sheet layer 7 are bonded with the adhesive layer 8. The textile-like resin molded body 50 is obtained by in-molding the in-mold sheet 51 or a preform molded body 52 obtained by shaping the in-mold sheet 51 into a three-dimensional shape in advance. The temporary surface protection layer 4 and the temporary adhesive layer 6 are provisional surface protection layers that are removed from the surface of the textile material layer 1 after in-molding.

Figure 21:
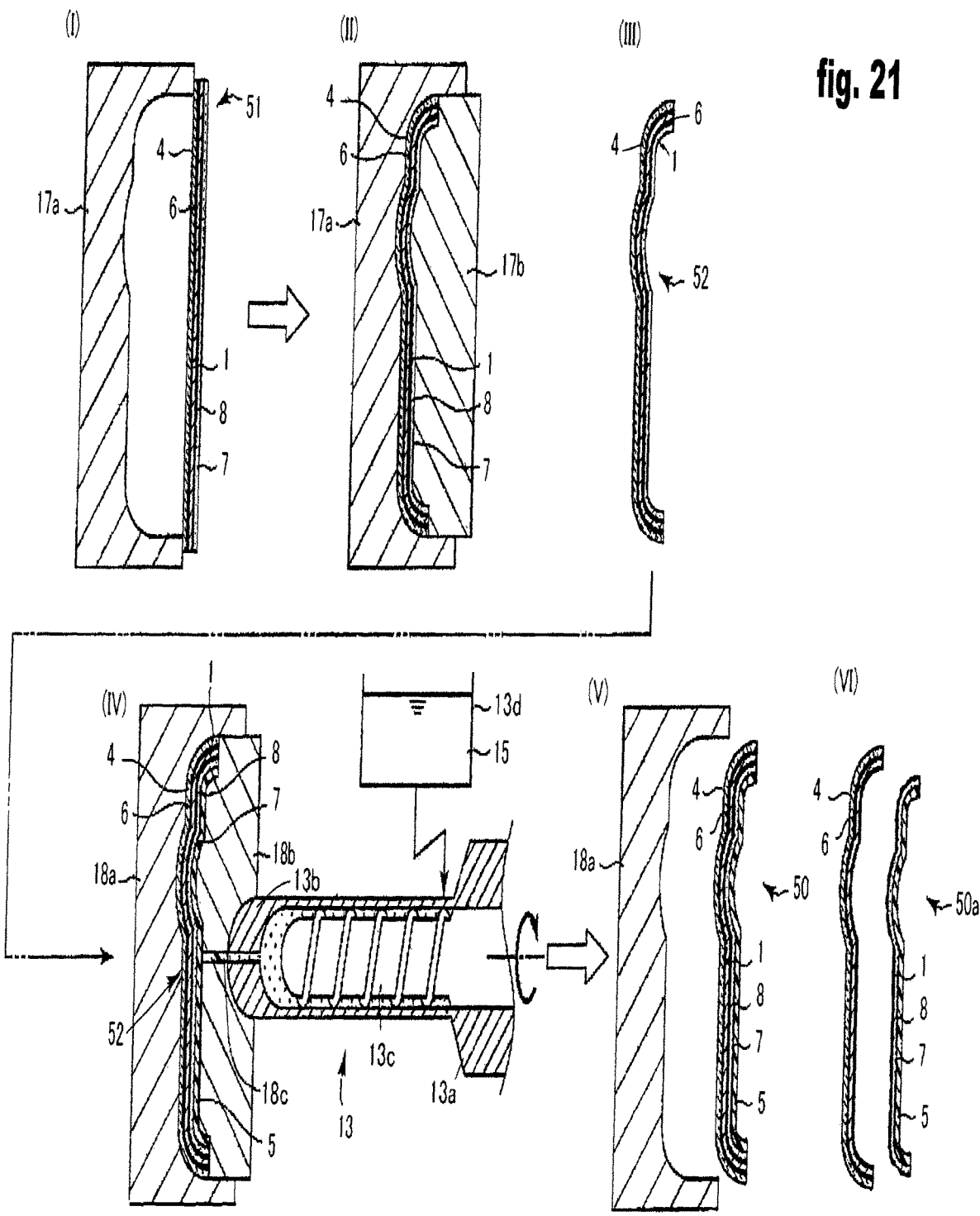
FIG. 21 is an explanatory diagram illustrating a production method according to the fifth embodiment.

Next, a production method of a textile-like resin molded body 50 that uses the in-mold sheet 51 according to the fifth embodiment will be described with reference to FIG. 21.

In the production method of the textile-like resin molded body 50 according to the fifth embodiment, preform molding is performed first. As shown in step (I), the in-mold sheet 51 is placed such that the temporary surface protection layer 4 opposes a female mold 17a of a preform mold (press mold) 17. The in-mold sheet 51 may be cut into a predetermined shape in advance. Next, as shown in step (II), the in-mold sheet 51 is pushed into the recess of the female mold 17a by clamping the female mold 17a and the male mold 17b together by a pressing machine. As a result, a preform molded body 52 that has been provided with the shape of the in-mold sheet 51 is obtained. Then, the female mold 17a and the male mold 17b are separated from each other, and the preform molded body 52 as shown in step (III) is taken out. Burrs or any unnecessary portion may be removed from the preform molded body 52 by using a laser cutter or a cutting unit (cutting mold) as necessary.

Next, in-molding is performed using the preform molded body 52. First, as shown in step (IV), injection molding is performed by using an injection molding machine 13 including an in-molding mold 18 composed of a movable mold 18a and a fixed mold 18b. Specifically, the preform molded body 52 is housed such that the temporary surface protection layer 4 opposes the recess of the cavity of the movable mold 18a, and the movable mold 18a and the fixed mold 18b are clamped together. Then, a cylinder 13a of the injection molding machine 13 is moved forward such that a nozzle portion 13b disposed at the distal end of the cylinder 13a is abutted against a resin inlet 18c of the in-molding mold 18. Then, a screw 13c is rotated so as to perform metering while melting a pellet-shaped resin 15 stored in a hopper 13d inside the cylinder 13a. Then, after metering, the molten resin 15 is injected into the cavity of the in-molding mold 18. The molten resin 15 enters the voids between the fibers of the fiber sheet layer 7 by injection. At this time, the fiber sheet layer 7 serves as a barrier layer for preventing the molten resin 15 from permeating into the textile material layer 1 during in-molding. As a result, the molten resin will not permeate into the textile material layer 1, and therefore, the textile material layer 1 will not be hardened, making it possible to maintain a three-dimensional texture. Furthermore, the thermal effect of the molten resin on the textile material layer 1 is reduced. On the other hand, the molten resin permeates into the fiber sheet layer 7 during in-molding, thus making it possible to maintain high adhesion to the formed resin molded body 5 due to an anchor effect. Furthermore, the textile material layer 1 and the fiber sheet layer 7 are bonded, and thus exhibit high adhesion due to the anchor effect of the adhesive.

Then, after the resin 15 has been cooled and solidified inside the mold 18, the movable mold 18a and the fixed mold 18b are separated from each other. Thus, as shown in step (V), a textile-like resin molded body 50 in which the preform molded body 52 and the resin molded body 5 are integrated with each other is taken out. When the molten resin 15 is cooled and solidified, the fiber sheet layer 7 and the resin molded body 5 undergo contraction, and the fiber sheet layer 7 and the resin molded body 5 are more firmly integrated. Thus, a textile-like resin molded body 50 is obtained. In such a textile-like resin molded body 50, the bonding strength between the fiber sheet layer 7 and the resin molded body 5 is increased by an anchor effect as a result of allowing the molten resin to permeate into the air-permeable fiber sheet layer 7.

Then, as shown in step (VI), the temporary surface protection layer 4 and the second adhesive layer 6 are selectively removed from the surface of the textile-like resin molded body 50 after the adhesive layer 6 has been solidified, and thereby, a textile-like resin molded body 50a including the textile material layer 1 on its surface is obtained.

Sixth Embodiment

Figure 22:
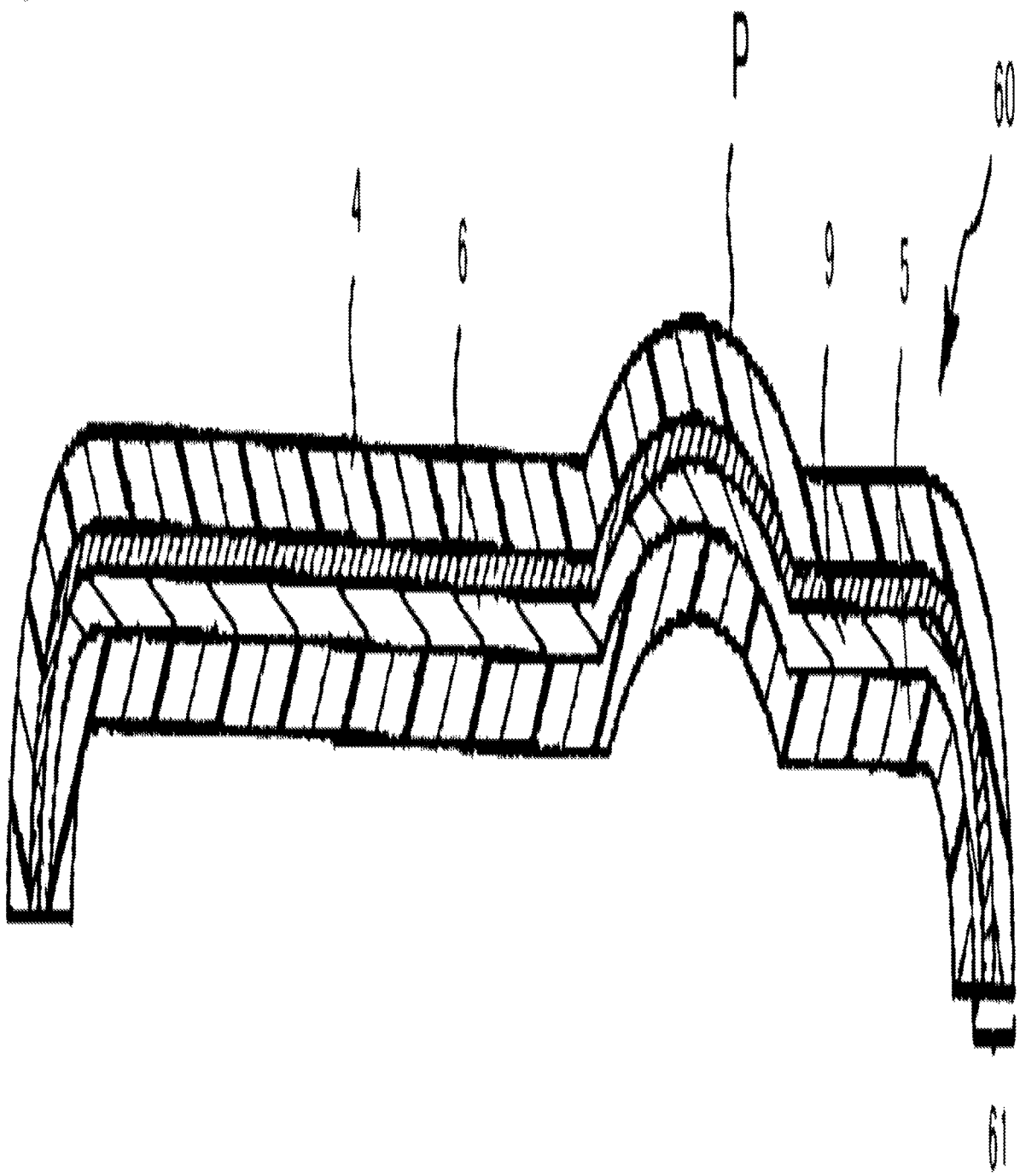
FIG. 22 is a schematic cross-sectional view of a textile-like resin molded body 60 according to the sixth embodiment, taken along the line II-II' in FIG. 1.
Figure 23:
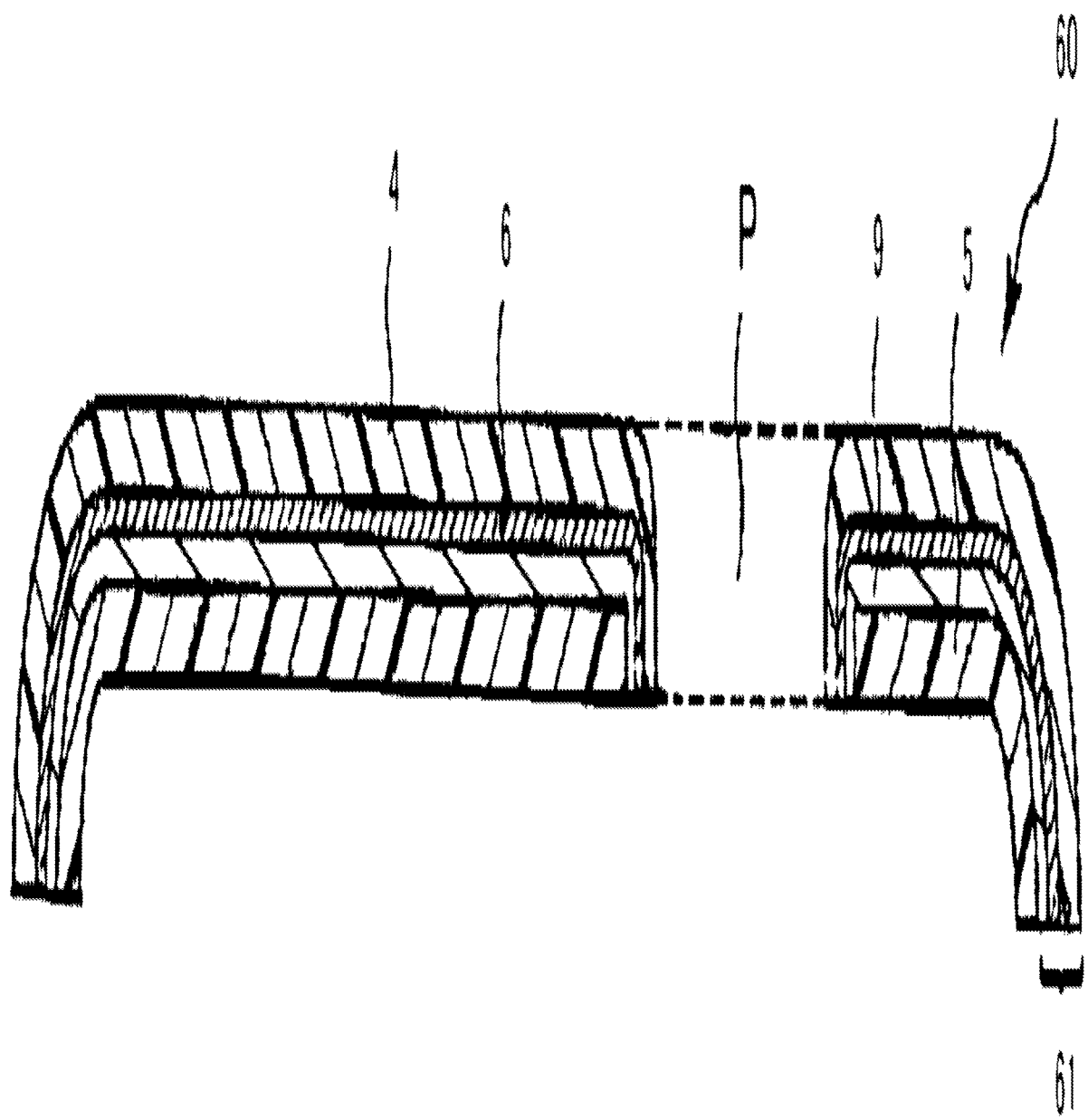
FIG. 23 is a schematic cross-sectional view of the textile-like resin molded body 60 according to the sixth embodiment, taken along the line III-III' in FIG. 1.

FIG. 1 is a schematic perspective view of a textile-like resin molded body (housing) 60 that uses an artificial leather as a textile material according to a sixth embodiment. FIG. 22 is a schematic cross-sectional view taken along the line II-II' in FIG. 1, and FIG. 23 is a schematic cross-sectional view taken along the line III-III' in FIG. 1. Note that those elements denoted by the same reference numerals as the reference numerals shown in the first to fifth embodiments denote the same elements as those described in the first to fifth embodiments.

As shown in FIGS. 22 and 23, the textile-like resin molded body 60 includes a temporary surface protection layer 4, an adhesive layer (temporary adhesive layer) 6, an artificial leather layer 9, and a resin molded body 5 laminated in this order from the second surface side toward the first surface side. An in-mold sheet 61 is a laminated body in which the temporary surface protection layer 4 and the artificial leather layer 9 are bonded with the adhesive layer 6. In the present embodiment, the artificial leather layer 9 functions as both the fiber sheet layer and the textile layer. The textile-like resin molded body 60 is obtained by in-molding the in-mold sheet 61 or a preform molded body 62 obtained by shaping the in-mold sheet 61 into a three-dimensional shape in advance. The temporary surface protection layer 4 and the adhesive layer 6 are provisional surface protection layers that are removed from the surface of the textile material layer 1 after in-molding.

Figure 24:
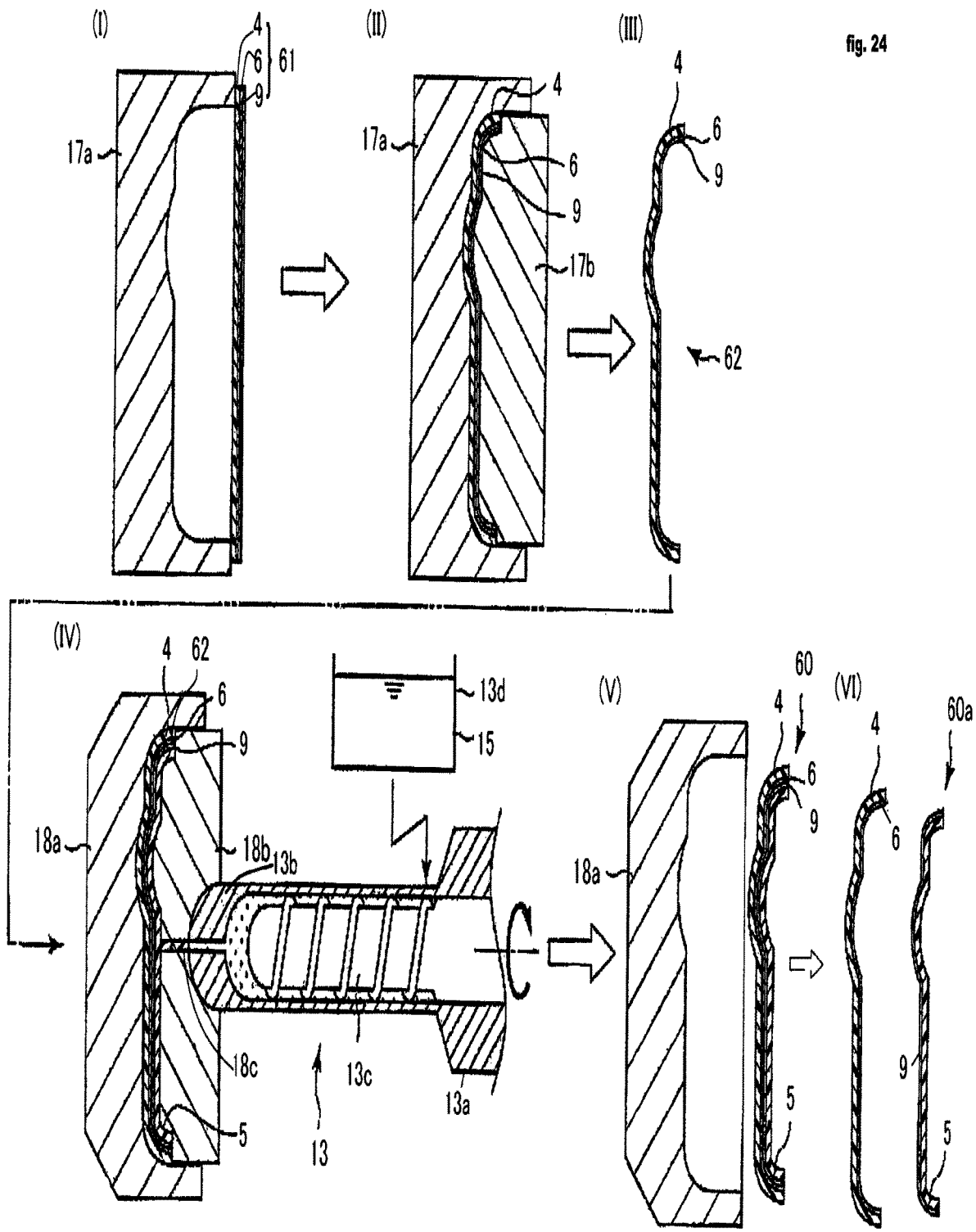
FIG. 24 is an explanatory diagram illustrating a production method according to the sixth embodiment.

Next, a production method of a textile-like resin molded body 60 that uses the in-mold sheet 61 according to the sixth embodiment will be described with reference to FIG. 24.

In the production method of the textile-like resin molded body 60 according to the sixth embodiment, preform molding is performed. First, as shown in step (I), the in-mold sheet 61 is placed such that the temporary surface protection layer 4 opposes a female mold 17a of a preform mold (press mold) 17. The in-mold sheet 61 may be cut into a predetermined shape in advance. Next, as shown in step (II), the in-mold sheet 61 is pushed into the recess of the female mold 17a by clamping the female mold 17a and the male mold 17b together by a pressing machine. As a result, a preform molded body 62 that has been provided with the shape of the in-mold sheet 61 is obtained. Then, the female mold 17a and the male mold 17b are separated from each other, and the preform molded body 62 as shown in step (III) is taken out. Burrs or any unnecessary portion may be removed from the preform molded body 62 by using a laser cutter or a cutting unit (cutting mold) as necessary.

Next, in-molding is performed using the preform molded body 62. First, as shown in step (IV), injection molding is performed by using an injection molding machine 13 including an in-molding mold 18 composed of a movable mold 18a and a fixed mold 18b. Specifically, the preform molded body 62 is housed such that the temporary surface protection layer 4 opposes the recess of the cavity of the movable mold 18a, and the movable mold 18a and the fixed mold 18b are clamped together. Then, a cylinder 13a of the injection molding machine 13 is moved forward such that a nozzle portion 13b disposed at the distal end of the cylinder 13a is abutted against a resin inlet 18c of the in-molding mold 18. Then, a screw 13c is rotated so as to perform metering while melting a pellet-shaped resin 15 stored in a hopper 13d inside the cylinder 13a. Then, after metering, the molten resin 15 is injected into the cavity of the in-molding mold 18. The molten resin 15 enters between the fibers of the non-woven fabric serving as the base material of the artificial leather layer 9 by injection. The non-woven fabric serving as the base material of the artificial leather layer 9 prevents the molten resin from reaching the decorative surface on the surface of the artificial leather layer 9. Furthermore, by performing in-molding in a state in which the temporary surface protection layer 6 is formed, the decorative surface is supported by the temporary surface protection layer 6, and the thermal effect exerted from the mold surface is reduced. Thereby, the occurrence of creasing or damage to the decorative surface is suppressed. This makes it possible to maintain an elastic texture of the decorative surface of the artificial leather layer 9. Furthermore, since the molten resin permeates into the non-woven fabric serving as the base material of the artificial leather layer 9 during in-molding, high adhesion to the formed resin molded body 5 can be maintained by an anchor effect.

Then, after the resin 15 has been cooled and solidified inside the mold 18, the movable mold 18a and the fixed mold 18b are separated from each other. Thus, as shown in step (V), a textile-like resin molded body 60 in which the preform molded body 62 and the resin molded body 5 are integrated with each other is taken out. When the molten resin 15 is cooled and solidified, the non-woven fabric serving as the base material of the artificial leather layer 9 and the resin molded body 5 undergo contraction, and the artificial leather layer 9 and the resin molded body 5 are more firmly integrated. Thus, a textile-like resin molded body 60 is obtained. In such a textile-like resin molded body 60, the bonding strength between the artificial leather layer 9 and the resin molded body 5 is increased by an anchor effect as a result of the molten resin permeating into the non-woven fabric serving as the base material of the artificial leather layer 9.

Then, as shown in step (VI), the temporary surface protection layer 4 and the adhesive layer 6 are selectively removed from the surface of the textile-like resin molded body 60 after the adhesive layer 6 has been solidified, and thereby, a textile-like resin molded body 60a including the artificial leather layer 9 on its surface is obtained.

Figure 25:
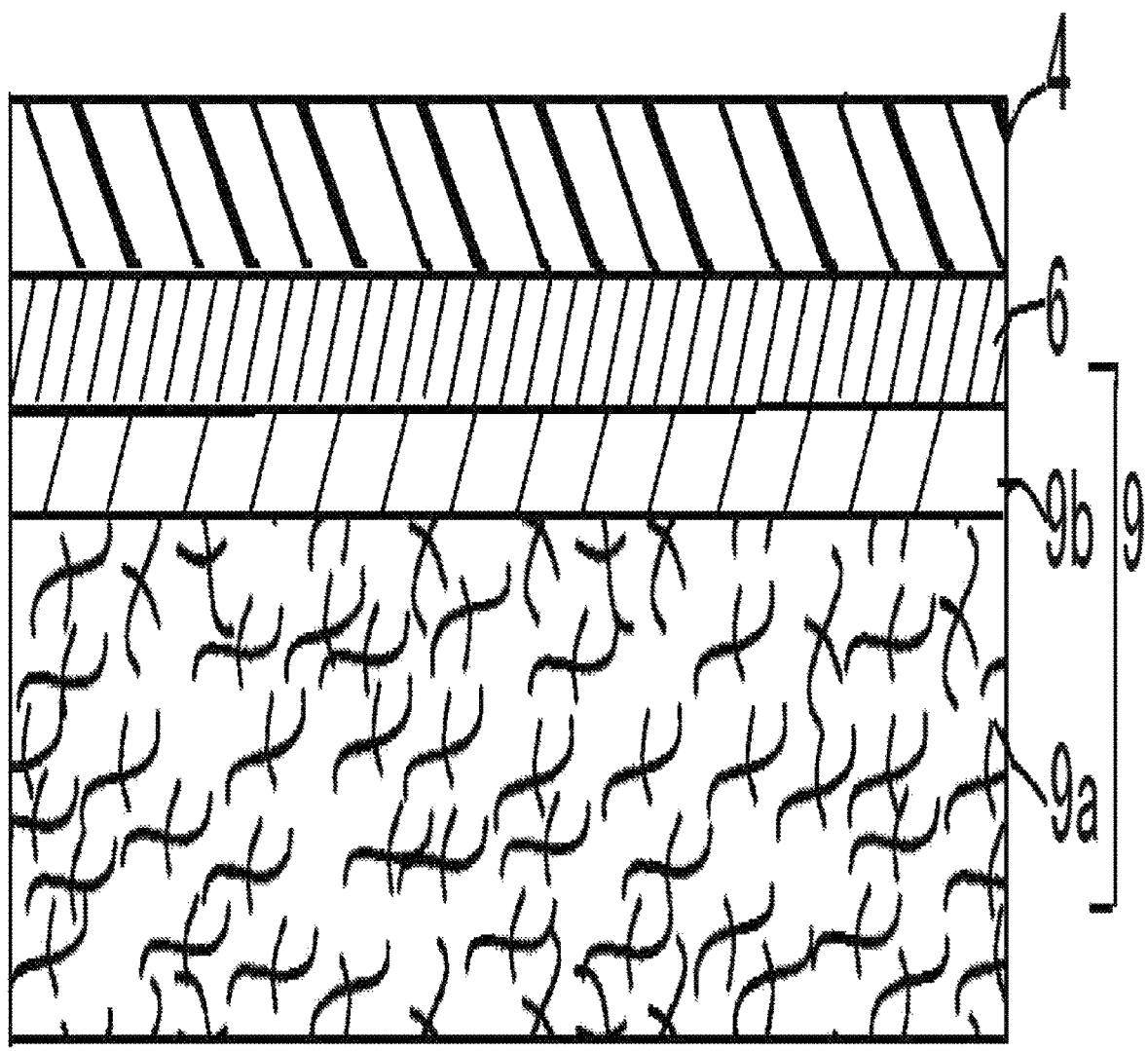
FIG. 25 is a schematic cross-sectional view of an in-molding sheet 61 according to the sixth embodiment.

Preferably, the in-molding sheet 61 includes an artificial leather layer 9 including a dense non-woven fabric 9a containing the above-described ultrafine fibers with a fineness of 0.9 dtex or less and a nap-finished or full grain-finished decorative surface 9b formed on the surface of the dense non-woven fabric 9a as shown in FIG. 25, and an adhesive layer 6 and a temporary surface protection layer 4 are laminated on the surface of the artificial leather layer 9. Note that "nap-finished" refers to a suede-like or nubuck-like decorative surface formed by buffing the surface of a dense non-woven fabric to nap the ultrafine fibers that form the dense non-woven fabric. "Full grain-finished" refers to the so-called full grain-finished decorative surface obtained by forming, on the surface of a dense non-woven fabric, a full grain-finished decorative surface containing a polymer elastic body such as polyurethane.

The apparent density of the dense non-woven fabric is preferably 0.45 g/cm$^3$ or more, more preferably 0.45 to 0.70 g/cm$^3$, particularly preferably 0.50 to 0.65 g/cm$^3$. When the dense non-woven fabric has such a high apparent density, it is possible to make the molten resin difficult to reach the decorative surface during in-molding, making it easy to obtain a textile-like resin molded body in which voids are retained in the non-woven fabric. As a result, it is possible to reduce the thermal effect on the decorative surface, thus reducing creasing on the surface of a textile-like resin molded body obtained by in-molding, and maintaining the cushioning properties provided by the voids of the non-woven fabric.

A nap-finished artificial leather having a suede-like or nubuck-like decorative surface that has been napped is obtained by buffing the surface of a fiber base material containing such a dense non-woven fabric. Further, a full grain-finished artificial leather having a full grain-finished decorative surface is obtained by forming a full grain-finished resin layer containing a polymer elastic body such as polyurethane on the surface of a fiber base material containing such a non-woven fabric.

Buffing is a process of rubbing the surface of a dense non-woven fabric of ultrafine fibers with sand paper or the like to nap the ultrafine fibers.

Examples of the method for forming the full grain-finished decorative surface include a method involving forming a resin layer containing a polymer elastic body such as polyurethane on the surface of the dense non-woven fabric of ultrafine fibers by using a process such as dry forming or direct coating. Note that "dry forming" refers to a method involving forming a resin film containing a polymer elastic body on a support base material such as a release paper, subsequently applying an adhesive to the surface of the resin film, attaching the resin film to the surface of a dense non-woven fabric by pressing as needed, and removing the release paper, thereby forming a full grain-finished decorative surface. "Direct coating" refers to a method involving applying a liquid resin or resin solution containing a polymer elastic body directly to the surface of a dense non-woven fabric, and subsequently curing the resin, thereby forming a full grain-finished decorative surface.

As the polymer elastic body for forming the full grain-finished resin layer, it is possible to use polyurethane, an acrylic elastic body, a silicone elastic body, and the like that have been conventionally used for forming a full grain-finished resin layer. The thickness of the full grain-finished resin layer is not particularly limited, but is preferably, for example, about 60 to 200 µm in that it is possible to maintain well-balanced mechanical properties and texture.

The decorative surface of the artificial leather layer is protected by the temporary surface protection layer via the temporary adhesive layer. By protecting the decorative surface of the artificial leather layer by such a temporary surface protection layer, the thermal effect exerted on the decorative surface from the mold surface is reduced by the temporary surface protection layer during in-molding, thus suppressing the occurrence of creasing on the decorative surface. Furthermore, the temporary surface protection layer supports the artificial leather layer, and therefore, the preform molded body is prevented from being displaced from the original predetermined position by the molten resin flowing into the cavity during injection molding.

Seventh Embodiment

The foregoing has described preferred embodiments of the in-mold sheet, the preform molded body, and the textile-like resin molded body according to the first to sixth embodiments. In a seventh embodiment, a preferred method for producing a textile-like resin molded body by using an in-mold sheet will be described in detail. Note that in the seventh embodiment, an example in which the in-mold sheet 61 described in the sixth embodiment is used will be described as a representative example. However, the same effect may also be achieved by using the other in-mold sheets.

The step of preform molding the in-mold sheet 61 by using a mold 117 (117a, 117b) will be described with reference to FIG. 26. In preform molding, first, the in-mold sheet 61 is softened by heating, and then disposed between a male mold 117a and a female mold 117b such that the temporary surface protection layer 4 opposes the female mold 117b, as shown in (a). Then, as shown in (b), the male mold 117a and the female mold 117b are clamped together, thus shaping the in-mold sheet 61.

Then, as shown in (c), the male mold 117a and the female mold 117b are opened, and the resulting preliminary molded body 162a of a preform molded body 162 is released from the mold. Then, as shown in (d), unnecessary portions are trimmed off, thereby obtaining a preform molded body 162.

The preliminary molded body 162a of the preform molded body may be directly used as a preform molded body, but is preferably processed into a preform molded body 162 by trimming off the unnecessary portions. It is preferable that the preform molded body 162 has been trimmed in advance in that a high-abrasion-resistance resin formed by injection molding forms an end face since no cut surface is formed on the end face of the resulting textile-like resin molded body, unlike when trimming is performed during injection molding. Note that a cut surface of the preform molded body usually appears on the end face when the textile-like resin molded body is trimmed after injection molding. In such a case, low-abrasion-resistance materials, such as fibers and a polymer elastic body, that form the non-woven fabric or the textile layer appear on the end face, and therefore, the abrasion resistance of the end face tends to be reduced. As shown in (d), by trimming off the unnecessary portions before in-molding, a preform molded body 162 that has been trimmed in advance can be obtained.

Figure 27:
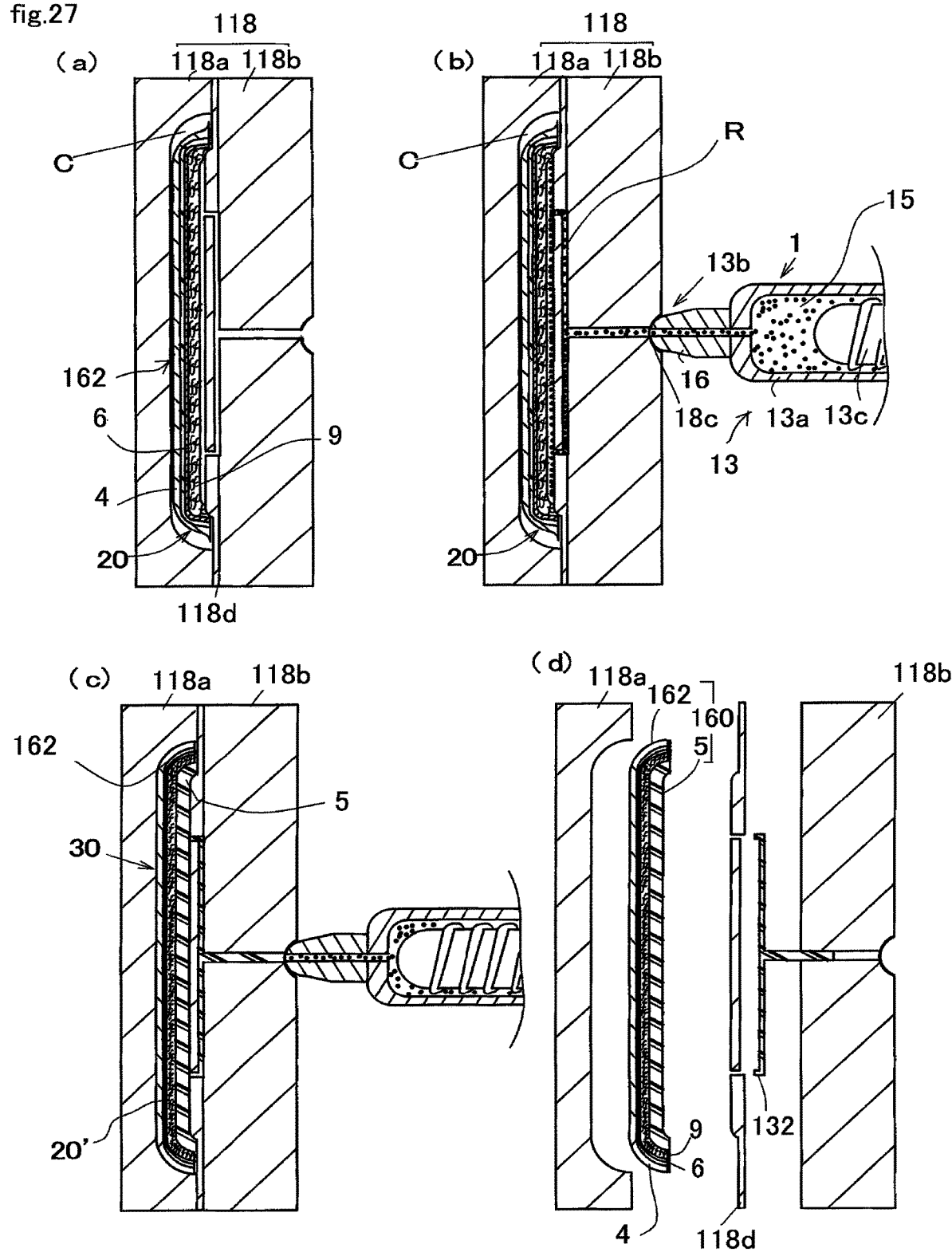
FIG. 27 is a schematic cross-sectional view illustrating steps of in-molding according to the seventh embodiment.

Next, the step of molding a textile-like resin molded body by performing in-molding using the preform molded body 162 will be described with reference to FIG. 27.

As shown in (a), an in-molding mold 118 includes a movable mold 118a having a recess C and a fixed mold 118b. In addition, a stripper plate 118d is disposed between the movable mold 118a and the fixed mold 118b. First, a preform molded body 162 including an artificial leather layer 9 having a decorative surface protected by a temporary surface protection layer 4 and a temporary adhesive layer 6 is disposed such that the temporary surface protection layer 4 faces the recess C.

The method for disposing the preform molded body 162 inside the recess C is not particularly limited. For the purpose of positioning, it is preferable that the preform molded body 162 is fixed inside the recess C. When the preform molded body 162 is not fixed inside the recess C, the preform molded body 162 may be positionally displaced as the molten resin flows during injection molding. Specific examples of the method for fixing the preform molded body 162 inside the recess C include a method in which the preform molded body 162 is fixed on the surface of the recess C by means of a pressure-sensitive adhesive, and a method in which the preform molded body 162 is fixed by fitting a hole or a recess included in the shape of the preform molded body 162 into a core of the movable mold that has a shape matching the hole or the recess.

Then, as shown in (b), a molten resin 15 is injected into the mold 118 by injection molding, thereby molding a textile-like resin molded body 160 in which the preform molded body 162 has been integrated. More specifically, injection molding is performed by clamping the movable mold 118a and the fixed mold 118b together, moving a cylinder 13a of an injection molding machine 13 forward until a nozzle portion 13b comes into contact with a resin inlet 118c of the fixed mold 118b, and injecting the resin 15 that has been molten inside the cylinder 13a of the injection molding machine 13 by using a screw 13c, thereby injecting the molten resin 15 into the mold 118. The injected resin 15 flows through a resin flow path R in the mold 118 into the recess C of the cavity, and fills the cavity. At this time, it is preferable that the preform molded body 162 is stretched by the heat and pressure of the molten resin 15 having flown into the mold such that its surface area is increased by 5% or more. In order to allow the resin 15 to adequately permeate into the non-woven fabric serving as the base material of the artificial leather layer 9, the artificial leather layer 9 and the resin molded body 5 are integrated with the preform molded body 162 so as to increase the bonding strength by an anchor effect.

Then, after completion of injection, the resin 15 is cooled to form a resin molded body 5, and a textile-like resin molded body 160 having the stretched preform molded body 162 integrated on its surface is molded, as shown in (c). Then, as shown in (d), the mold 118 is opened to separate the movable mold 118a and the fixed mold 118b from each other, and a runner 132 and the textile-like resin molded body 160 are taken out. Thus, the textile-like resin molded body 160 in which the artificial leather layer 9 protected by the temporary surface protection layer 4 is integrated with the resin molded body 5 is obtained.

Here, in the production method of the present embodiment, it is preferable that the preform molded body used in in-molding is molded into a shape having a size that can be stretched such that the surface area is increased by 5 to 40% when integrated with the resin molded body. FIG. 28 is an explanatory diagram for illustrating a change in the area of the decorative surface during in-molding. As shown in FIG. 28, the preform molded body 162 needs to be molded such that the surface area of the decorative surface 9b is 5 to 40% smaller than the surface area of the decorative surface 9b of the textile-like resin molded body 160 molded by in-molding. In this manner, by using the preform molded body having the decorative surface 9b with a surface area that is 5 to 40% smaller than the surface area of the decorative surface 9b when integrated with the textile-like resin molded body 160 and integrating the preform molded body with the decorative molded body such that the preform molded body is stretched to increase the surface area of the decorative surface by 5 to 40% in injection molding performed in in-molding, the preform molded body is integrated while being stretched, and therefore, creasing is less likely to occur on the decorative surface. The surface area of the decorative surface of the preform molded body relative to the surface area of the decorative surface when integrated with the decorative molded body is preferably 5 to 40% smaller, more preferably 10 to 35% smaller, particularly preferably 15 to 30% smaller. When the surface area of the decorative surface of the preform molded body relative to the surface area of the decorative surface when integrated with the decorative molded body is smaller by less than 5%, creasing is likely to occur. The reason for this is presumably that the preform molded body is excessively stretched during injection molding, and cannot follow the heat contraction of the resin molded body during cooling. When the surface area of the decorative surface of the preform molded body relative to the surface area of the decorative surface when integrated with the decorative molded body is smaller by more than 40%, the shaping properties are reduced when producing a decorative molded body having a large level difference such as a deep-drawn shape.

Figure 29:
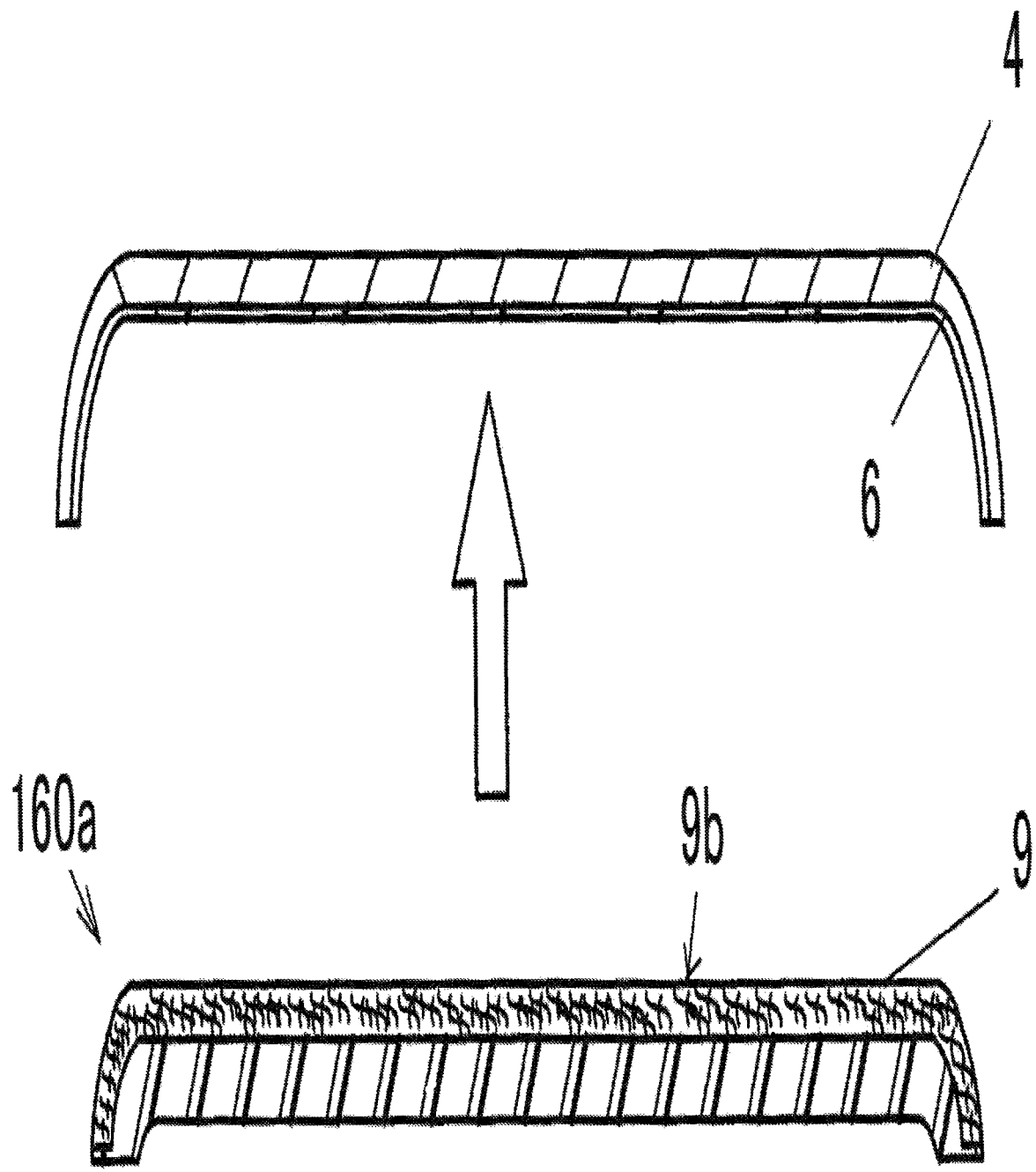
FIG. 29 is an explanatory diagram for illustrating how a temporary surface protection layer is removed from a textile-like resin molded body according to the seventh embodiment.

Then, as shown in FIG. 29, the temporary surface protection layer 4 and the second adhesive layer 6 are removed from the textile-like resin molded body 160 protected by the temporary surface protection layer 4, thereby obtaining a textile-like resin molded body 160a including an artificial leather-like decorative surface 9b exposed on the surface.

EXAMPLES

Hereinafter, the present invention will be described in further detail by way of examples. It should be appreciated that the present invention is by no means limited by the examples.

First, a summary of the non-woven fabrics and the artificial leathers used in the examples will be provided.

<Non-Woven Fabric A>

A non-woven fabric A is the following dense non-woven fabric obtained by removing sea components from a fiber-entangled body of an island-in-the-sea composite fiber of long fibers obtained by spunbonding. The non-woven fabric A is a non-woven fabric having a thickness of 500 μm and a mass per unit area of 310 g/m$^2$, and including a fiber-entangled body having an apparent density of 0.53 g/cm$^3$, obtained by entangling fiber bundles (average number of fibers per bundle: 25) of ultrafine fibers having a fineness of 0.08 dtex, and a crosslinked, non-foamed polyurethane impregnated into the non-woven fabric. Note that the ultrafine fibers are made from an isophthalic acid-modified PET having a Tg of 110° C., and the mass ratio of the non-foamed polyurethane to the fiber-entangled body is 12/88. In addition, the mass reduction rate of the non-foamed polyurethane after immersion in DMF is 0.5 mass %.

<Non-Woven Fabric B>

A non-woven fabric B is a dense non-woven fabric that is the same as the non-woven fabric A except that ultrafine fibers of a modified PET having a Tg of 130° C. are used in place of the ultrafine fibers of the isophthalic acid-modified PET having a Tg of 110° C.

<Non-Woven Fabric C>

A non-woven fabric C is a dense non-woven fabric that is the same as the non-woven fabric A except that a foamed polyurethane is used in place of the crosslinked, non-foamed polyurethane.

<Non-Woven Fabric D>

A non-woven fabric D is a non-woven fabric having a thickness of 500 μm and a mass per unit area 380 g/cm², and formed by impregnating, with a crosslinked, non-foamed polyurethane, a fiber-entangled body having an apparent density of 0.68 g/cm³ obtained by entangling regular fibers having a fineness of 2.5 dtex.

<Non-Woven Fabric E>

A non-woven fabric E is a paper-like non-woven fabric (PY-100-60 manufactured by Awa Paper Mfg. Co., Ltd.) having an apparent density of 0.40 g/cm³, a thickness of 240 μm, and a mass per unit area of 95 g/cm².

<Non-Woven Fabric F>

A non-woven fabric F is a resin-containing non-woven fabric in which the voids between the fibers of the non-woven fabric E are impregnated with a PVB adhesive.

<Artificial Leather>

An artificial leather is an artificial leather on which a suede-like napped surface as a decorative surface is formed by buffing the surface of the non-woven fabric A, and subsequently dying the non-woven fabric A with a disperse dye by a jet dyeing machine.

A summary of the evaluation methods used in the examples will be provided below.

(Surface Tactile Impression of Textile-Like Resin Molded Body)

The surface tactile impression of each of the textile-like resin molded bodies was evaluated according to the following criteria.

A: Exhibited excellent three-dimensional appearance, and highly maintained the fiber-like or artificial leather-like texture, without the textile material being embedded in the resin molded body.

B: Exhibited a certain degree of three-dimensional appearance in the textile material, and maintained the fiber-like or artificial leather-like texture.

C: Exhibited a hard resin-like texture due to the resin entering the textile material.

D: Had a flat surface due to the textile material being embedded in the resin molded body.

(Surface Appearance of Textile-Like Resin Molded Body)

The surface appearance of each of the textile-like resin molded bodies was determined visually according to the following criteria.

A: The textile material was accurately attached to the predetermined position of the resin molded body, without any creasing or pattern distortion.

B: The textile material was accurately attached to the predetermined position of the resin molded body, but creasing or pattern deformation occurred.

C: The textile material was not accurately attached to the predetermined position of the resin molded body.

(Preform Moldability)

The corner portions of each of the preform molded bodies were observed visually, and the preform moldability was determined according to the following criteria.

A: The corners were sharp and conformed to the mold shape.

B: The corners were rounded.

(Scratch Resistance of Textile-Like Resin Molded Body)

A stainless steel friction element whose contact surface with a measurement sample had a 4.0 mm×2.0 mm rectangular shape was attached in place of a friction element of a friction tester of type I (clockmeter type) prescribed in JIS L 0849. Then, by subjecting the surface of the textile-like resin molded body to friction treatment for one minute at a reciprocation rate of 30 times per minute under a load of 200 g, the scratch resistance was evaluated according to the following criteria.

A: The surface appearance did not change.

B: The textile material showed peeling or tearing.

(In-Moldability)

A portion forming a semispherical protrusion having a diameter of 20 mm and a height 5 mm of the textile-like resin molded body was observed visually, and the in-moldability was determined according to the following criteria.

S: The boundary between the protrusion and the flat portion was well-defined and sharp.

A: The boundary between the protrusion and the flat portion was sharp and substantially conformed to the mold shape.

B: A rounded portion was present in the boundary between the protrusion and the flat portion.

C: Most of the boundary between the protrusion and the flat portion was rounded.

Example 1

A second adhesive layer was formed by applying a PVB adhesive to the mold release surface of a release paper such that the thickness after bonding was 75 μm. Specifically, a 10% methanol solution of the PVB adhesive was prepared first. Then, the step of applying the adhesive solution to the mold release surface and drying the surface at 70° C. was repeated for a plurality of times, thereby forming a second adhesive layer having a thickness of 75 μm. Thus, a second adhesive layer-equipped release paper was obtained. Then, a 30-μm-thick transparent acrylic film (trade name "TECH-NOLLOY" manufactured by Sumitomo Chemical Co., Ltd.) that would serve as a surface protection layer was pressure-bonded to the second adhesive layer of the second adhesive layer-equipped release paper, and subsequently only the release paper was removed, thereby obtaining a second adhesive layer-equipped transparent acrylic film. Then, a textile material was placed on top of the second adhesive layer of the second adhesive layer-equipped transparent acrylic film, and was pressure-bonded under heating. As the textile material, a grid-patterned lace knit fabric having a line width of about 4 mm was provided. Then, a PVB adhesive was further applied to the surface of the textile material so as to provide a thickness of 50 μm, thereby forming a first adhesive layer. Then, the non-woven fabric A was placed on top of the surface of the first adhesive layer, and was pressure-bonded under heating. Thus, an in-mold sheet A1 having a surface protection layer was obtained.

Using the in-mold sheet A1, a preform molded body was molded with a mold having a three-dimensional cavity. Preform molding was performed by disposing the in-mold sheet A1 such that the surface protection layer faced the female mold of a press mold heated to a temperature of 150° C., and pressing the press mold with a pressure of 0.4 MPa. Thus, a preform molded body A2 was obtained.

The obtained preform molded body A2 was disposed in the recess of the cavity of an in-molding mold such that the surface protection layer faced the surface of a movable mold. Then, an ABS resin was injection-molded under the conditions of a resin temperature of 235° C. and a mold temperature of 30 to 50° C. By performing in-molding in this manner, a textile-like resin molded body A3 having a shape as shown in FIGS. 18A to 18C was obtained. Then, evaluation was made according to the above-described evaluation methods. The results are shown in Table 1.

performed, thereby obtaining a textile-like resin molded body C3. Then, the textile-like resin molded body C3 was evaluated in the same manner as in Example 1. The results are shown in Table 1.

TABLE 1

| Example No. | 1 | 2 | 3 | 4 | 5 | 6 | Com. Ex. |
|---|---|---|---|---|---|---|---|
| Surface resin layer | Acrylic | (Amorphous PET) | — | Acrylic | (Amorphous PET) | (Amorphous PET) | — |
| Second adhesive layer or temporary adhesive layer | PVB | (PVA) | — | PVB | (PVA) | (PVA) | — |
| Textile layer | Grid-patterned | Grid-patterned | Grid-patterned | Grid-patterned | Grid-patterned | Dot-printed | Grid-patterned |
| First adhesive layer | PVB | PVB | PVB | — | — | PVB | — |
| Non-woven fabric layer | Dense non-woven fabric | Dense non-woven fabric | Dense non-woven fabric | — | — | Dense non-woven fabric | — |
| Surface tactile impression | B | A | A | C | C | A | D |
| Surface appearance | A | A | B | A | A | A | C |
| Preform moldability | A | A | A | A | A | A | — |
| Scratch resistance | A | B | B | A | B | B | B |
| In-moldability | A | A | A | A | A | A | — |

Example 2

On the surface of a 50-μm-thick amorphous PET film (trade name "G440E" manufactured by Mitsubishi Plastics, Inc.) that would serve as a temporary surface protection layer, a PVA film (KURARAY POVAL film) manufactured by KURARAY CO., LTD., which was a 30-μm-thick PVA film for forming a temporary adhesive layer, was placed. Then, the PVA film and the amorphous PET film were pressure-bonded with a release paper under heating, and subsequently only the release paper was removed, thereby obtaining a temporary adhesive layer-equipped amorphous PET film. Meanwhile, a PVB adhesive was applied to the same grid-patterned textile material as that of Example 1 such that the thickness after bonding was 100 μm, thereby forming a first adhesive layer. Then, the non-woven fabric A was placed on top of the surface of the first adhesive layer, and was pressure-bonded under heating. Then, the temporary adhesive layer-equipped amorphous PET film was placed on top of the textile material such that the temporary adhesive layer faced the textile material, and was pressure-bonded under heating. Thus, an in-mold sheet B1 including a temporary surface protection layer was obtained.

Preform molding was performed in the same manner as in Example 1 except that the in-mold sheet B1 was used in place of the in-mold sheet A1, and in-molding was further performed. The temporary surface protection layer and the temporary adhesive layer were removed from the resulting in-molded body, thereby obtaining a textile-like resin molded body B3. Then, the textile-like resin molded body B3 was evaluated in the same manner as in Example 1. The results are shown in Table 1.

Example 3

The temporary surface protection layer and the temporary adhesive layer were removed from the same in-mold sheet B1 as that produced in Example 2, thereby obtaining an in-mold sheet C1.

Preform molding was performed in the same manner as in Example 1 except that the in-mold sheet C1 was used in place of the in-mold sheet A1, and in-molding was further Example 4

A second adhesive layer-equipped transparent acrylic film was obtained in the same manner as in Example 1. Then, the same grid-patterned textile material as that of Example 1 was placed on top of the adhesive layer of the second adhesive layer-equipped transparent acrylic film, and was pressure-bonded under heating. Thus, an in-mold sheet D1 was obtained.

Preform molding was performed in the same manner as in Example 1 except that the in-mold sheet D1 was used in place of the in-mold sheet A1, and in-molding was further performed, thereby obtaining a textile-like resin molded body D3. Then, the textile-like resin molded body D3 was evaluated in the same manner as in Example 1. The results are shown in Table 1.

Example 5

A temporary adhesive layer-equipped amorphous PET film was obtained in the same manner as in Example 2. Then, the same grid-patterned textile material as that of Example 1 was placed on top of the temporary adhesive layer of the temporary adhesive layer-equipped amorphous PET film, and was pressure-bonded under heating. Thus, an in-mold sheet E1 including a temporary surface protection layer was obtained.

A textile-like resin molded body E3 was obtained in the same manner as in Example 2 except that the in-mold sheet E1 was used in place of the in-mold sheet B1. Them, the textile-like resin molded body E3 was evaluated in the same manner as in Example 1. The results are shown in Table 1.

Example 6

An in-mold sheet F1 was obtained in the same manner as in Example 1 except that a woven fabric on which fine patterns having a diameter of about 8 mm were printed so as to be dispersed like dots was used as the textile material in place of the in-mold sheet A1 using the grid-patterned lace knit fabric as the textile material.

Preform molding was performed in the same manner as in Example 1 except that the in-mold sheet F1 was used in place of the in-mold sheet A1, and in-molding was further performed, thereby obtaining a textile-like resin molded body F3. Then, the textile-like resin molded body F3 was evaluated in the same manner as in Example 1. The results are shown in Table 1.

Comparative Example

The in-mold sheet A1 and the preform molded body A2 were used in Example 1. On the other hand, in the comparative example, only the same grid-patterned textile material as that of Example 1 was disposed in the recess of the cavity of an in-molding mold, and injection molding was performed under the same conditions as those in Example 1, thereby obtaining a textile-like resin molded body G3. Then, the textile-like resin molded body G3 was evaluated in the same manner as in Example 1. The results are shown in Table 1.

Each of the textile-like resin molded bodies of Examples 1 to 6 according to the present invention, obtained by performing preform molding using the in-mold sheet including the surface protection layer or the temporary surface protection layer and then performing in-molding, was accurately attached at the predetermined position. In particular, the textile-like resin molded bodies of Examples 1 to 3 and 6, obtained by performing preform molding using the in-mold sheet that included a fiber sheet layer including a non-woven fabric and then performing in-molding, achieved a highly three-dimensional, fiber-like texture, without the textile material being embedded in the resin molded body.

Example 7

An in-mold sheet H1 was obtained in the same manner as in Example 2 except that the non-woven fabric B containing ultrafine fibers of an isophthalic acid-modified PET having a Tg of 130° C. was used in place of the non-woven fabric A containing ultrafine fibers of an isophthalic acid-modified PET having a Tg of 110° C. Then, a textile-like resin molded body H3 was obtained in the same manner as in Example 2 except that the in-mold sheet H1 was used in place of the in-mold sheet B1. Then, the textile-like resin molded body H3 was evaluated in the same manner as in Example 1. The results are shown in Table 2.

Example 8

An in-mold sheet J1 was obtained in the same manner as in Example 2 except that the non-woven fabric C containing a non-crosslinked foamed polyurethane was used in place of the non-woven fabric A containing a crosslinked, non-foamed polyurethane. Then, a textile-like resin molded body J3 was obtained in the same manner as in Example 2 except that the in-mold sheet J1 was used in place of the in-mold sheet B1. Then, the textile-like resin molded body J3 was evaluated in the same manner as in Example 1. The results are shown in Table 2.

Example 9

An in-mold sheet K1 was obtained in the same manner as in Example 2 except that the non-woven fabric D containing a fiber-entangled body having an apparent density of 0.45 g/cm$^3$ obtained by entangling regular fibers having a fineness of 2.5 dtex was used in place of the non-woven fabric A, which was a dense non-woven fabric containing a fiber-entangled body having an apparent density of 0.53 g/cm$^3$ obtained by entangling fiber bundles of ultrafine fibers having a fineness of 0.08 dtex. Then, a textile-like resin molded body K3 was obtained in the same manner as in Example 2 except that the in-mold sheet K1 was used in place of the in-mold sheet B1. Then, the textile-like resin molded body K3 was evaluated in the same manner as in Example 1. The results are shown in Table 2.

Example 10

An in-mold sheet L1 was obtained in the same manner as in Example 2 except that the non-woven fabric E, which was a paper-like non-woven fabric, was used in place of the non-woven fabric A, which was a dense non-woven fabric containing a fiber-entangled body having an apparent density of 0.53 g/cm$^3$ obtained by entangling fiber bundles of ultrafine fibers having a fineness of 0.08 dtex. Then, a textile-like resin molded body L3 was obtained in the same

TABLE 2

| Example No. | 2 | 7 | 8 | 9 | 10 | 11 |
| --- | --- | --- | --- | --- | --- | --- |
| Surface resin layer | (Amorphous PET) | (Amorphous PET) | (Amorphous PET) | (Amorphous PET) | (Amorphous PET) | (Amorphous PET) |
| Second adhesive layer or temporary adhesive layer | (PVA) | (PVA) | (PVA) | (PVA) | (PVA) | (PVA) |
| Textile layer | Grid-patterned | Grid-patterned | Grid-patterned | Grid-patterned | Grid-patterned | Grid-patterned |
| First adhesive layer | PVB | PVB | PVB | PVB | PVB | PVB |
| Non-woven fabric layer | Dense non-woven fabric | Dense non-woven fabric | Dense non-woven fabric | Regular fibers | Paper-like non-woven fabric | Resin-impregnated paper |
| Fineness (dtex) | 0.08 | 0.08 | 0.08 | 2.5 | 2.4 | 2.4 |
| Fiber Tg (° C.) | 110 | 130 | 110 | 110 | 100 | 100 |
| Apparent density (g/cm$^3$) | 0.53 | 0.53 | 0.53 | 0.45 | 0.4 | 0.67 |
| Polyurethane type | Crosslinked | Crosslinked | Non-crosslinked | Crosslinked | — | — |
| Polyurethane structure | Non-foamed | Non-foamed | Foamed | Non-foamed | — | — |
| Surface tactile impression | A | B | B | C | B | A |
| Surface appearance | A | A | A | A | A | A |
| Preform moldability | A | B | B | B | A | A |
| Scratch resistance | B | B | B | B | B | B |
| In-moldability | A | B | A | B | A | A | manner as in Example 2 except that the in-mold sheet L1 was used in place of the in-mold sheet B1. Then, the textile-like resin molded body K3 was evaluated in the same manner as in Example 1. The results are shown in Table 2.

Example 11

An in-mold sheet M1 was obtained in the same manner as in Example 2 except that the non-woven fabric F, which was a paper-like non-woven fabric in which voids between the fibers were impregnated with a PVB adhesive, was used in place of the non-woven fabric A, which was a dense non-woven fabric containing a fiber-entangled body having an apparent density of 0.53 g/cm$^3$ obtained by entangling fiber bundles of ultrafine fibers having a fineness of 0.08 dtex. Then, a textile-like resin molded body M3 was obtained in the same manner as in Example 2 except that the in-mold sheet M1 was used in place of the in-mold sheet B1. Then, the textile-like resin molded body M3 was evaluated in the same manner as in Example 1. The results are shown in Table 2.

In all of the textile-like resin molded bodies of Examples 7 to 11, obtained by performing preform molding using the in-mold sheet including a fiber sheet layer, which was a non-woven fabric layer, and then performing in-molding, the textile material was not embedded in the resin molded body. Note that in the case of using the ultrafine fibers of an isophthalic acid-modified polyethylene terephthalate having a Tg of 130° C. in Example 7, the in-moldability was slightly inferior to that of Example 2. In the case of using the non-woven fabric of Example 8, which was impregnated with a non-crosslinked foamed polyurethane, the corners of the preform molded body were rounded as compared with those of Example 2. In the case of Example 9, which used the non-woven fabric D containing regular fibers having a fineness of 2.5 dtex, the resin entered the textile material, resulting in a hard resin-like texture. Also, in the case of Example 10, which used the paper-like non-woven fabric E, the resin entered the textile material, resulting in a somewhat hard resin-like texture. On the other hand, in the case of using the non-woven fabric F, which was a paper-like non-woven fabric in which voids between the fibers were impregnated with a PVB adhesive, the textile material exhibited a certain degree of a three-dimensional appearance, and the fiber-like texture was maintained.

Example 12

On the surface of a 75-μm-thick biaxially stretched PET film (trade name "LUMIRROR" manufactured by Toray Industries, Inc.) that would serve as a temporary surface protection layer, a 30-μm-thick PVA film (trade name "KURARAY POVAL" film manufactured by KURARAY CO., LTD.) for forming a temporary adhesive layer was placed. Then, the PVA film and the amorphous PET film were pressure-bonded with a release paper under heating, and subsequently only the release paper was removed, thereby obtaining a temporary adhesive layer-equipped amorphous PET film. Then, the temporary adhesive layer-equipped amorphous PET film was placed on top of an artificial leather such that the temporary adhesive layer faced the decorative surface of the artificial leather, and was pressure-bonded under heating. Thus, an artificial leather-like in-mold sheet N1 including a temporary surface protection layer was obtained.

Then, with the use of the in-mold sheet N1, a preform molded body was molded by using a mold having a three-dimensional cavity. Preform molding was performed by disposing the in-mold sheet N1 such that the temporary surface protection layer faced the female mold of a press mold heated to a temperature of 150° C., and pressing the press mold with a pressure of 0.4 MPa. Thus, a preform molded body N2 was obtained. The preform molded body N2 had a decorative surface having a surface area equivalent to the surface area of the decorative surface of the final textile-like resin molded body N3 obtained by in-molding.

The obtained preform molded body N2 was disposed in the recess of the cavity of an in-molding mold such that the temporary surface protection layer faced the surface of the movable mold. Then, an ABS resin was injection-molded under the conditions of a resin temperature of 235° C. and a mold temperature of 30 to 50° C. By performing in-molding in this manner, a textile-like resin molded body N3 having a shape as shown in FIGS. 1, 22 and 23 was obtained. Then, evaluation was made according to the above-described evaluation method. The results are shown in Table 3.

TABLE 3

| Example No. | 12 | 13 | 14 | 15 | 16 |
|---|---|---|---|---|---|
| Ratio of surface area of preform molded body to that of in-molded body (%) | 100 | 95 | 80 | 60 | 50 |
| Tg of ultrafine fibers (° C.) | 110 | 110 | 110 | 110 | 110 |
| Fineness (dtex) | 0.08 | 0.08 | 0.08 | 0.08 | 0.08 |
| Presence of protection sheet | Yes | Yes | Yes | Yes | Yes |
| In-moldability | A | S | S | S | A |
| Surface tactile impression | A | A | A | A | A |
| Surface appearance | A | A | A | A | A |
| Preform moldability | A | — | — | — | — |
| Scratch resistance | B | B | B | B | B |

Examples 13 to 16

Leather-like, textile-like resin molded bodies were obtained in the same manner as in Example 12 except that, in the production of the preform molded body, a preform molded body having a decorative surface with a surface area that was 5 to 50% smaller than that of the decorative surface of the final textile-like resin molded body obtained by in-molding, as shown in Table 3, was produced. Then, the resin molded bodies were evaluated. The results are shown in Table 3.

The results in Table 3 demonstrate that in each of the leather-like, textile-like resin molded bodies according to Examples 13 to 15, which were obtained by using the preform molded bodies having a decorative surface with a surface area that was 5 to 40% smaller than that of the decorative surface of the textile-like resin molded body and were stretched during in-mold injection molding such that the surface area of the decorative surface was increased by 5 to 40%, the boundary between the protrusion and the flat portion was sharp and conformed to the mold shape. On the other hand, the decorative molded body of Example 16, which was obtained by using the preform molded body having a decorative surface with a surface area that was 50% smaller than that of the decorative surface of the leather-like, textile-like resin molded body and was stretched such that the surface area of the decorative surface was increased by 50% during in-mold injection molding, exhibited particularly poor shaping properties.

INDUSTRIAL APPLICABILITY

According to the present invention, it is possible to provide a textile-like decoration on the surface of a resin molded body such as the body of a portable terminal (smartphone, tablet PC) and its accessories such as a case and a cover, the casing of an electronic device, an interior material of a vehicle, and a case of cosmetics.

REFERENCE SIGNS LIST 1, 101 . . . Textile material layer (Textile material)
2 . . . Surface protection layer (Protection film)
3 . . . Adhesive layer (Second adhesive layer)
4 . . . Temporary surface protection layer
5 . . . Resin molded body
6 . . . Adhesive layer (Temporary adhesive layer)
7 . . . Fiber sheet layer
8 . . . Adhesive layer (First adhesive layer)
9 . . . Artificial leather layer
9a . . . Dense non-woven fabric
9b . . . Decorative surface
10, 20, 30, 40, 50, 60, 62, 130, 140, 150 . . . Textile-like resin molded body
11, 21, 31, 41, 51, 61, 103, 104 . . . In-mold sheet
162a . . . Preliminary molded body
12, 22, 32, 42, 52, 62, 162 . . . Preform molded body
13 . . . Injection molding machine
13a . . . Cylinder
13b . . . Nozzle portion
13c . . . Screw
13d . . . Hopper
15 . . . Resin
17, 117 . . . Preform mold (Press mold)
17a, 117a . . . Female mold
17b, 117b . . . Male mold
18, 118 . . . In-molding mold
18a, 118a . . . Movable mold
18b, 118b . . . Fixed mold
18c, 118c . . . Resin inlet
118d . . . Stripper plate
23 . . . (Trimmed) Preform molded body
24 . . . Molten resin
25 . . . Release paper
26 . . . Adhesive layer-equipped release paper
132 . . . Runner
28 . . . Adhesive-impregnated non-woven fabric
P . . . Protrusion
H . . . Opening

The invention claimed is:

1. A textile-like in-mold sheet that is to be integrated with a resin molded body molded by injection of a molten resin by in-molding, the textile-like in-mold sheet comprising:
a first surface that will serve as a side to be integrated with the resin molded body; and
a second surface that will serve as a back side of the first surface,
wherein the textile-like in-mold sheet comprises at least a fiber sheet layer, a first adhesive layer comprising a polyvinyl acetal resin, and a textile material layer, in this order from the first surface toward the second surface, and further comprises, a surface resin layer that covers the textile material layer on the second surface side, wherein the surface resin layer is a surface protection layer bonded to the textile material layer via a second adhesive layer,
the fiber sheet layer includes a non-woven fabric of ultrafine fibers having a fineness of 0.9 dtex or less, wherein the non-woven fabric of ultrafine fibers further includes a polyurethane that is provided in internal voids thereof,
and the textile material layer includes a woven fabric, a knitted fabric, or a non-woven fabric.

2. The textile-like in-mold sheet in accordance with claim 1, wherein the fiber sheet layer is a barrier layer for preventing the molten resin from permeating into the textile material layer during the in-molding.

3. The textile-like in-mold sheet in accordance with claim 1, wherein the surface protection layer is an acrylic transparent resin layer or a methacrylic transparent resin layer.

4. The textile-like in-mold sheet in accordance with claim 1, wherein the second adhesive layer includes a polyvinyl acetal resin.

5. A preform molded body that is formed by shaping the textile-like in-mold sheet of claim 1.

6. A textile-like resin molded body, comprising:
the preform molded body of claim 5; and
the resin molded body that is molded by the in-molding, the resin molded body being laminated and integrated on the first surface side of the preform molded body.

7. The textile-like in-mold sheet in accordance with claim 1, wherein the polyurethane is crosslinked.

8. A production method of a textile-like resin molded body, the method comprising:
disposing the preform molded body of claim 5 inside a cavity of an in-molding mold such that a molten resin is injected to the first surface side; and
injecting the molten resin into the mold, thereby molding the resin molded body integrated with the preform molded body on the first surface side.

9. The production method of a textile-like resin molded body in accordance with claim 8, wherein, in the second step, the preform molded body is stretched such that a surface area of the second surface is increased by 5 to 40%.

10. The production method of a textile-like resin molded body in accordance with claim 9, wherein the preform molded body has been trimmed in advance so as to form a contour of the textile-like resin molded body.

11. A textile-like in-mold sheet that is to be integrated with a resin molded body molded by injection of a molten resin by in-molding, the textile-like in-mold sheet comprising:
a first surface that will serve as a side to be integrated with the resin molded body; and
a second surface that will serve as a back side of the first surface,
wherein the textile-like in-mold sheet comprises at least a fiber sheet layer, a first adhesive layer comprising a polyvinyl acetal resin, and a textile material layer, in this order from the first surface toward the second surface, further comprises, a surface resin layer that covers the textile material layer on the second surface side, wherein the surface resin layer is a temporary surface protection layer that is temporarily bonded to the textile material layer with a temporary adhesive layer so as to be removable,
and the fiber sheet layer includes a non-woven fabric of ultrafine fibers having a fineness of 0.9 dtex or less, wherein the non-woven fabric of ultrafine fibers further includes a polyurethane that is provided in internal voids thereof.

12. The textile-like in-mold sheet in accordance with claim 11, wherein the temporary surface protection layer is a polyester film layer.

13. The textile-like in-mold sheet in accordance with claim 11, wherein the temporary adhesive layer includes a polyvinyl alcohol resin.

14. The textile-like in-mold sheet in accordance with claim 11, wherein the temporary surface protection layer is bonded to the temporary adhesive layer via a pressure-sensitive adhesive layer.

* * * * *